US008656416B2

(12) United States Patent
Onishi et al.

(10) Patent No.: US 8,656,416 B2
(45) Date of Patent: Feb. 18, 2014

(54) INFORMATION PROCESSING APPARATUS FOR CUSTOMIZING PRINTER DRIVER PROGRAM, AND METHOD OF CUSTOMIZING PRINTER DRIVER PROGRAM

(75) Inventors: Yoshinari Onishi, Yokohama (JP); Lianjiang Niu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1445 days.

(21) Appl. No.: 11/386,853

(22) Filed: Mar. 23, 2006

(65) Prior Publication Data

US 2006/0221372 A1 Oct. 5, 2006

(30) Foreign Application Priority Data

Mar. 29, 2005 (JP) ................................ 2005-095692
Mar. 29, 2005 (JP) ................................ 2005-095695
Mar. 17, 2006 (JP) ................................ 2006-074412

(51) Int. Cl.
*G06F 3/00* (2006.01)
(52) U.S. Cl.
USPC ........................................................ 719/327
(58) Field of Classification Search
None
See application file for complete search history.

(56) References Cited

U.S. PATENT DOCUMENTS

| 6,418,485 | B1 * | 7/2002 | Cooper et al. ................ 719/321 |
| 6,915,514 | B1 | 7/2005 | Machida |
| 7,287,253 | B2 | 10/2007 | Yamamura et al. |
| 2003/0030664 | A1 * | 2/2003 | Parry ............................ 345/744 |
| 2003/0065773 | A1 * | 4/2003 | Aiba et al. .................... 709/224 |
| 2004/0070640 | A1 * | 4/2004 | Ferlitsch ........................ 347/19 |
| 2005/0149950 | A1 * | 7/2005 | Shikata ........................ 719/321 |
| 2005/0162677 | A1 * | 7/2005 | Toumanova et al. ......... 358/1.13 |
| 2005/0262271 | A1 * | 11/2005 | Ytterstrom ....................... 710/8 |

FOREIGN PATENT DOCUMENTS

| JP | 8-278871 | | 10/1996 |
| JP | 11-272471 | A | 10/1999 |
| JP | 2000-353079 | A | 12/2000 |
| JP | 2002-024772 | A | 1/2002 |
| JP | 2002-049485 | A | 2/2002 |
| JP | 2002-297341 | | 10/2002 |
| JP | 2003-150341 | | 5/2003 |
| JP | 2003-208276 | A | 7/2003 |
| JP | 2003-308215 | A | 10/2003 |
| JP | 2004-062398 | A | 2/2004 |
| JP | 2004-213132 | A | 7/2004 |

\* cited by examiner

*Primary Examiner* — H S Sough
*Assistant Examiner* — Carina Yun
(74) *Attorney, Agent, or Firm* — Fitzpatrick, Cella, Harper & Scinto

(57) ABSTRACT

According to this invention, an information processing apparatus which customizes a device driver for controlling an image forming apparatus includes an issuing unit which issues identification information for specifying a customized driver, and a storage unit which stores, in association with the customized driver, the identification information issued by the issuing unit.

15 Claims, 48 Drawing Sheets

FIG. 7A

```
inf FILE FOR 98 / ME
...
[Version]
Signature = "$CHICAGO$"
Class = Printer
Provider = %CANON%
DriverVer = 11/27/2004, 10.60.0.7
...
```

```
inf FILE FOR NT4.0                                                    ~710
...
[Version]
Signature = "$Windoes NT$"         ← 740
Provider = %CANON%
LayoutFile = cnl40jnt.inf
ClassGUID = {4D36E979-E325-11CE-BFC1-08002BE10318}
Class = Printer
DriverVer = 11/27/2004, 10.60.0.7
...
[Strings]
CANON = "Canon"
CLASSNAME = "Printer"
NS_LMON_CPCA = "CPCA Language Monitor2, AUCPLMNT.DLL"
DISK1 = "LIPS4 Printer Driver for Microsoft Windows NT Version 4.0    ← 760
Version 10.60 Installer Disk"
```

FIG. 7C

```
inf FILE FOR 2000 / XP / Server 2003                                    720

...
[Version]
Signature = "$Windoes NT$"                                              750
Provider = %CANON%
ClassGUID = {4D36E979-E325-11CE-BFC1-08002BE10318}
Class = Printer
DriverVer = 11/27/2004, 10.60.0.7
CatalogFile.NTx86 = CNL.40J.CAT ...
[Strings]
CANON = "Canon"
NS_LMON_CPCA = "CPCA Language Monitor2, AUCPLMNT.DLL"
DISK1 = "LIPS4 Printer Driver for Microsoft Windows 2000 / XP /          770
Server 2003 Version 10.60 Installer Disk"
```

FIG. 10B

| API | PSEUDO-API NAME |
|---|---|
| GetVersionEx | CSPL_GetVersionEx |
| OpenPrinter | CSPL_OpenPrinter |
| ClosePrinter | CSPL_ClosePrinter |
| SetPrinter | CSPL_SetPrinter |
| GetPrinter | CSPL_GetPrinter |
| GetPrinterDriver | CSPL_GetPrinterDriver |
| SetPrinterData | CSPL_SetPrinterData |
| GetPrinterData | CSPL_GetPrinterData |

FIG. 15

| REGISTRY EDITOR | | | |
|---|---|---|---|
| FILE (F) EDIT (E) VIEW (V) FAVORITE (A) HELP (H) | | | |

Tree (left pane):
- Biosinfo
- BootVerificationProgram
- Class
- CoDeviceInstallers
- COM Name Arbiter
- ComputerName
- ContentIndex
- ContentIndexCommon
- CrashControl
- CriticalDeviceDatabase
- DeviceClasses
- FileSystem
- FontAssoc
- GraphicsDrivers
- GroupOrderList
- HAL
- hivelist
- IDConfigDB
- Keyboard Layout
- Keyboard Layouts
- Lsa
- MediaCategories
- MediaInterfaces
- MediaProperties
- MediaResources
- MediaSets
- Network
- NetworkProvider
- Nls
- NTMS
- Pnp
- Print

| NAME | TYPE | DATA |
|---|---|---|
| (DEFAULTS) | REG_SZ | (NO VALUE IS SET.) |
| Action | REG_DWORD | 0x00000000 (0) |
| Attributes | REG_DWORD | 0x00000800 (2048) |
| ChangeID | REG_DWORD | 0x000713dd (463837) |
| Datatype | REG_SZ | RAW |
| Default Dev Mode | REG_BINARY | 43 00 61 00 6e 00 6f 00 6e 00 20 00 69 00 52 00 20 ... |
| Default Priority | REG_DWORD | 0x00000000 (0) |
| Description | REG_SZ | |
| dns Timeout | REG_DWORD | 0x00003a98 (15000) |
| DsKeyUpdate | REG_DWORD | 0x00000000 (0) |
| DsKeyUpdateFor... | REG_DWORD | 0x00000000 (0) |
| Location | REG_SZ | |
| Name | REG_SZ | iR C3200 UFR |
| ObjectGUID | REG_SZ | |
| Parameters | REG_SZ | |
| Port | REG_SZ | IP_172.24.93.164 |
| Print Processor | REG_SZ | WinPrint |
| Printer Driver | REG_SZ | iR C3200 UFR |
| Priority | REG_DWORD | 0x00000000 (1) |
| Security | REG_BINARY | 01 00 04 80 10 00 00 00 0c 01 00 00 00 00 00 14 ... |
| Separator File | REG_SZ | |
| Share Name | REG_SZ | |
| SpoolDirectory | REG_SZ | |
| StartTime | REG_DWORD | 0x00000000 (0) |
| Status | REG_DWORD | 0x00000180 (384) |
| tx Timeout | REG_DWORD | 0x0000afc8 (45000) |
| UntilTime | REG_DWORD | 0x00000000 (0) |
| Customize Code | REG_DWORD | 0x20041224 |

1501 — Status row
1502 — Customize Code row

My Computer ¥ HKEY_LOCAL_MACHINE ¥ SYSTEM ¥ Current ¥ Control ¥ Print ¥ Printers ¥ iR C3200 UFR F I G. 16
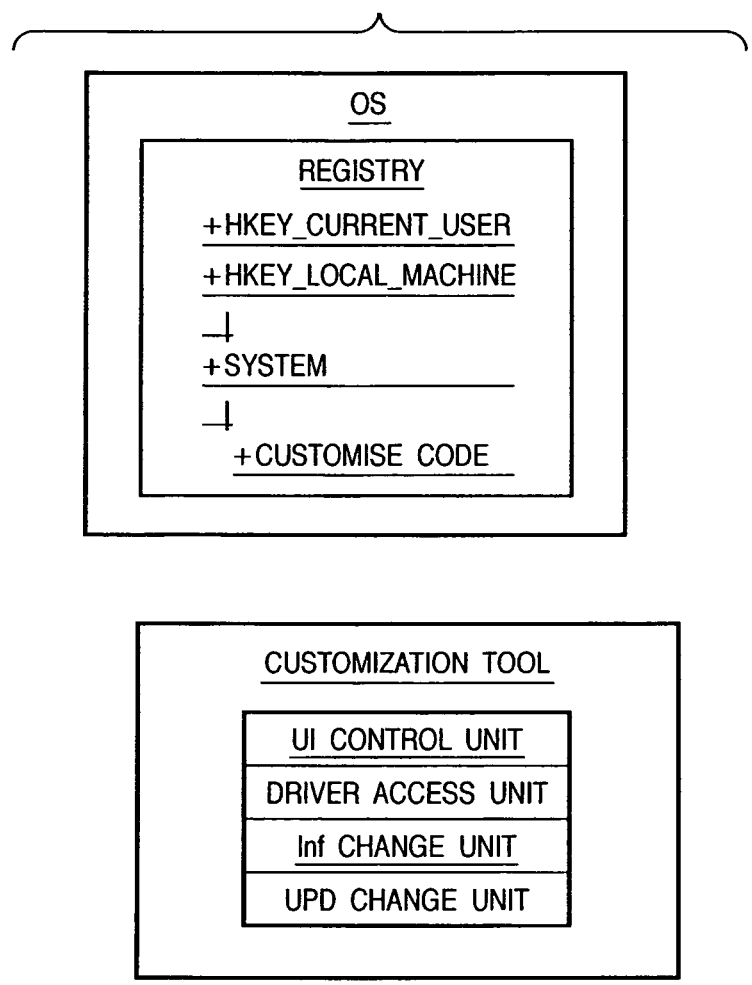

FIG. 18

Clients

[Next] [Cancel] ~1803  ~1804

Client Group   ~1801

| Select | Client Group Name |
|--------|-------------------|
| ■ | area 11 – team A |
| ☐ | area 11 – team B |
| ☐ | area 11 – team C |
| ☐ | area 12 |
| ☐ | area 13 |

Client   ~1802

| Select | Client Name | OS |
|--------|-------------|-----|
| ■ | ClientPC_01 | W2K |
| ■ | ClientPC_02 | W2K |
| ■ | ClientPC_03 | W2K |
| ■ | ClientPC_04 | W9x |
| ■ | ... | ... |
| ■ | ClientPC_n | W9x |

FIG. 19

Association Information

| Select | Driver Name | Device Name | PDL | OS | Language | mise | CUSTOMIZATION VERSION |
|---|---|---|---|---|---|---|---|
| (a) ■ | Device-A_PS_v1200_W2K/W9x_US | Device-A | PS | W2K/W9x | US | | 01 |
| (b) ■ | Device-A_PS_v1000_W2K_JP | Device-A | PS | W2K | JP | | 02 |
| (c) ■ | Device-A_FAX_v300_W2K_JP | Device-A | | W9x | JP | FAX | 03 |
| (d) ■ | Device-B_PCL5e_v500_W2K/W9x_US | Device-B | PCL5e | W2K/W9x | US | | NONE |
| (e) ■ | Device-B_FAX_v300_W2K_US | Device-B | | W2K | US | FAX | 06 |

1904 1905 1901 1906 1907 1908 1902 1909 1910 1903

Delete  OK

FIG. 20

Registration to Schedules

[Task Registration Settings]

| Task Name | | Printer Driver Installation 001 |
|---|---|---|
| Schedule | ☐ | Immediate execution |
| | ■ | Execution at specific date | 2005/3/1 23:00:00 |
| | ☐ | Only registration |
| Notification to Clients | | admin@XXX.YYY.ZZZ |

Register    Cancel

2001

F I G. 21

Driver Install task

| Client Name | Status | INSTALLED DRIVER |
|---|---|---|
| ClientPC_01 | OK | (a)(b)(d)(e) |
| ClientPC_02 | NG(ERR0021) | — |
| ClientPC_03 | OK | (a)(b)(d)(e) |
| ClientPC_04 | OK | (a)(c)(d) |
| ... | ... | ... |
| ClientPC_0n | OK | (a)(c)(d) |

| | | 2401 | | | 2402 | | 2408 2409 2410 | 2411 | | 2413 2414 |

(Figure 24 shows a GUI window titled "ACED2" with menu items FILE (F), HELP (H), END (X), for "CUSTOMIZATION SETTING OF DRIVER". Labeled elements include:)

- DRIVER SET (D): C:¥drv¥W2KI — BROWSE (B)... — 2401
- COMPATIBLE OS (U): Windows 2000/XP
- DRIVER LIST (R): — 2402

| DRIVER NAME | DRIVER SETTING | FAVORITE SETTING | STAMP SETTING | DISPLAY/HIDE CONTROL |
|---|---|---|---|---|
| 87B PCL5e | On | On | On | On |
| 870 PCL5e | | | | |
| 300 PCL5e | | | | |
| 320 PCL5e | | | | |

- 870 PCL5e
- ☐ DRIVER SETTING (I) — PROPERTIES (P)... — 2403, 2404
- FAVORITE NAME (O): — ☐ FAVORITE SETTING (O) — PROPERTIES (E)... — 2405, 2408
- COMMENT (C): — ☐ STAMP SETTING (K) — PROPERTIES (T)... — 2406, 2409
- ☐ SETTING TO DISPLAY/HIDE CONTROL (Y) — SET (G)... — 2407, 2410
- APPLY (A) — CANCEL SETTINGS (L) — 2411, 2412

SAVE DRIVER SET CUSTOMIZATION CODE (U): 0000 (0000~9999)
☐ USE PRE-CONFIGURATION FUNCTION (M)
SAVE TO (Y): — BROWSE (W)... — CREATE (O) — 2413, 2414

F I G. 39

```
typedef struct _devicemode {    /*   dvmd   */
    TCHAR  dmDeviceName[32] ;
    WORD   dmSpecVersion ;
    WORD   dmDriverVersion ;
    WORD   dmSize ;
    WORD   dmDriverExtra ;
    DWORD  dmFields ;
    short  dmOrientation ;
    short  dmPaperSize ;
    short  dmPaperLength ;
    short  dmPaperWidth ;
    short  dmCopies ;
} DEVMODE ;
```

F I G. 41
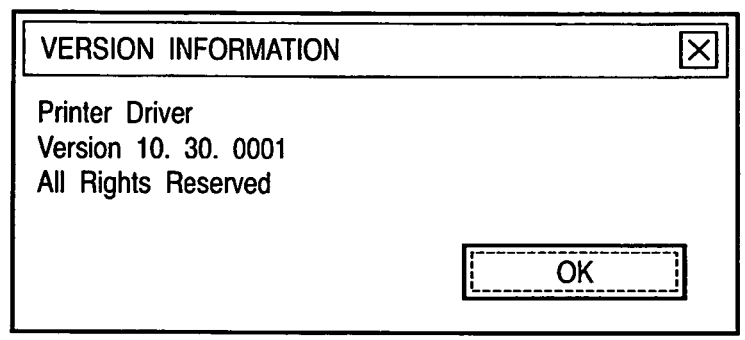

INFORMATION PROCESSING APPARATUS FOR CUSTOMIZING PRINTER DRIVER PROGRAM, AND METHOD OF CUSTOMIZING PRINTER DRIVER PROGRAM

FIELD OF THE INVENTION

The present invention relates to an information processing technique of customizing a device driver such as a printer driver.

BACKGROUND OF THE INVENTION

There has conventionally been a demand to customize, in accordance with the installation environment of a printing system, a printer driver program (to be referred to as a printer driver hereinafter) which controls a printer for use. Particularly in recent years, the use mode of the printer is diversified depending on the customer, and the demand to customize the printer driver is increasing.

In order to meet this demand, the vendor of a printer driver provides the user with a customization system even for a conventional printer driver. An example of an item customizable by the customization system is a limitation on changing print settings by the user. In general, the user can change print setting values from the user interface (to be simply referred to as a "UI" hereinafter) of the printer driver. However, the printer driver can be customized to limit a change of a designated item so as to inhibit the user from changing print setting values. In this specification, the limitation on changing print settings will be called input control. Print setting items subjected to input control can be designated when the printer driver is customized.

References which disclose the customization technique are, for example, patent references 1, 2, and 3:

[Patent Reference 1] Japanese Patent Laid-Open No. 8-278871

[Patent Reference 2] Japanese Patent Laid-Open No. 2002-297341

[Patent Reference 3] Japanese Patent Laid-Open No. 2003-150341 (paragraphs 0011 to 0014)

A printer driver customized by a conventional customization system is assigned a unique code (custom driver code) for identifying the printer driver as a customized one. The custom driver code cannot be referred to from another program module or the like. It cannot be externally determined whether the computer uses the customized driver.

Assume that there is a network system which obliges a connected computer to use a customized printer driver. Even if the customized printer driver is used, it is difficult for the system administrator to know the use of the customized printer driver, i.e., it is difficult to manage the system. In some cases, an installed driver is overwritten by installing a driver of a new version using an installer. Also at this time, the installer cannot grasp that the installed driver is a customized one. For this reason, the new driver cannot inherit information (to be referred to as customization information) unique to customized items.

The following problem also occurs. Patent reference 3 proposes a driver installer which prompts the user to select limitations on functions of a driver in installing the driver, and interactively sets functions under the selected limitations.

Patent reference 2 proposes a method of simplifying customization operation. More specifically, the user registers, as a parameter file in a server, the values of various parameters used for functions of a printer driver. After the end of printer driver install processing by the install processing unit of the installer, a parameter request unit requests parameter values of the server. A parameter receiving unit receives the parameter values from the server, and transfers them to the parameter change unit of the printer driver to change the parameter values.

The installer in patent reference 3 must change information on print settings (to be also referred to action settings) for each computer to values suitable for the configuration or environment. This installer is not suited to installation of many computers or centralized management by the system administrator or the like. According to the method in patent reference 3, the print function of a printer driver installed in the PC of each user cannot be limited at the discretion of the system administrator (IT manager).

According to the method in patent reference 2, no driver can be installed unless a complicated parameter file is prepared in advance. There must be provided an environment in which a server and client can communicate with each other via a network. The system environment is limited.

SUMMARY OF THE INVENTION

The present invention has been made in consideration of the conventional situation, and has as its object to provide an information processing technique capable of referring to a registry from an external program, and determining whether an installed printer driver is a customized one.

It is another object of the present invention to provide an information processing technique of, when updating a printer driver by an installer, allowing the installer to determine whether the driver to be updated is a customized one, and accurately inheriting customization information.

It is still another object of the present invention to easily customize a device driver, especially a printer driver to be installed in a plurality of computers in accordance with the environment or the configuration of a device for use.

It is still another object of the present invention to limit a change of detailed settings related to a stamp to be overlaid on a print image among action settings. This object is to limit a change of default settings of a stamp such as a setting of whether to enable or disable overlay of a stamp image, and the setting of a stamp list (a list of character strings and images such as "eyes-only" "confidential", "draft", and "copy").

A so-called "favorite" (also called a profile) is sometimes prepared in action setting information of a device driver by registering the values of the action setting information at once. The favorite is prepared as a file of parameters which form the action setting information. By designating a favorite file to be applied, parameter values contained in the action setting information are replaced at once. The favorite may also be contained in defaults of the action setting information.

However, the favorite prepared as a default is limited to only one set. If default action settings are replaced with action settings registered in the favorite, even limitations which are posed on some device functions by default settings may be changed. That is, the aim of functional limitations may not be achieved.

It is, therefore, still another object of the present invention to easily customize a set of action setting information of a device driver, i.e., a so-called "favorite" or "profile", and implement a strict application of limitations on available functions.

In order to achieve the above objects, an information processing technique according to the present invention comprises the following arrangement.

That is, an information processing apparatus which customizes a device driver for controlling an image forming apparatus comprises issuing means for issuing identification information for specifying a customized driver, and storage means for storing the identification information issued by the issuing means, in association with the customized driver.

According to the present invention, whether an installed printer driver is a customized one can be determined by referring to a registry from an external application tool.

Even when the installer updates a driver, it can be determined from the driver information whether the driver is a customized one, and customization information can be accurately inherited.

According to the present invention, a device driver, especially a printer driver to be installed in a plurality of computers can be quickly, easily customized in accordance with the environment or the configuration of a device for use.

Editing of default settings associated with a stamp to be overlaid on a print image, and the like can be done in accordance with a user's request.

Further, the profile of action setting information of a device driver can be easily customized, and loopholes in functional limitations through the profile can be prevented.

Other features and advantages of the present invention will be apparent from the following description taken in conjunction with the accompanying drawings, in which like reference characters designate the same or similar-parts throughout the figures thereof.

BRIEF DESCRIPTION OF THE DRAWINGS

FIGS. 7A to 7C are views illustrating the description contents of an inf file which describes install information of a printer driver;

FIG. 10B is a table showing the relationship between the API and a corresponding pseudo-API;

FIG. 15 is a view illustrating the display window of a registry editor when the customization code is registered in a specific registry;

FIG. 16 is a conceptual view showing a state in which the customization code is stored in a customization code registry and the RAM of the client PC of the customization tool;

FIG. 18 is a conceptual view showing an example of a server UI to generate a driver install task;

FIG. 19 is a conceptual view showing an example of a server UI to generate the driver install task;

FIG. 20 is a view showing an example of a server UI to set scheduling of the driver install task;

FIG. 21 is a view showing the results of executing an install task;

FIG. 24 is a view showing an example of executing a printer driver customization tool UI;

FIG. 39 is a view showing an example of the data structure of a device mode (DEVMODE) according to the embodiment;

FIG. 41 is a view showing an example of version display of the printer driver according to the third embodiment;

DETAILED DESCRIPTION OF THE PREFERRED EMBODIMENTS

First Embodiment

A preferred embodiment of the present invention will be described below with reference to the accompanying drawings. The first embodiment will exemplify a method of customizing a printer driver for Windows® which is a PC OS (Operating System) available from Microsoft®.

Figure 1:
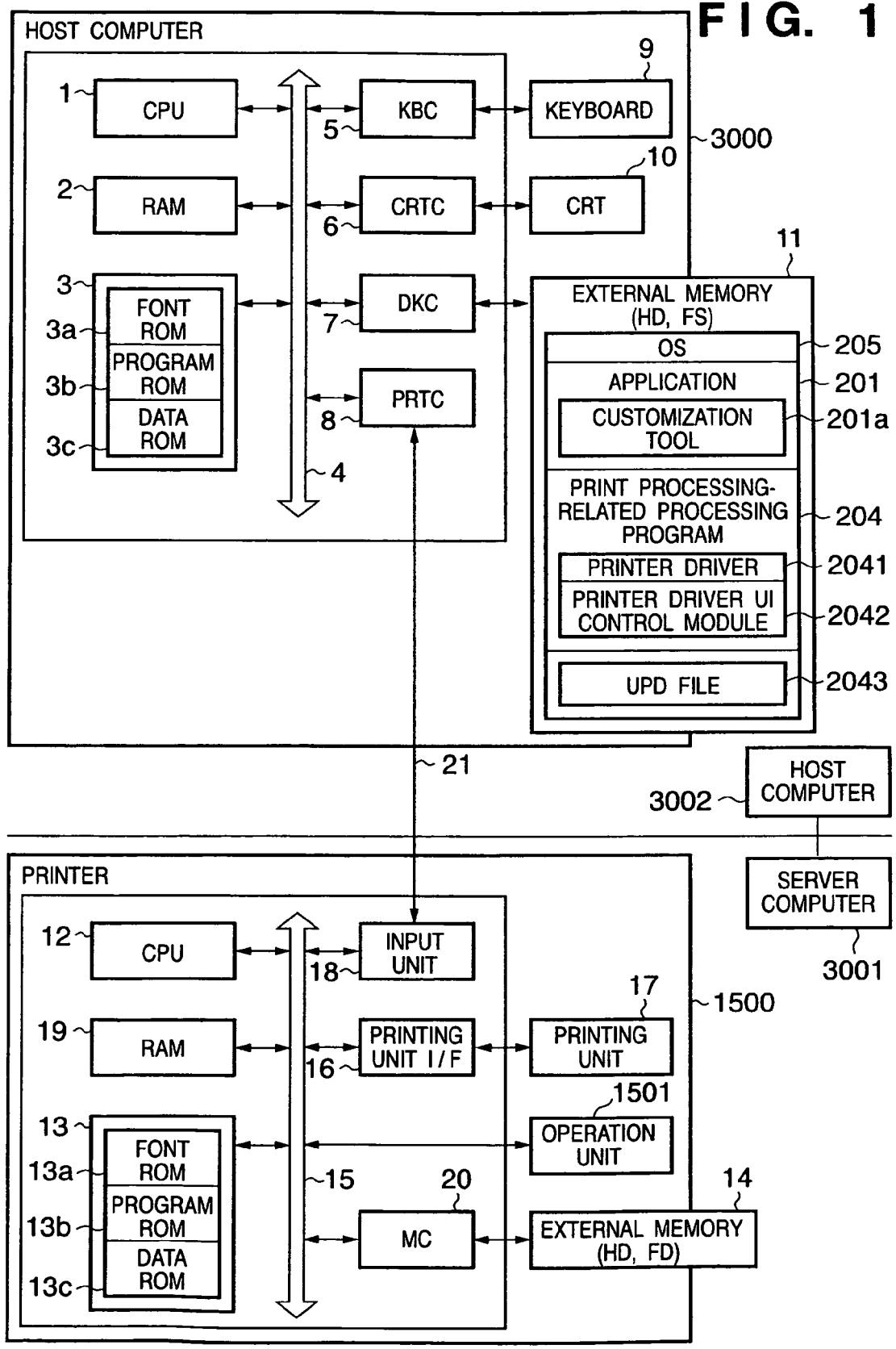
FIG. 1 is a block diagram showing the configuration of a print processing system according to the first embodiment of the present invention.

FIG. 1 is a block diagram showing the configuration of a print processing system according to the first embodiment of the present invention. The print processing system comprises an information processing apparatus (to be also referred to as a "host computer" hereinafter) 3000, and a printer 1500 which prints upon reception of print data from the host computer 3000. The host computer 3000 and a host computer 30002 are provided with services by a server 3001. Hence, the host computers 3000 and 3002 are also called client computers (or clients).

In the host computer 3000, a CPU 1 comprehensively controls each device connected to a system bus 4 in accordance with programs stored in a RAM 2. The RAM 2 also functions as a main memory, work area, and the like for the CPU 1. A ROM 3 stores various programs and data. The ROM 3 stores various programs and data, and is divided into a font ROM 3a for storing various fonts, a program ROM 3b for storing a boot program, BIOS, and the like, and a data ROM 3c for storing various data.

A keyboard controller (KBC) 5 controls a key input from a keyboard (KB) 9 or a pointing device (mouse: not shown). A CRT controller (CRTC) 6 controls display on a CRT display (CRT) 10. A disk controller (DKC) 7 controls access to an external memory 11 such as a hard disk. A printer controller (PRTC) 8 is connected to the printer 1500 via a bidirectional interface 21, and executes communication control processing with the printer 1500.

The external memory 11 is a hard disk (HD), MO, flexible disk (FD), or the like. As shown in FIG. 1, the external memory 11 stores an operating system program (to be referred to as an OS hereinafter) 205, various applications (e.g., a document processing application program which processes a document containing a figure, image, text, table, and the like) 201, and a print processing-related program 204. In addition, the external memory 11 stores a user file, edit file, and the like. The print processing-related program 204 generates print data described using a page description language, and can be utilized commonly by a plurality of printers of the same series. The print processing-related program 204 contains a printer control command generation module (to be referred to as a printer driver hereinafter) 2041, and a printer driver UI control module 2042. The hard disk 11 also saves an install set containing a program file and data file for installing a printer driver. The printer driver install set in the first embodiment is information for installing a printer driver in a computer. The printer driver install set may be formed from an install definition file (called an inf file) for installing a printer driver by using an install program provided by the OS, a printer driver information file (also called a UPD (User-interface Printer Description) file), and a program file such as a printer driver. Alternatively, the printer driver install set may be formed from an installer containing a file of the execution form (exe file). A set of files prepared by excluding the install definition file from the install set will be called a driver set.

The default values (initial values) of print settings and control display setting information that are designated via a control setting UI (to be described later) are saved in a printer driver information file (UPD file) 2043. Parameters for driving control of the printer driver, for example, print setting information which defines print settings such as the paper size and whether to perform double-sided printing, are also saved in the external memory 11 and referred to by the printer driver. Information (e.g., print settings and control display settings) which can be set from a driver UI and customization tool will be called printer properties (or simply properties). In particular, printer setting information customized by a customization tool according to the first embodiment will be called customization information.

The application 201 which is stored in the external memory 11 and contains a customization tool program (to be simply referred to as a customization tool hereinafter) 201a according to the first embodiment is loaded into the RAM 2 and executed by the CPU 1. The CPU 1 executes, e.g., outline font rasterization processing to the RAM 2, and enables WYSIWYG (What You See Is What You Get) on the CRT 10. The CPU 1 opens various registered windows and executes various data processes on the basis of commands designated with a mouse cursor (not shown) on the CRT 10 or the like. When the user executes printing, he opens a print setting window (controlled by the printer driver UI control module 2042), and can make settings of a printer and settings of print processing to the printer driver 2041, including selection of the print mode. Note that the customization tool is not always executed in a computer in which a printer driver to be customized is installed. It is also possible to execute the customization tool in a computer other than the computer 3000, customize the printer driver, generate an install set, and install it in the computer 3000. In the first embodiment, settings in a UI (shown in FIG. 4 and the like) provided by the printer driver will be called print settings, and settable items will be called print setting items. Thus, print setting items are not always directly associated with printing.

The arrangement of the printer 1500 will be explained. A CPU 12 controls the overall action of the printer 1500. A RAM 19 functions as a main memory, work area, and the like for the CPU 12, and is also used as an output information rasterization area and environment data storing area. The RAM 19 also comprises an NVRAM (Non-Volatile RAM) area, and is so constructed as to increase the memory capacity by an optional RAM which is connected to an expansion port (not shown). A ROM 13 comprises a font ROM 13a storing various fonts, a program ROM 13b storing a control program and the like which are executed by the CPU 12, and a data ROM 13c storing various data. An input unit 18 exchanges data with the host computer 3000. A printing unit interface (I/F) 16 controls an interface with a printing unit 17 serving as a printer engine.

Access to an external memory 14 is controlled by a memory controller (MC) 20. The external memory 14 includes a hard disk (HD), magneto-optical disk (MO), Floppy® disk (FD), and IC card which are connected as options. The external memory 14 stores font data, an emulation program, form data, and the like. When no external memory 14 such as a hard disk is connected, the data ROM 13c of the ROM 13 stores information and the like which are used by the host computer 3000. Note that the number of external memories 14 is not limited to one, and a plurality of external memories 14 may also be adopted. For example, a plurality of external memories which store an optional font card and a program for interpreting the printer control languages of different language systems in addition to built-in fonts may be connected. The host computer (also referred to as a client PC) 3002 and a server computer (also referred to as a server computer) 3001 have the same hardware configuration as that of the host computer. Although not shown, N host computers may be connected to a network.

An operation unit 1501 has an operation panel which accepts a user operation, and the operation panel is equipped with an operation switch, LED display, and the like (not shown). The operation unit 1501 has an NVRAM (Non-Volatile RAM: not shown), and stores printer mode setting information from the operation panel.

The CPU 12 outputs an image signal as output information to the printing unit (printer engine) 17 via the printing unit interface 16 on the basis of a control program stored in the program ROM 13b of the ROM 13. The CPU 12 can communicate with the host computer 3000 via the input unit 18. The CPU 12 can receive print data transmitted from the host computer 3000, and notify the host computer 3000 of information or the like in the printer 1500.

Figure 2:
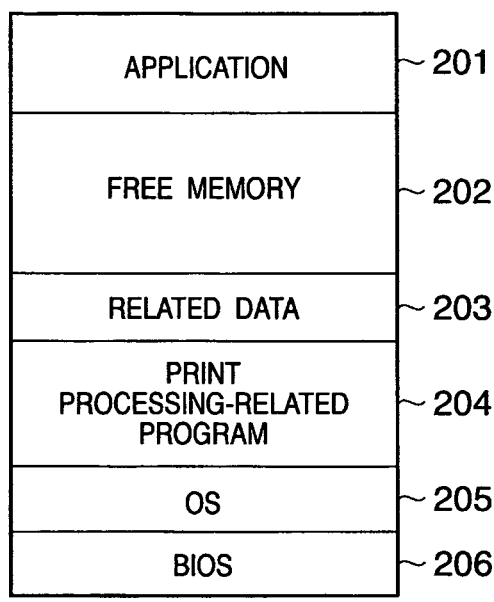
FIG. 2 is a view showing the memory map of a RAM 2 when a predetermined application and a program related to print processing are activated, and programs and data are loaded into the RAM 2 of a host computer 3000.

FIG. 2 is a view showing the memory map of the RAM 2 when a predetermined application and the program related to print processing are activated, and programs and data are loaded into the RAM 2 of the host computer 3000.

As shown in FIG. 2, the application 201, the print processing-related program 204, and related data 20.3 are loaded into the RAM 2 in addition to a BIOS 206 and the OS 205. A program (to be referred to as a customization tool hereinafter) for customizing a driver is also loaded into the RAM 2. A free memory area 202 is also ensured in the RAM 2. In this state, the application 201 and print processing-related program 204 can be executed. Note that the printer driver UI control module 2042 (FIG. 1) in the print processing-related program 204 displays a print setting window on the CRT 10 in accordance with a print setting instruction from the user, and allows setting by the user using the KB 9 or the like.

Figure 3:
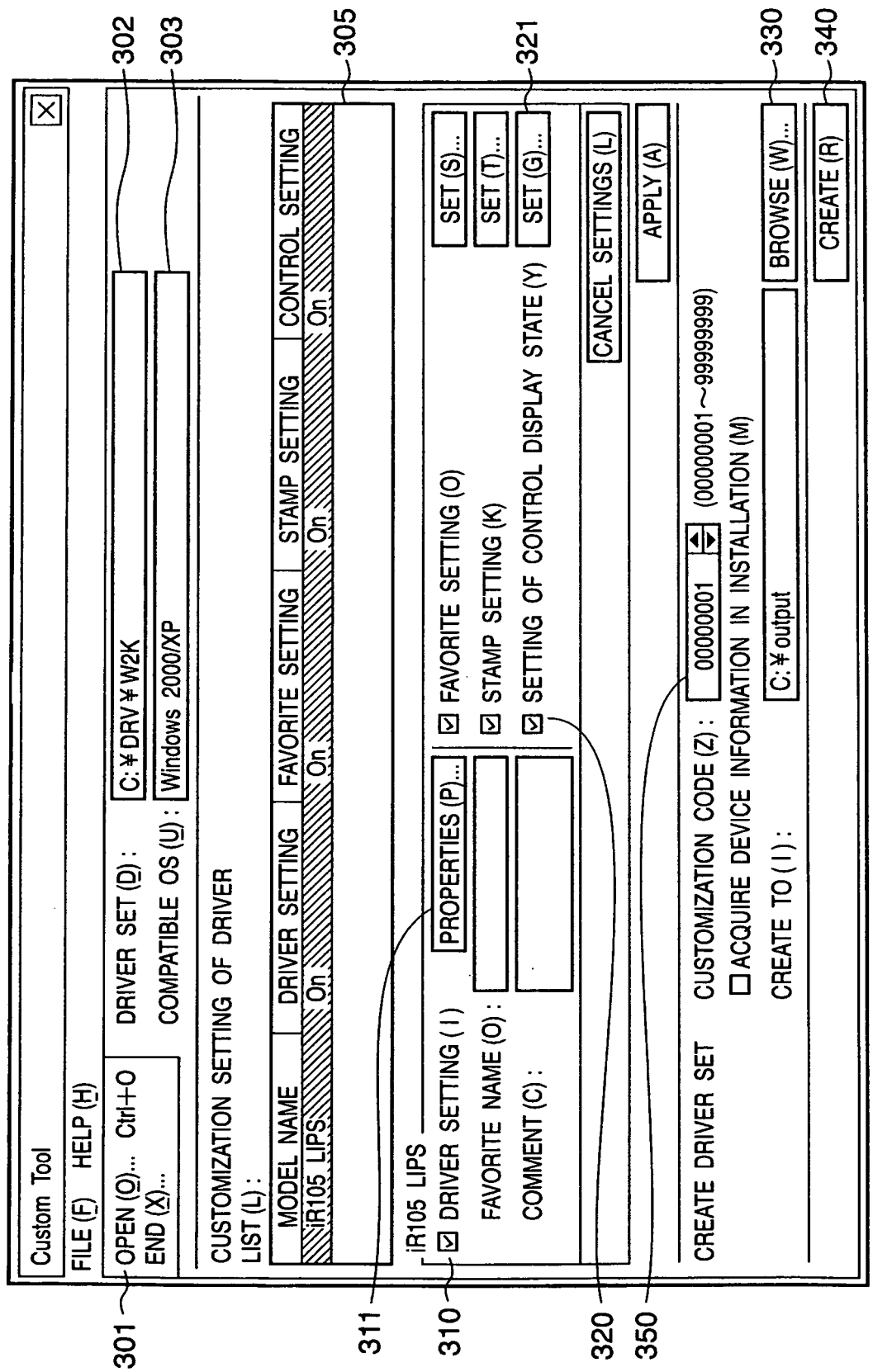
FIG. 3 is a view illustrating the UI of a customization tool.

FIG. 3 is a view illustrating the UI of the customization tool. The customization tool according to the first embodiment runs on Windows®2000/XP/Server 2003, and can customize printer drivers intended for Windows® 98/ME, Windows® NT4.0, and Windows® 2000/XP/Server 2003. However, the gist of the present invention is not limited to these OSs. For other OSs, an API action corresponding to an OS can be simulated by a pseudo-API (contents of which will be explained in detail below) without actually installing any printer driver. By using the pseudo-API, the settings of arguments which execute individual functions can be changed and added.

In FIG. 3, when the user designates "open" from a menu 301, a dialog (not shown) for designating the folder of a driver set to be customized is displayed. Through this dialog, the user can designate the store destination of the driver to be customized. The designated folder is displayed in a display field 302, and an OS which supports the designated driver set is displayed in a display field 303. Note that the driver set is saved as an install set together with an inf file which describes install information of the driver. Hence, designation of a driver set means designation of an install set.

A list view 305 displays a model name corresponding to a printer driver to be customized. The list view 305 also displays an identification display "On" for a customized setting. When a check box 310 is checked, a button 311 is enabled. When the button 311 is clicked, a customization printer driver UI (FIG. 4) is displayed. On this UI, initial values such as the initial values of print settings (document properties), and the settings (printer properties) of a device can be set. Note that the document properties and device properties are sometimes called properties at once. Also, the properties are sometimes called print settings or print setting information.

When a check box 320 is checked, a button 321 is enabled. When the button 321 is clicked, a UI (FIG. 5) for customizing a control display method on the printer driver UI is displayed. Through this UI, the control display method on the customization printer driver UI can be set.

When a button 330 is clicked, a dialog (not shown) for designating the creation destination of a customized driver is displayed to allow designating the creation destination of the customized driver.

When a spin box 350 is operated or a value is input, the input value is held in a driver information file as specifying information (to be referred to as "customization code" hereinafter) for uniquely specifying a customized driver. Note that the specifying information is also called identification information.

When a button 340 is clicked after various settings are made, a printer driver which is customized in accordance with the settings is created.

Figure 4:
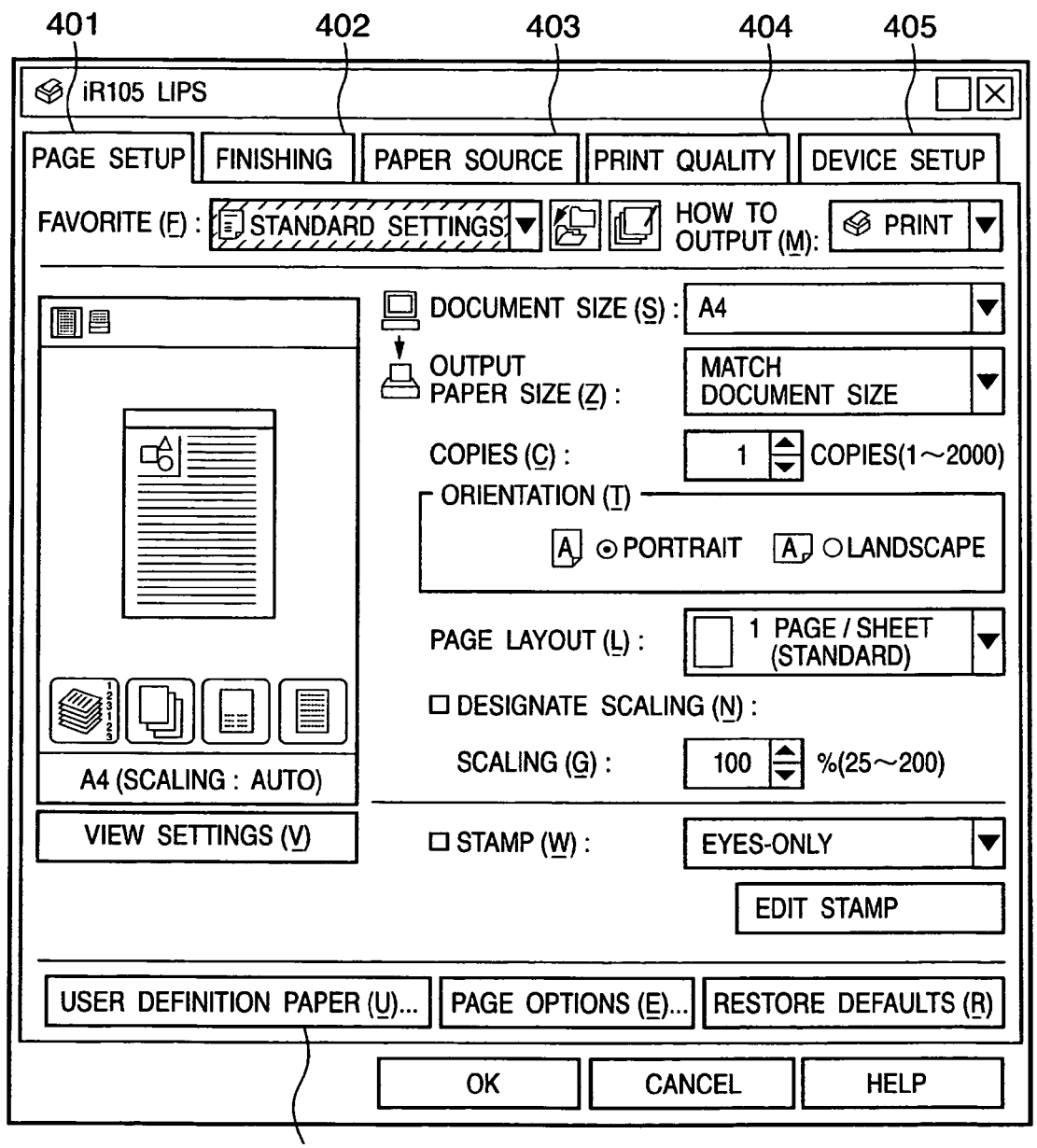
FIG. 4 is a view showing a printer driver UI for customizing initial setting values.

FIG. 4 shows a printer driver UI (initial setting value customization UI) which is displayed upon a click of the button 311 in the UI of FIG. 3 and is used to customize the initial setting values of a printer driver (to be also simply referred to as a "driver" hereinafter).

The customization tool functions as the setting unit of the information processing apparatus under the control of the CPU 1. The setting unit displays, on the CRT, a setting window for setting document properties and device properties as shown in the UI window in FIG. 4.

Installed printer drivers for Windows® NT4.0 and Windows® 2000/XP/Server 2003 do not simultaneously display, in one UI window, a document property UI for setting a document and a printer property UI for setting a device. To the contrary, a printer driver UI, which is displayed by the customization tool according to the embodiment of the present invention, is displayed by the customization tool using the module of a printer driver. In this UI, the document property UI for setting a document and the printer property UI for setting a device are simultaneously displayed in one UI window (FIG. 4). In FIG. 4, four UIs, i.e., a page setup UI 401, finishing UI 402, paper source UI 403, and print quality UI 404 can be displayed as document property UIs. A device setting UI 405 can be displayed as a printer property UI. Through the UIs 401 to 405, the system administrator or the like can set the initial values of document properties and those of printer properties.

As for a setting not to be customized, no setting input from the user is accepted in the UI shown in FIG. 4. Setting items not to be customized are grayed out, like a button 410 in FIG. 4, so that the user can recognize that these items are not subjected to customization.

Figure 5:
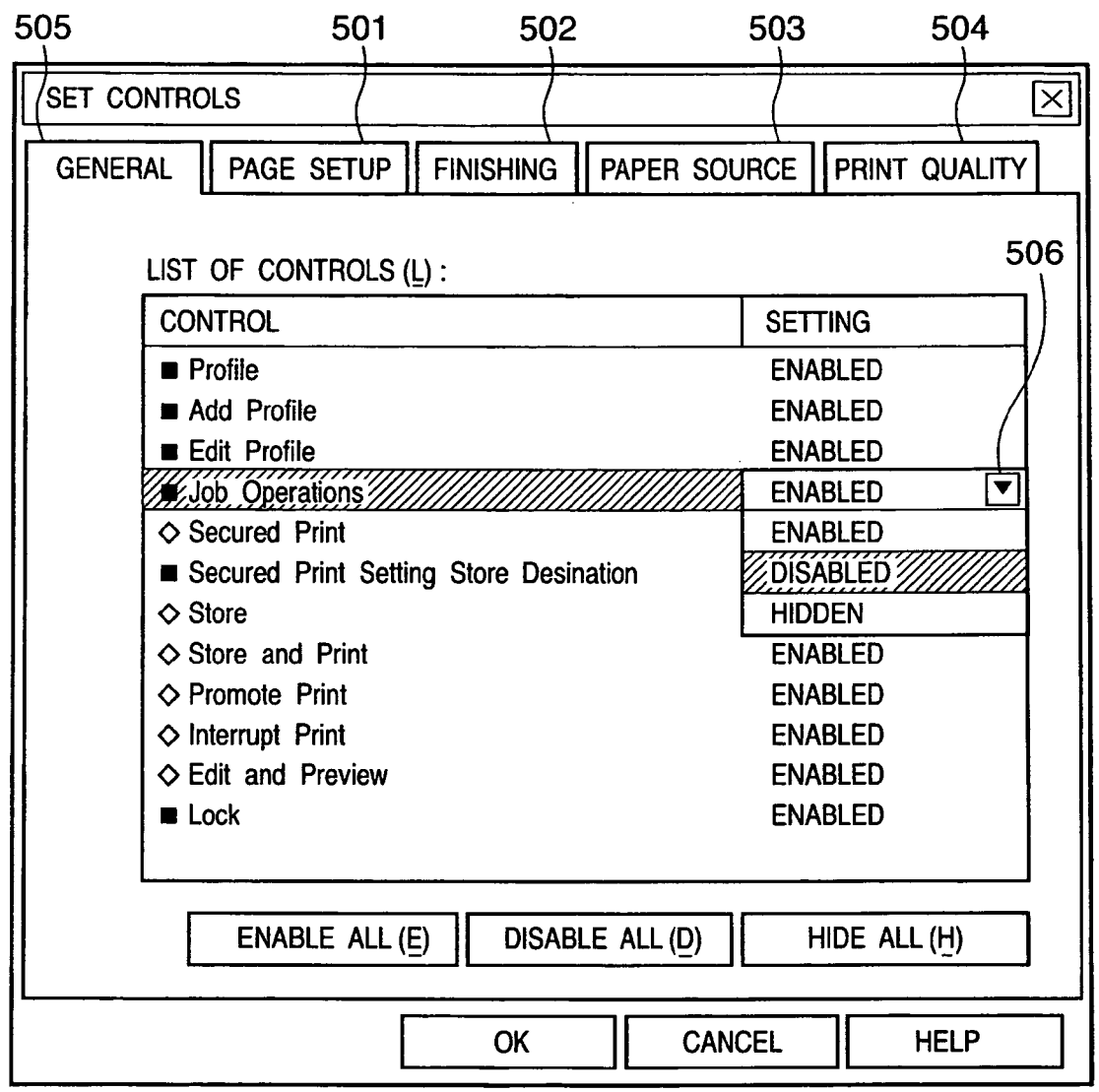
FIG. 5 is a view illustrating a document property display control setting UI.

FIG. 5 is a view illustrating a UI (to be referred to as a control setting UI hereinafter) for designating whether to permit or inhibit operating various controls displayed in the document property UI. Note that the controls are operation objects such as a push button, edit box, radio button, check box, and scrollbar displayed in the UI. The control setting UI is displayed on the CRT 10 of the host computer 3000 when the button 321 in FIG. 3 is clicked. In the window example shown in FIG. 5, the user can designate the display states of the controls of print setting items in five categories "page setup", "finishing", "paper source", "print quality", and "general" which can be set in the document properties. In the first embodiment, designation of the display state of the control will be called control setting. In FIG. 5, a property sheet corresponding to each category included in the document property UI is displayed in the control setting UI. Property sheets include a page setup sheet 501, finishing sheet 502, paper source sheet 503, and print quality sheet 504. The controls of setting items are displayed on the sheets 401 to 404 of the document property UI in accordance with control settings designated on the sheets 501 to 504. For example, a control for which it is designated that the operation is disabled is grayed out to inhibit any user operation. The value of the corresponding print setting item cannot be changed from a default value. Whether the value of a print setting item can be changed is controlled through display control of the control. On a general sheet 505, display control common to the page setup sheet 501, finishing sheet 502, paper source sheet 503, and print quality sheet 504 can be set.

A display field 506 concretely represents the setting of the control of a print setting item "Job Operations". In the first embodiment, one of "Enabled (normal display)", "Disabled", and "Hidden" can be designated as the control setting. Similarly, "Enabled", "Disabled", or "Hidden" can be individually set for the controls of the remaining print setting items, thereby controlling display of the document property UI. When the user inputs these settings, the customization tool writes information corresponding to the input in a UPD file. When "Disabled" or "Hidden" is designated for a given control, the control cannot be operated. Hence, a print setting using this control cannot be changed. To the contrary, when "Enabled" is designated for a given control, a print setting using the control can be changed.

The customization tool functions as the display control unit of the information processing apparatus under the control of the CPU 1. The display control unit can control, on the basis of set document properties (including control items), whether to enable, disable, or hide an item in the user interface (UI).

<Action of Customization Tool>

Figure 6:
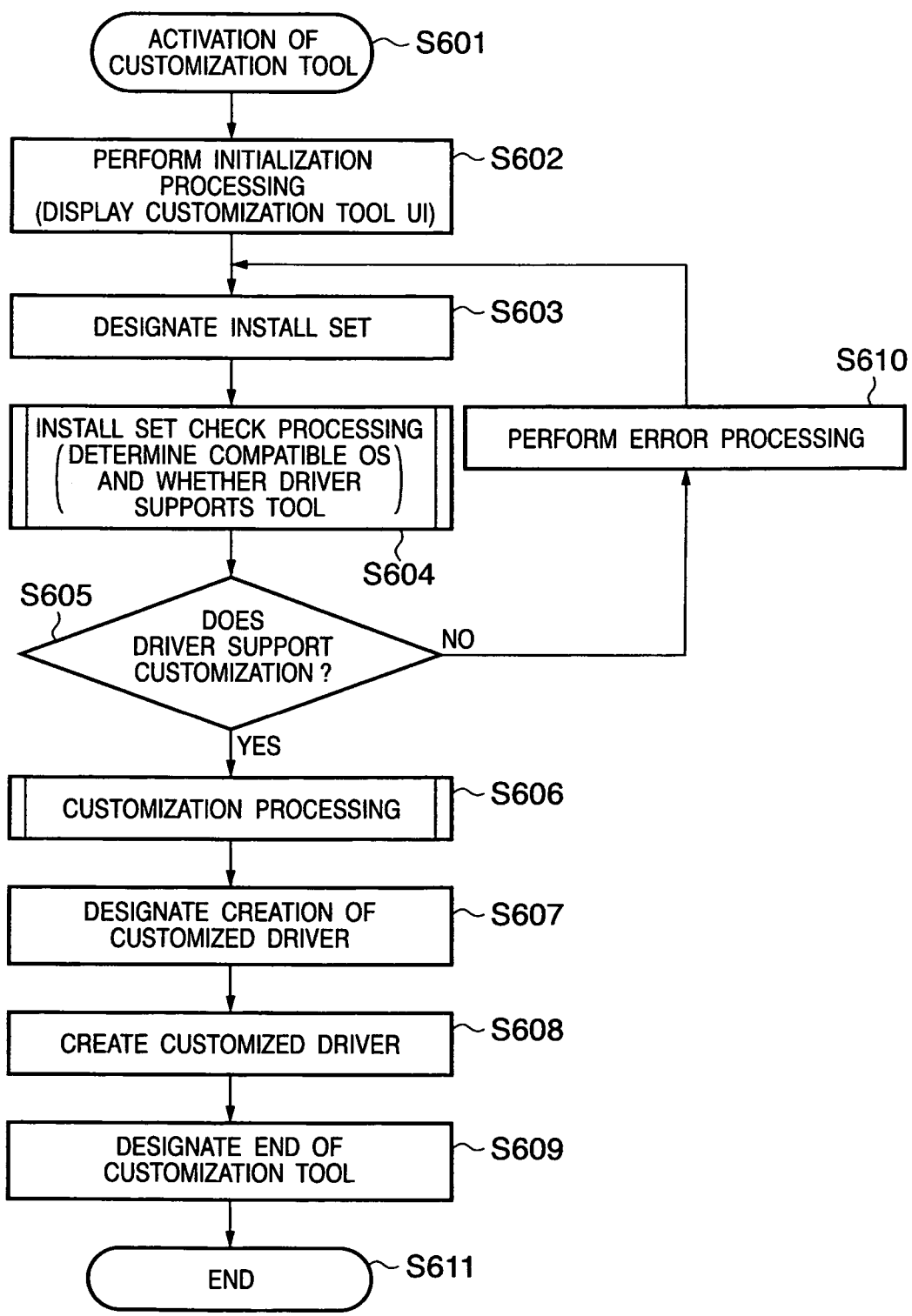
FIG. 6 is a flowchart for explaining the flow of processing of a basic action in the customization tool.

The basic action of the customization tool 201*a* will be explained with reference to the flowchart of FIG. 6. In executing the basic action, the CPU 1 of the host computer 3000 serves as an operation entity to execute the customization tool. In the following description, the customization tool 201*a* sometimes serves as an execution entity to execute processing. In practice, the CPU 1 executes processing.

In step S601, the user activates the customization tool to perform initialization processing for the customization tool. In step S602, the customization tool displays the UI window shown in FIG. 3 on the CRT 10. In step S603, the user designates the install set of a printer driver to be customized from the UI window of FIG. 3. In step S604, the customization tool checks the designated install set. In the install set check processing, the customization tool opens a file (inf file) which corresponds to the designated driver set and describes install information of the printer driver. From the description contents (e.g., the values of signatures 700, 710, and 720) of the opened inf file, the customization tool determines whether the OS can support the designated install set and whether the designated printer driver supports customization by the customization tool.

FIGS. 7A to 7C are views illustrating the description contents of the inf file which describes install information of the printer driver. FIGS. 7A to 7C show examples of some inf files. FIG. 7A shows an example of an inf file for Windows® 98/ME. FIG. 7B shows an example of an inf file for Windows® NT4.0. FIG. 7C shows an example of an inf file for Windows® 2000/XP/Server 2003. Each inf file contains module description information (not shown). Based on the module description information, the customization tool can specify a module which performs UI processing of the printer driver. The customization tool executed by the CPU 1 refers to the settings of "Signatures" 730, 740, and 750 in the inf files 700, 710, and 720. If the signature represents a character string resource "$CHICAGO$", the customization tool determines that the printer driver is intended for Windows® 98/ME.

If the "Signature" setting in a referred inf file represents a character string resource "$Windows NT$", the customization tool determines that the driver set is intended for Windows® NT4.0 or Windows® 2000/XP/Server 2003. For a driver set which is determined from the signature to be intended for Windows® NT4.0 or Windows® 2000/XP/Server 2003, the customization tool refers to "DISK1"s 760 and 770 in the inf files (710 and 720) in order to narrow down driver sets. If the set character string resource of DISK1 contains "NT", the customization tool determines that the driver set is intended for Windows® NT4.0, and if no "NT" is contained, determines that the driver set is intended for Windows® 2000/XP/Server 2003.

The inf file of a printer driver which supports customization contains a specific character string resource in order to represent that the printer driver supports customization. The customization tool determines whether the specific character string resource is contained in the inf file of the printer driver, and thereby can determine whether the corresponding printer driver supports customization.

Referring back to FIG. 6, if the customization tool determines in step S605 that the printer driver does not support customization (NO in S605), the processing advances to step S610 to perform error processing, and then returns to the install set designation step (S603). In error processing, for example, a message which notifies the user that the designated driver set does not support customization is displayed.

If the customization tool determines in step S605 that the printer driver supports customization (YES in S605), the processing advances to step S606. In step S606, the customization tool controls the CRTC 6 to display the UI windows shown in FIGS. 3 to 5 on the CRT 10 and allow customized settings of the printer driver. The UIs in FIGS. 3 to 5 are displayed by the customization tool using a printer driver UI module. Settings input via the UIs in FIGS. 3 to 5 are customized data. The customized data are saved in a UPD file serving as a file readable by the printer driver. Upon installation, the printer driver loads setting values from the UPD file. The printer driver reflects the customized setting values of the UPD file on the print setting items of the printer driver. For example, preset print setting values (double-sided, in, and the like) which are often used are reflected in the printer driver in advance. The control of the print setting item is displayed in accordance with designation in the UI of FIG. 5. By only installing a customized driver, often-used print setting values and customized default values are set in the printer driver. Not only the values of print setting items but also controls for operating print setting items are customized.

Through the UI windows in FIGS. 3 to 5, settings associated with customization of the printer driver are made to designate customization (S607). Then, the customization tool creates a customized driver set on the basis of the contents (customized data) designated in the UI windows. Note that the customized driver set is also called a customized driver. In the customized driver, no program code of the driver is changed, but the default values of print setting items and whether to enable or disable changing the default values are customized. In step S608, setting information (the default values of print settings, display designation of each control, and the like) of the customized printer driver is saved in the UPD file. An install set containing the UPD file, printer driver program, printer driver UI control program, and the like is created.

The customization tool is executed by the CPU 1, and functions as a customized driver generation unit. The customized driver generation unit generates a customized driver by writing set document properties or device properties in the printer driver information file (UPD file) of the printer driver (device driver).

More specifically, in customized driver creation processing, the customization tool copies an install set to be customized to a location (creation destination) where the customized driver is to be saved. After that, the customization tool writes customized data in the printer driver information file (UPD file) contained in the install set which is copied to the creation destination. As a result, the customized driver is created. Note that the customized data are setting values input by the user via the UIs in FIGS. 3 to 5 that are provided by the customization tool.

Figure 9:
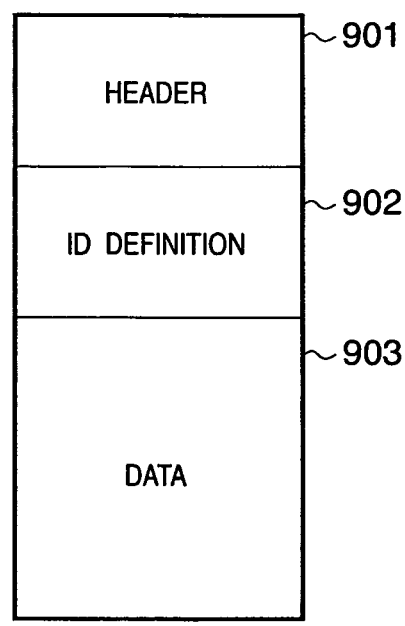
FIG. 9 is a view for explaining the data format of a UPD file which forms a printer driver.

FIG. 9 is a view for explaining the data format of the printer driver information file (UPD file) 2043 serving as a file which forms a driver set. As shown in FIG. 9, the UPD file is made up of a header 901, ID definition 902, and data 903. The ID definition 902 stores a pair of a data ID stored in the data 903 and the storage location (address) of the data. A set of ID-address pairs by the number of IDs is stored. The customization tool according to the first embodiment changes a data value corresponding to an ID defined for customization. When the ID definition 902 does not define the ID of customized data for use, a new ID corresponding to the customized data is added to the ID definition 902.

A UPD file exists for each device driver (printer driver) (for each model), and can be customized in a different way for each model. For example, a customized driver set corresponding to a given model can be used to customize a driver of another model. Since the ID definition 902 uses a customization ID, a printer driver of a new version can inherit the settings of a previously customized printer driver.

Upon installation or initial activation, a customized printer driver loads a UPD file which describes customized data, and loads the data 903 which is stored in correspondence with a predetermined ID of the ID definition 902 of the UPD file. Assume that a UPD file created by the customization tool stores, in the ID definition 902, an ID "CUSTOMIZED" and an address X representing the storage location of the data.

When the ID information "CUSTOMIZED" is stored in the ID definition 902 of an open UPD file upon the completion of installation or upon initial activation, the customization-compatible printer driver reads out the address X corresponding to the information. Subsequently, the printer driver further reads out the data structure of a device mode serving as actual driver setting data from the data 903 stored at the address X. In this case, the address X may be an absolute address. Alternatively, the start address of the data 903 may be stored in the header 901, and an offset address from the start address of the data 903 may be set as the address X.

The customization tool is executed by the CPU 1, and functions as a display control unit for displaying a customization UI. The display control unit can display a user interface on the CRT 10 by referring to the information file of the printer driver upon activation of the customization tool.

In the first embodiment, the customization tool writes, as customized data in the UPD file, (i) default value data (data set from the UIs 401 to 404 in FIG. 4) associated with document properties for setting a document, (ii) default value data (set from the UI 405 in FIG. 4) associated with printer properties for setting a device, and (iii) data (data set from the UI window on FIG. 5) associated with the control display method on the document property UI. Upon the completion of installation or upon the activation, the customized printer driver loads the UPD file created by the customization tool, and acts on the basis of the customization information. Accordingly, the action environment of the customized printer driver can be easily constructed.

Referring back to FIG. 6, if the user designates the end of processing (S609) after the customized driver is created (S608), the action of the customization tool ends.

Figure 8:
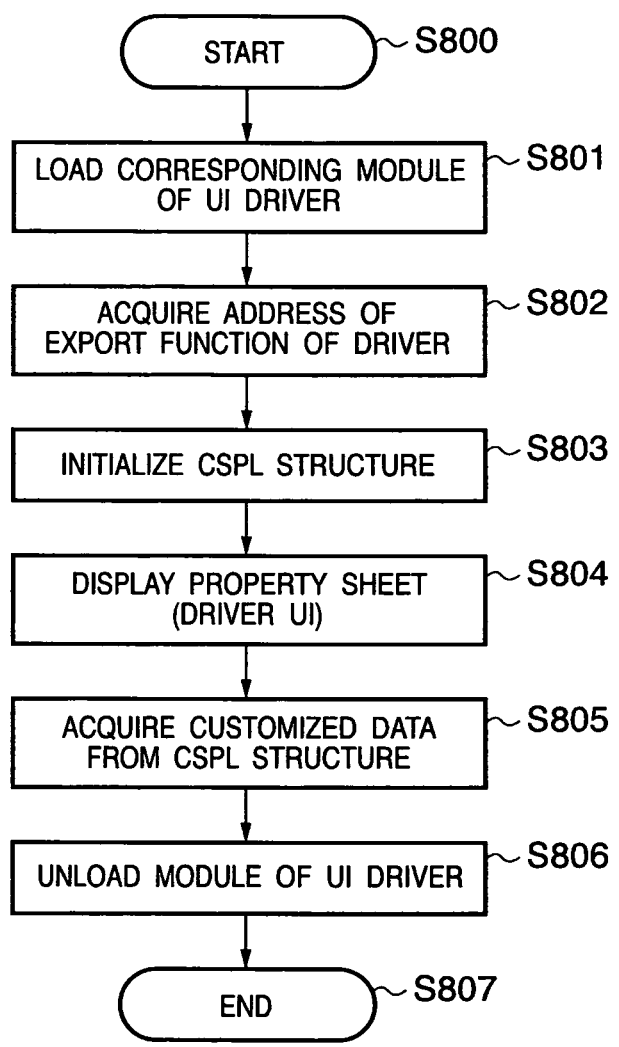
FIG. 8 is a flowchart for explaining the flow of processing of displaying a printer driver customization UI.

Processing of displaying a printer driver customization UI by the customization tool which is executed by the CPU 1 will be explained with reference to the flowchart of FIG. 8. In executing this processing, the customization tool executed by the CPU 1 of the host computer 3000 serves as an operation entity. The processing in FIG. 8 is executed in step S606 of FIG. 6.

When the button 311 in FIG. 3 is clicked, the customization tool specifies, on the basis of module description information contained in an inf file, a module which performs printer driver UI processing. The customization tool loads the specified UI module to the memory so that the UI module can be called from the customization tool (S801). For example, the printer driver UI control module 2042 in FIG. 1 is loaded into the memory.

In step S802, the customization tool acquires the address of the export function of the printer driver (S802). Note that the export function is a call port for calling a function provided by a module from outside the module. For example, the printer driver UI control module defines an export function for externally calling a function of displaying a property sheet. After that, the customization tool initializes a CSPL structure (not shown) used to exchange information between the customization tool and a customization-compatible printer driver (S803). The CSPL structure is used to save print setting information (including control display designation) of the printer driver, and option setting information related to optional devices such as a finisher. The CSPL structure is data for reading out, by the customization tool, print setting values and the like which are input via the printer driver UI control module. The CSPL structure is configured to allow the customization tool to read out data. The CSPL structure can save information which is saved in a DeviceOption structure and Devmode structure for saving printer driver setting information. The CSPL structure can, therefore, be implemented by defining, for example, a data structure obtained by concatenating the DeviceOption structure and Devmode structure. The CSPL structure saves various types of information such as the control settings of the printer driver UI and default values. The CSPL structure can save information input by the customization tool even when no corresponding printer driver is installed.

Figure 13:
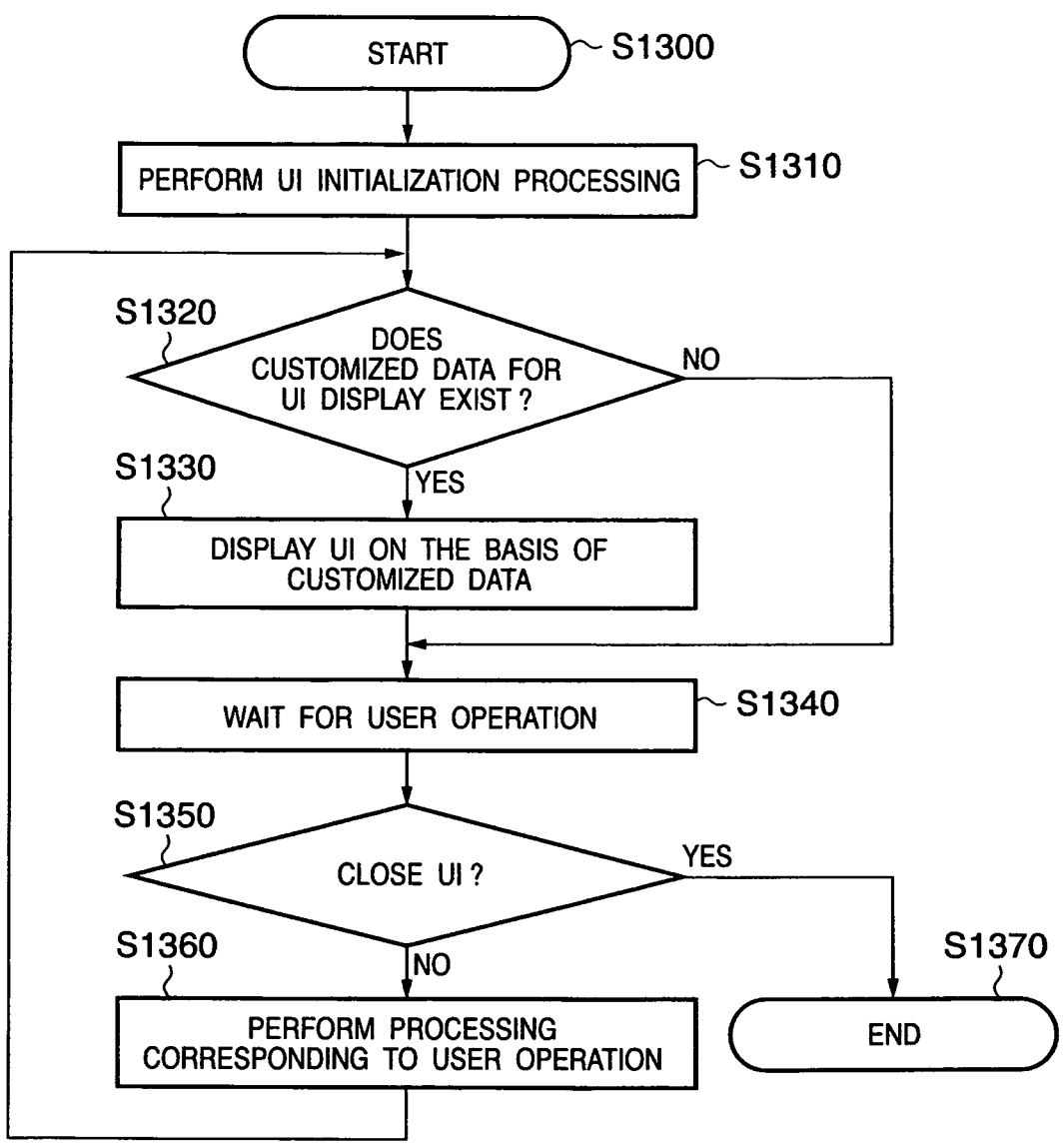
FIG. 13 is a flowchart for explaining the flow of UI control processing related to property settings by a UI module called by the customization tool.

In step S804, the customization tool displays the property sheet (customization driver UI). An outline of processing in step S804 is shown in FIG. 13. At this time, a property sheet display function is called so that the property pages of document properties and printer properties are displayed in one UI window to simultaneously customize the document properties and printer properties. The function can be called from the address acquired in step S802 as an entry. The called function may also be determined in advance and described in an inf file. Alternatively, a name or the like may be assigned to a function under a predetermined rule to determine the display function of a property sheet from the name. Note that the property sheet of each item in FIG. 4 can be displayed by the printer driver UI control module, but the UI in FIG. 5 may not be displayed by the printer driver. In this case, the UI in FIG.

5 prepares a function of displaying this UI for the customization tool. In the first embodiment, each sheet of the UI in FIG. 5 is also displayed by the printer driver UI control module. The customization tool implements the display by calling a corresponding function.

When the customization driver UI is closed by the user, information set on the customization driver UI is held by the CSPL structure. The customization tool acquires input printer driver information from the CSPL structure (including the DeviceOption structure and Devmode structure) (S805). Note that customization information means information on customization such as default values, control display designation, and the like which are saved by the customization tool via the UIs in FIGS. 4 and 5. Customization information acquired by the customization tool is saved in a UPD file in step S608 of FIG. 6.

Under the control of the CPU 1, the customization tool functions as an acquisition unit which acquires printer driver data (i.e., customization information) corresponding to document properties or device properties. The acquisition unit can acquire printer driver information (i.e., customization information) by exchanging data with a data holding unit (CSPL structure) which holds data on the settings of the printer driver. At this time, the acquisition unit causes the data holding unit (CSPL structure) to hold data corresponding to document properties or device properties which are set in the UI windows (FIGS. 3 to 5). Also, the acquisition unit acquires printer driver information corresponding to these properties as customization setting information from the data holding unit (CSPL structure). The customization tool writes the contents of the data holding unit in a GPD file (to be described later). Upon a call, the printer driver determines whether a customized GPD file exists. If the printer driver determines that the customized GPD file exists, it reads out customized print settings, UI control data, and the like in the customized GPD file. The printer driver is then customized. The printer driver which functions as a display control unit on the basis of the customization setting information (i.e., customization information) uses a pseudo-API (to be described later) to display, on the CRT 10, a user interface which is customized on the basis of customization information (e.g., display control designation of the control, and the default values of print setting information) set via the UIs in FIGS. 3 to 5.

In step S806, the module which has been loaded into the memory in step S801 is unloaded, and display of the customization driver UI ends (S807).

The processing flow slightly changes depending on the printer driver-compatible OS. For example, Windows® NT4.0 and Windows® 2000/XP/Server 2003 exploit an OS mechanism called Common Property Sheet UI for display of a driver UI. Thus, in step S804 of FIG. 8, necessary preprocessing is performed to call the Common Property Sheet UI function. For Windows® 98/ME, necessary pre-processing is performed in step S804 of FIG. 8 to call the Property Sheet function and display a UI. However, the basic processing flow is the same as that shown in FIG. 8.

Figure 10A:
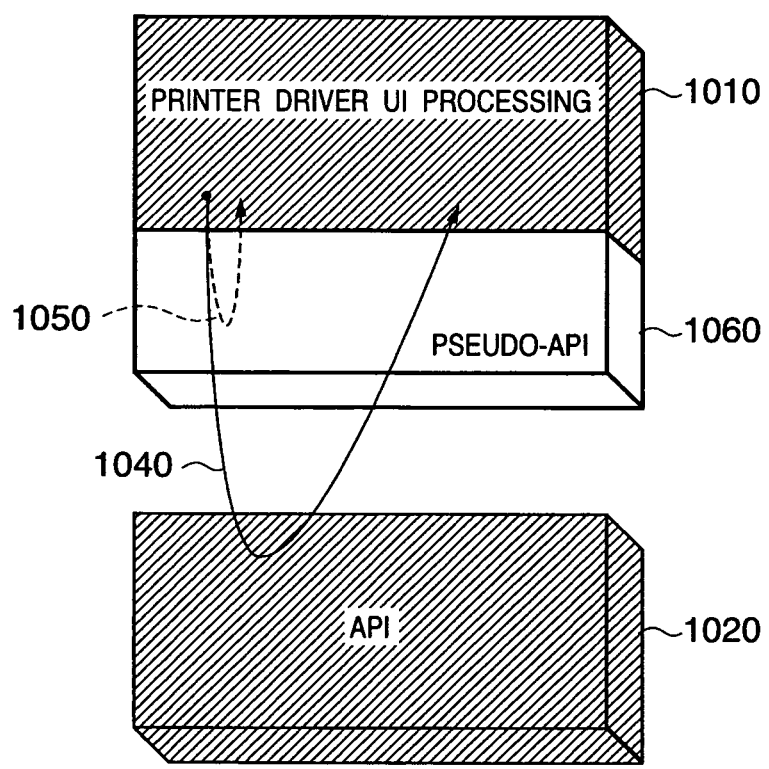
FIG. 10A is a view for explaining a call for an application programming interface (API) which is installed in the printer driver.

FIG. 10A is a view for explaining a call for a Windows® API (Application Programming Interface) which is installed in the printer driver. In step S804 of FIG. 8, the printer driver UI module is executed to achieve printer driver UI processing 1010. The printer driver UI module according to the first embodiment calls a pseudo-Windows® API instead of the Windows® API in the printer driver UI processing 1010. When the printer driver is installed (normal call), the pseudo-Windows® API calls the Windows® API (simply represented as an "API" in FIG. 10A) (1040). When no customization-compatible printer driver is installed, the printer driver UI module is called from the customization tool. Also in this case, the printer driver UI module calls the pseudo-Windows® API. A pseudo-Windows® API 1060 (simply represented as a "pseudo-API" in FIG. 10A) simulates corresponding Windows® API processing, and sends back the simulation result to the printer driver UI processing 1010.

A table 1030 shown in FIG. 10B is an example of a table representing the relationship between the Windows® API and a corresponding pseudo-API name. In FIG. 10B, the Windows® API is represented by an "API", and a pseudo-API corresponding to the Windows® API is represented by a "pseudo-API name". This correspondence and pseudo-API can be created in advance and saved as the configuration file of a printer driver set. Note that the pseudo-API forms part of the customization tool. Simultaneously when the customization tool is installed in a computer, the pseudo-API is also installed. In the first embodiment, the customization tool sometimes includes the pseudo-API.

When the printer driver UI module is called from the customization tool, the pseudo-Windows® API simulates Windows® API processing and sends back the processing to the printer driver UI processing 1010. When the printer driver UI module is called as a normal driver UI after the printer driver is installed in the OS, a normal Windows® API 1020 is called to send back the processing to the printer driver UI processing 1010.

Figure 11:
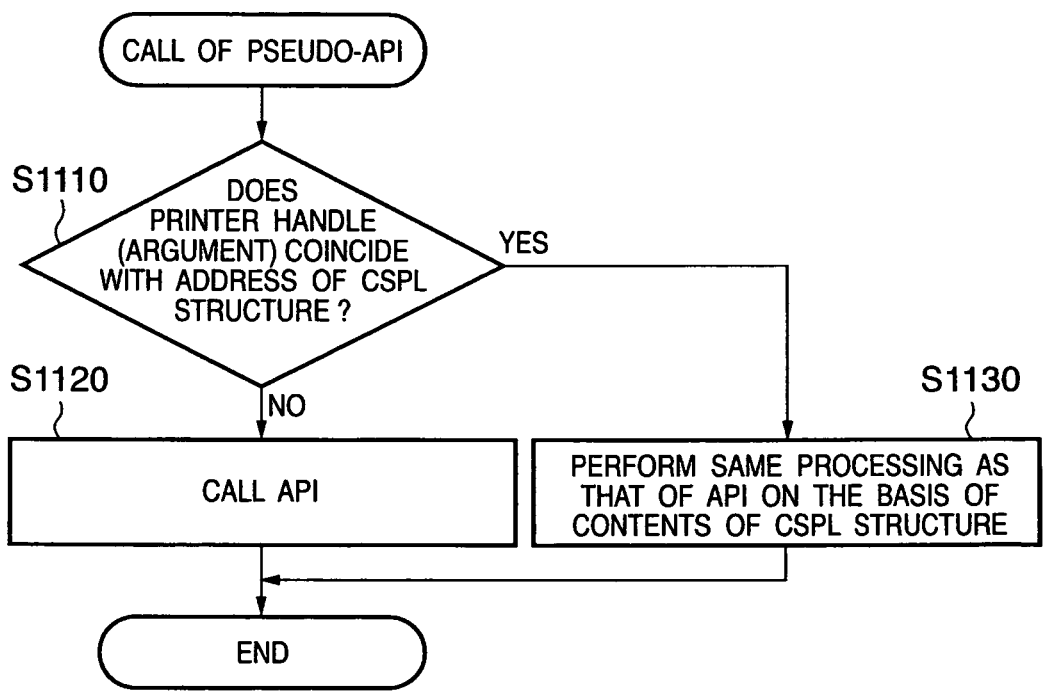
FIG. 11 is a flowchart for explaining the flow of processing related to a call for the pseudo-Windows® API.

FIG. 11 is a flowchart for explaining the flow of processing related to a call for the pseudo-Windows® API (simply represented as a "pseudo-API" in FIG. 11). In executing this processing, the customization tool executed by the CPU 1 of the host computer 3000 serves as an operation entity.

In step S1110, the customization tool determines whether a printer handle (argument) contained in the arguments of the pseudo-Windows® API is address information of the CSPL structure (to be also simply referred to as "address information" hereinafter) that is transferred upon a call from the customization tool. Since the start member of the CSPL structure represents the size of the CSPL structure, the transferred printer handle (argument) is processed and referred to as the start address of the CSPL structure. If the size of the printer handle coincides with that of the CSPL structure, the customization tool determines that the printer handle of the argument represents the address of the CSPL structure (YES in S1110). The size of the CSPL structure serving as the determination criterion is given and saved in advance together with, e.g., the table in FIG. 10B. In step S1110, the value of the CSPL structure is compared with data represented by the address given as the argument. If this value coincides with the data, it can be determined that the printer handle coincides with the address of the CSPL structure.

If the printer handle of the argument does not represent the address of the CSPL structure (NO in S1110), normal printer driver action is performed. Hence, the Windows® API (simply represented as an "API" in FIG. 11) is called (S1120), and the processing ends.

If it is determined in step S1110 that the printer handle of the argument coincides with the address of the CSPL structure (YES in S1110), the processing advances to step S1130.

A program which controls the user interface of the printer driver generally calls the Windows® API in accordance with an input to the driver. In the first embodiment, when no printer driver is installed, no Windows® API can be called, but a pseudo-API can be called.

In step S1130, the pseudo-Windows® API is called. The called Windows® API (pseudo-API) performs the same processing as that of the Windows® API, and returns the processing result to the printer driver UI processing 1010. Then, the processing ends. The printer driver UI module saves, in a structure designated by the handle, processing results such as the values of print setting items and control display designation that are input through the UI. Then, the processing ends.

By the above processing, the customization tool functions as the selection unit of the information processing apparatus under the control of the CPU 1. The selection unit selects an application programming interface (Windows® API or pseudo-Windows® API) for use on the basis of address information (start address) held in the data holding unit (CSPL structure).

Figure 12:
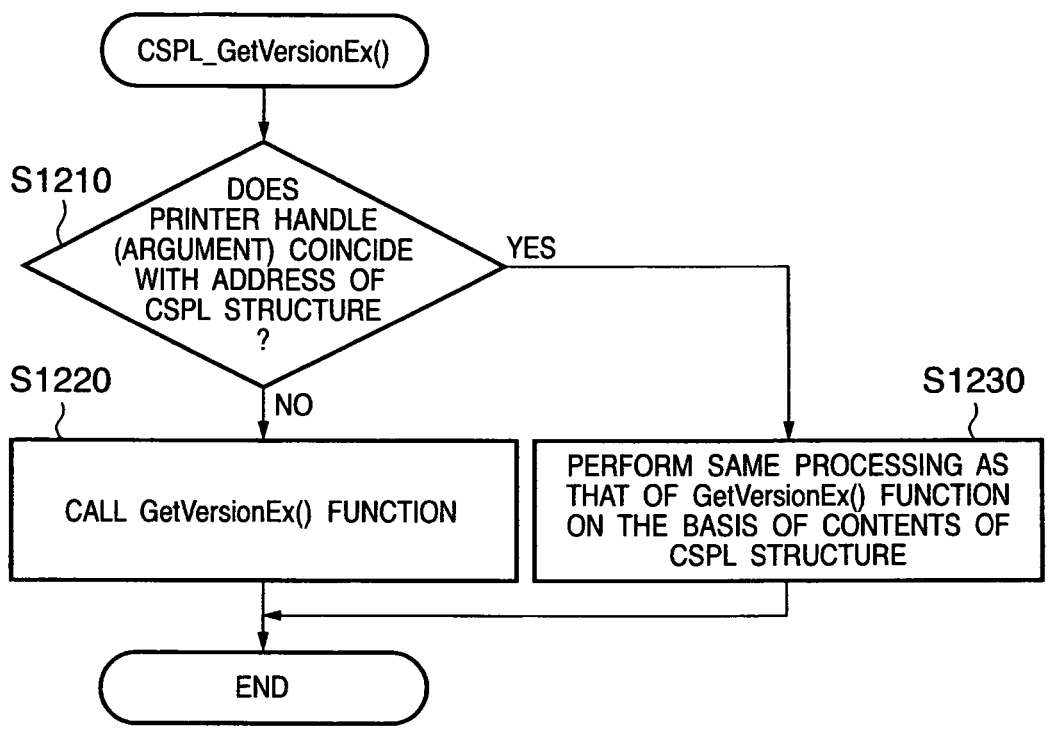
FIG. 12 is a flowchart showing the flow of processing when a CSPL_GetVersionEx( ) function is called as an example of the pseudo-Windows® API.

FIG. 12 is a flowchart showing the flow of processing based on a CSPL_GetVersionEx( ) function when the CSPL_GetVersionEx( ) function (see a field 1040 in FIG. 10B) is called as an example of the pseudo-Windows® API from the printer driver UI. In executing this processing, the customization tool executed by the CPU 1 of the host computer 3000 calls the printer driver UI, and further calls the CSPL_GetVersionEx( ) function. A Windows® API simulated by the CSPL_GetVersionEx( ) function is a Windows® GetVersionEx( ) function (see the table 1030 in FIG. 10B). The Windows® API sends back, to the printer driver UI processing 1010, information on the version of an OS running on the host computer.

In step S1210, the CSPL_GetVersionEx( ) function determines whether a printer handle serving as an argument of the function represents the address of a CSPL structure that is transferred upon a call. This determination method is the same as that described in step S1110 of FIG. 11. If the argument does not represent the address of the CSPL structure (NO in S1210), the processing advances to step S1220. In step S1220, a GetVersionEx( ) function 1040 serving as a Windows® API which runs as a general printer driver is called (S1220), and then the processing ends.

If it is determined in step S1210 that the argument of the function coincides with the address of the CSPL structure (YES in S1210), the processing advances to step S1230. In step S1230, the GetVersionEx( ) function is pseudo-processed on the basis of information on a printer driver-compatible OS that is held in the CSPL structure (the same processing as processing of the GetVersionEx( ) function is executed) (S1230).

For example, a pseudo-Windows® API which is called in correspondence with document properties or device properties selected from the UI windows in FIGS. 3 to 5 simulates processing of a corresponding Windows® API. Also in step S1230, the CSPL_GetVersionEx( ) function sends back the same processing result as that of the GetVersionEx( ) function to the printer driver UI module. This also applies to the remaining functions.

After processing in step S1230 or S1220, the processing in the flowchart of FIG. 12 ends.

A case wherein a printer driver UI control module for Windows® 98/ME is executed in response to a call from the customization tool will be explained. A customization target is a Windows® 98/ME printer driver. In the first embodiment, the customization tool supports Windows® 2000/XP/Server 2003, and the environment in which the customization tool is executed is controlled by one of these OSs. The CSPL structure is initialized in step S803 of FIG. 8. At this time, for example, information representing that the OS is Windows® 98/ME is written in the CSPL structure as data representing the version of the OS. As a result, the CSPL structure contains the information (OS version information) representing that a driver module-compatible OS is Windows® 98/ME. In step S1230, the CSPL_GetVersionEx( ) function accesses the OS version information of the CSPL structure and sends back the value "Windows® ME" to the calling printer driver UI module. This can prevent generation of any error in UI control processing of the Windows® 98/ME driver module.

This also applies to another pseudo-Windows® API. Since no printer driver is actually installed, an error may occur in driver module UI control upon a call for the Windows® API. Even in this case, the action of the Windows® API can be virtually reflected in UI control by simulating processing of the Windows® API in the pseudo-function (pseudo-API).

The Windows® 98/ME printer driver is a module which originally acts in a 16-bit environment, and thus UI processing for the printer driver is performed in the 16-bit environment. However, the Windows® 98/ME printer driver, which is a target in the first embodiment, utilizes an OS mechanism "thunk-up" to perform, in a 32-bit environment, UI processing which is transferred from the 16-bit environment. The printer driver UI module is described by a 32-bit code, and configured to process 32-bit data. With this structure, the customization tool according to the first embodiment can call the processing function of the Windows® 98/ME printer driver UI module, and relatively easily display and control the Windows® 98/ME UI.

In the above way, the customization tool acquires properties including print settings (i.e., saves information set by the user). The customization tool can save the acquired properties including print settings so that they can be read out by the device driver, without registering or executing the device driver in the operating system. Executable registration of the device driver in the operating system means to register the device driver in a registry area managed by the operating system and install the device driver by using the authority of the administrator of the operating system. The properties include control display designation in addition to print settings. In setting the properties, the device driver is stored in the user area of the file system managed by the operating system. The properties are saved in a UPD file by the customization tool. The created UPD file forms an install set together with a printer driver to be customized, a printer driver UI module, and an inf file. The created install set is distributed to a client computer via a recording medium or communication medium. The installer executes installation in accordance with the description of the inf file. The installer copies a value which is loaded from the UPD file and corresponds to each setting item, as the value of a corresponding item in the devmode structure or deviceOption structure. The printer driver and printer driver UI module act by referring to the values of items saved in the devmode structure or deviceOption structure.

The above-described processing is executed by the customization tool which is an example of the application program. As a proxy of the operating system, the customization tool responds to the device driver upon input of information via the device driver.

With a pseudo-proxy response of the customization tool, the device driver does not shift to error processing, but recognizes the response from the application as a response from the operating system, and continues subsequent setting processing based on an input from the user.

The customization tool includes a pseudo-API for the printer driver. Further, the customization tool can set properties including the print settings for device drivers intended for a plurality of types of operating systems (e.g., Windows® NT and Windows® 95).

Note that the customization tool can set in a plurality of device drivers, information on print settings which are acquired by the customization tool by one instruction.

As described above, the pseudo-API according to the first embodiment is a program which simulates an operating API, and executes a device driver similarly to a case wherein the device driver is installed in the operating system. If the customization tool (pseudo-API) does not pseudo-respond to the device driver, the device driver shifts to error processing. The pseudo-API can continue customization processing by the customization tool without installing any device driver.

FIG. 13 is a flowchart for explaining the flow of UI control processing related to property settings by a UI module called by the customization tool. In the procedures of FIG. 13, the pseudo-API function shown in FIGS. 11 and 12 is called to implement display of a property sheet, acquisition of parameters, and input of setting values. In executing this processing, the customization tool executed by the CPU 1 of the host computer 3000 serves as an operation entity.

In step S1300, the customization tool is activated in response to input of a UI control instruction. In step S1310, the customization tool performs UI initialization processing. In step S1320, the customization tool determines whether the printer driver information file shown in FIG. 9 exists. If the printer driver information file exists (YES in step S1320), the processing advances to step S1330 to display controls in the UI in accordance with customization information saved in the printer driver information file. In this example, display of each control can be controlled to three values "Enabled", "Disabled", and "Hidden". After the UI is displayed, the processing changes to the user operation standby state (S1340). If no printer driver information file exists (NO in S1320), processing in step S1330 is skipped, and the processing changes to the user operation standby state (S1340). Even if the printer driver information file exists but does not contain any data, no customization information exists, and the processing branches from step S1320 to step S1340.

The processing waits until a user operation is done (S1340). If an operation to close the UI is performed (YES in S1350), UI processing ends (S1370). If another operation is performed (NO in S1350), UI control corresponding to the user operation is executed (S1360), and the processing returns to step S1320. Input property information is saved in the printer driver information file (UPD file) again via the CSPL structure. At this time, the customization code 350 in FIG. 3 is saved in the printer driver information file together with a predetermined identification code.

Customization data associated with the control display method shown in FIG. 5 is held in the printer driver information file shown in FIG. 9. In accordance with the customization data, UI controls can be displayed.

Note that the customization tool may enable the controls of all setting items regardless of the customization information. In this case, the UI is displayed while control display designation in the customization information contained in the printer driver information file is regarded as "enabled" for all controls.

In the first embodiment, customization information is written into a driver information file called a UPD file. However, the form of customization information is not limited to the UPD file as far as the file can be referred to by the printer driver and can be analyzed. In Longhorn which is a next-generation Windows® OS, a GPD file is a standard printer driver information file, and customization information may be assembled in the GPD file.

An information processing apparatus which customizes, in accordance with the settings of properties (initial value data of document properties for setting a document and initial value data of printer properties for setting a device), a device driver (printer driver) for controlling a printing apparatus comprises (1) a specifying information setting unit which sets specifying information (customization code) for specifying a device driver customized in accordance with the document property settings and device property settings, (2) a determination unit which determines whether the specifying information (customization code) corresponding to the device driver is set by the specifying information setting unit when the device driver is installed, and (3) a registration unit which registers the specifying information (customization code) in the registry when the determination unit determines that the specifying information (customization code) corresponding to the device driver is set. In the information processing apparatus, the processes of these units are executed by executing the customization tool under the control of the CPU 1.

Figure 14:
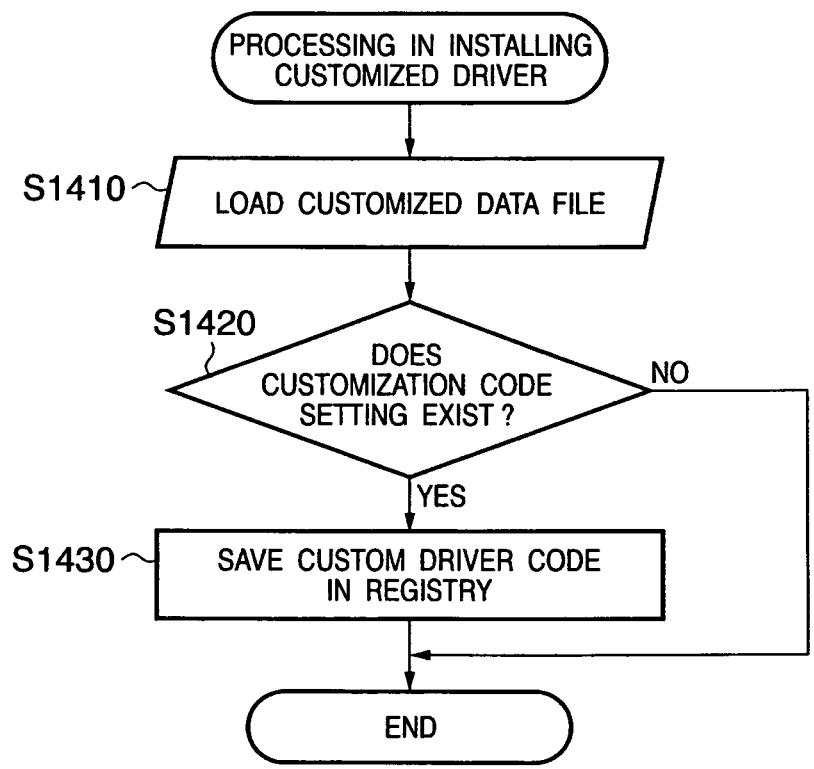
FIG. 14 is a flowchart for explaining processing when a customization code is set in installing a customized driver.

FIG. 14 is a flowchart showing detailed processing of installing, in a computer, a driver set customized by the customization tool. FIG. 14 is a flowchart for explaining processing when a customization code is saved in the printer driver information file in installing a customized driver. When installation of a customized driver is executed, the customization tool executed by the CPU 1 loads a printer driver information file contained in a driver set at the install destination in step S1410. In step S1420, the customization tool determines whether a customization code input from the spin box 350 in the UI window of FIG. 3 is saved in the loaded printer driver information file as data corresponding to the customized driver to be installed. If the customization code is saved (YES in S1420), the processing advances to step S1430. The customization tool saves (registers) the customization code in a specific registry in the OS that is read from the printer information file Then, the processing ends. If the customization tool determines in step S1420 that no customization code is set (NO in S1420), processing in step S1430 is skipped, and the processing ends.

The customization tool functions as the determination unit of the information processing apparatus under the control of the CPU 1. When a device driver is to be installed, the determination unit can determine whether an installed device driver has been customized, on the basis of specifying information (customization code) registered in the registry. The customization tool also functions as the property setting unit of the information processing apparatus under the control of the CPU 1. When the determination unit determines that the device driver (printer driver) has been customized, the property setting unit can write, in the information file of the device driver to be installed, document property settings or device property settings which are written in an information file. By this processing, customization information can be more accurately inherited.

FIG. 15 is a view illustrating the display window of a registry editor. When the customization tool registers the customization code of a customized driver in a specific registry related to driver settings in the OS, a combination of a name "Customize Code" (1501) and a numerical value "20041224" (1502) is displayed. The customization code for specifying a customized driver is not limited to a numerical value shown in the field 1502, and the customization code can be arbitrarily set in accordance with an input from the spin box 350.

According to the first embodiment, a customization code is registered in a specific registry related to settings of a device driver (printer driver), and can be referred to from an external application tool. By referring to the customization code in the registry, the external application tool can determine whether an installed printer driver is a customized one. When an uncustomized printer driver is installed, no customization code field is registered in the registry. Hence, whether a printer driver has been customized can be determined from whether a customization code exists, and the version can be specified by the contents of the customization code.

Also when the installer updates a printer driver, it is determined from the customization code whether the printer driver has been customized. Customization information contained in a driver information file (UPD file) is written in the UPD file of another printer driver to be newly installed, thereby accurately inheriting the customization information set by the user.

On the basis of the registration contents of the registry, the system administrator can determine whether a printer driver used by the user has been customized.

According to the first embodiment, the install set of a customized driver is created by reflecting customization desired by the user without installing any printer driver. Since a printer driver corresponding to an individual OS need not be installed, the working efficiency can increase.

Even if the printer driver is intended for an OS which does not support customization, a customized driver which reflects customization desired by the user can be created.

In customization of the initial setting values of a printer driver, work can be done using a UI identical to that of the printer driver, which facilitates initial setting work in customization. The work efficiency and operation convenience of the user can be increased by reflecting customization contents set through the UI and controlling enabled display, disabled display, and hidden display of display items.

A customized driver has the same structure as that of the install set of an uncustomized driver. Such a driver can run as a customized driver in the Windows® operating system available from Microsoft® or even in a so-called Point & Print environment of Longhorn which is a next-generation Windows® OS. The versatility of the customized driver can improve.

FIG. 16 is a block diagram showing a state in which a customization code is stored in a customization code registry and in the memory of the customization tool. The customization code is stored in the external memory 11 of the host computer 3000, loaded into the RAM 2, and referred to by the CPU 1 controlled by the customization tool.

The customization code is saved in a specific registry storage area managed by the OS. The registry is stored with a tree structure, and the customization code can be referred to by tracking the tree structure from a subtree at the top of the tree to a subkey.

The customization tool is made up of a UI control unit which accepts an input from the user, a driver access unit which exchanges customization information with a driver, an inf change unit which updates application information, and a UPD change unit which updates device dependency information.

Push install processing for a driver having a customization code will be explained.

Figure 17:
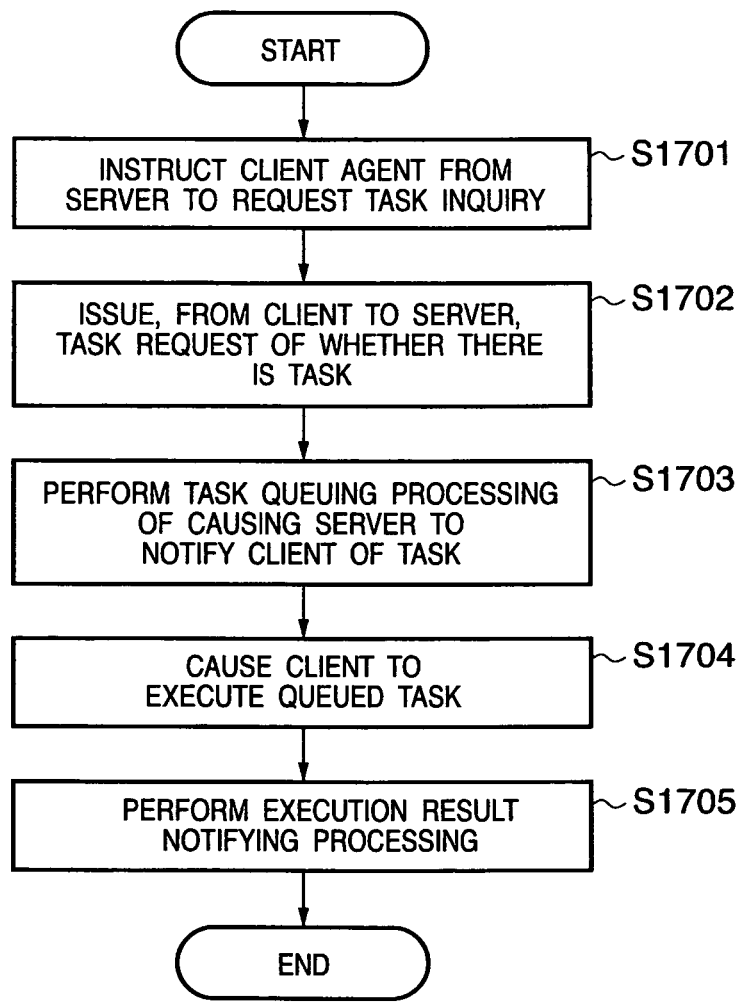
FIG. 17 is a flowchart showing processes by a server and client when a push install task is executed in a server-client environment.

As pre-processing of FIG. 17, the administrator (user) who operates a server PC defines the contents of an install task by using user interfaces in FIGS. 18 and 19.

The user uses the user interface in FIG. 18 to select a client PC in which a driver is to be installed. Then, the user uses the user interface in FIG. 19 to select a driver (including a customization code) to be installed. The server generates a driver install task on the basis of information designated or select by the series of processes. This processing is pre-processing. Details of the pre-processing will be described in detail below.

FIG. 17 shows an example of processing actually executed after scheduling a task to install a printer driver in a push installer from a server in a server-client environment connected to a network. After the pre-processing ends, this flowchart starts in response to a click of the Register button in FIG. 20 by the administrator with a mouse or the like.

The driver install task generated by the server PC instructs an agent which has been installed in advance from the server to a client, to request a task inquiry in accordance with scheduling set in FIG. 20 (1701). Upon reception of the request instruction, the client agent requests a task of the server (1702). Upon reception of the task request, the server transfers the task to client agents selected in 1802 of FIG. 18, and performs queuing (1703). Upon reception of the task, the client agents execute the queued task (1704), and notify the server of their task results (1705). In response to the notification of the install result from each client, the server PC displays a window as shown in FIG. 21 (to be described later). The window in FIG. 21 can be operated and switched to a window in FIG. 22 (to be also described later). Note that the agent in the first embodiment is a control program. The control program is loaded into the RAM 2, and causes the CPU 1 to execute the processes in 1702, 1704, and 1705. In the server, the CPU 1 executes the install program to perform the processes in 1701 and 1703.

FIGS. 18 to 22 are conceptual views showing examples of server-side UIs for generating a driver install task.

FIG. 18 is a conceptual view showing an example of a client database. In FIG. 18, client PCs network-connected to the server are listed. A field 1801 displays groups on the network. A group may include a plurality of teams. Each team may include a plurality of clients. In the example of FIG. 18, area 11, area 12, and area 13 exist on the network.

The field 1801 of FIG. 18 represents that area 11 includes team A, team B, and team C. As clients belonging to team A of area 11, Client PC01 to Client PCn are listed (1802). By searching the client database, the fields 1801 and 1802 are displayed. The field 1802 displays the type of operating system (in the first embodiment, two types: W2K and W9x) that is installed in each client.

The client database 1801 may be collected by searching a client PC from the server PC via the network. A cancel button 1804 is clicked to end the program.

FIG. 19 is a conceptual view showing a UI displayed when a Next button 1803 in FIG. 18 is clicked. FIG. 19 shows a list of drivers stored in the server PC. The driver list displays a printer driver name 1905, a device name 1906, a type 1907 of driver PDL (Page Description Language), and a type 1908 of operating system corresponding to a driver. The driver list also displays a compatible language 1909 which is displayed in the UI, and another information 1910 (for example, information representing a fax driver can be stored). The driver list also displays a customization code 1903 corresponding to each driver described in the above embodiment. The customization code uses a number and symbol. For an uncustomized driver, "NONE" is displayed. A column 1904 displays a check box which allows selecting whether a driver can be selected. A filled square indicates a selected state. Symbols (a) to (d) are symbol marks, and are used as serial symbols for specifying a driver.

FIG. 20 shows a window which is opened when an OK button 1902 in FIG. 19 is clicked. In a field 2001, the time when an install task is transmitted to a client PC and executed can be designated. A check box enables immediate transmission/execution or designation in transmission. In FIG. 20, the task scheduler can input a schedule at which a driver install task is executed. In FIG. 20, an install task is scheduled at 23:00 on Mar. 1, 2005.

It is also possible to only register task contents without setting the processing time (when the user issues an instruction to this effect). When the Register button is clicked while install processing to be executed immediately or at a designated time is selected, task registration processing starts at the designated time. More specifically, contents designated in FIGS. 18 and 19 are combined as a driver install task. The driver install task is transmitted from the server PC to the agent of the client PC at the time designated in FIG. 20.

FIG. 21 is a view showing a UI which notifies the server of an install result from a client apparatus. In FIG. 21, 2101 to 2105 selected in 1802 of FIG. 18 correspond to the install statuses of respective clients.

In the driver install task designated through these UIs, the driver-compatible OS 1908 registered in the driver database is checked. At the date and time designated by the task scheduler, a driver can be installed in a client PC in which the OS is installed.

For example, there are Client PC01 to Client PC03 in which a Win 2K driver is installed. In these clients, all Win 2K-compatible drivers (a), (b), (d), and (e) are installed. This also applies to Win 95.

Figure 22:
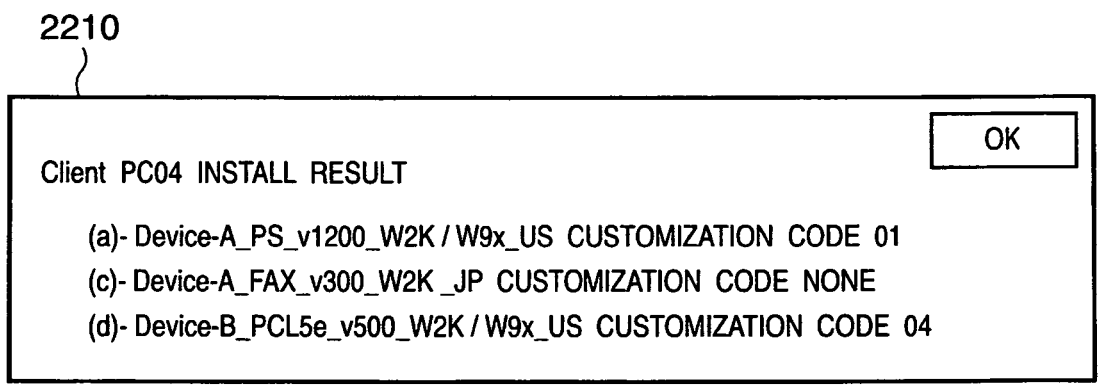
FIG. 22 is a view showing the detailed results of executing the install task.

Task execution results sent to the server are listed and displayed in the UI on the server, as shown in FIG. 22, and the status can be confirmed.

Client PC01 sends back "OK" as a status. As installed drivers, serial symbols (a), (b), (d), and (e) are displayed and correspond to the serial symbols in the field 1904 of FIG. 19. These symbols in FIG. 21 represent that installation of drivers corresponding to these serial symbols is completed. For Client PC02, NG is displayed. This means that an error occurs and driver installation fails. In the window of FIG. 21, (a), (b), (d), and (e) are successfully installed in Client PC03; (a), (c), and (d), in Client PC04; and (a), (c), and (d), in Client PCn.

FIG. 22 is a view showing the install status of Client PC04. This window is opened by double-clicking a row corresponding to the entry 2104 in FIG. 21 with a mouse or the like. To check the install results of other clients, a similar display can be provided by double-clicking the remaining rows 2101, 2102, 2103, and 2105.

In FIG. 22, install results in Client PC04 are displayed. The window represents that drivers corresponding to (a) (c), and (d) are installed. The driver name and customization code of each driver are also displayed. "NONE" is displayed for an uncustomized driver. Even when a plurality of drivers are installed, the server administrator can identifiably display customized drivers and uncustomized drivers on the basis of notifications from a client.

The first embodiment discloses a client PC which customizes a device driver for controlling a printer.

The first embodiment also discloses the customization tool which issues a customization code serving as an example of specifying information for specifying a customized driver. The client PC has an external memory in which a customization code issued by the customization tool is stored in association with a customized driver.

When a customized driver which is stored in the external memory is installed, the customization tool determines whether specifying information corresponding to the customized driver is set.

If the customization tool determines that the customization code is set, the specifying information is registered in the registry which is an example of a storage area managed by the operating system.

Further, the customization tool sets specific setting values for a device driver.

The customization tool writes the values set by it in the information file of the device driver. The customization tool generates a customized driver from the device driver.

When the customized driver is installed, the customization tool uses the customization code to determine whether an installed device driver has been customized.

If the customization tool determines that the device driver has been customized, it executes the following processing. More specifically, the setting values written in the information file are written by the customization tool in the information file of the device driver to be installed.

The customized settings include favorite settings serving as an example of multi-functional print settings corresponding to a plurality of print setting values, and settings which are written in a UPD file and used to change the user interface of the printer driver. The customized settings include setting values which are set via the user interface of the printer driver when the printer driver is operated.

An install program which is built into the server PC acquires a customized driver. The install program further designates installation of the customized driver.

The install program specifies the customized driver whose installation is designated by the install program.

Using the customization code, the install program displays the install result.

The install program can install a plurality of device drivers. The install program identifiably displays customized drivers and uncustomized drivers as install results on the CRT display of the server PC.

The install program instructs a client PC on installation by transmitting an installation instruction to the client PC via the network. By using information which is transmitted from the client PC and represents install results, and a customization code acquired by the install program, the CRT displays whether the customized driver has successfully been installed.

The install program acquires a customization code stored in the server PC.

The install program acquires a customization code sent back from the client PC.

As described above, according to the first embodiment, printer setting information can be customized using the customization tool. The customization code is saved in the printer driver information file together with the printer setting information. The customization code allows another program and another user to recognize that the printer driver has been customized when or after the driver is installed. The server can recognize that a driver installed in each client has been customized. Also when a driver is updated, the installer can refer to the customization code and recognize whether a driver to be overwritten is a customized one.

Second Embodiment

<Arrangements of Computer and Printer>

Figure 23:
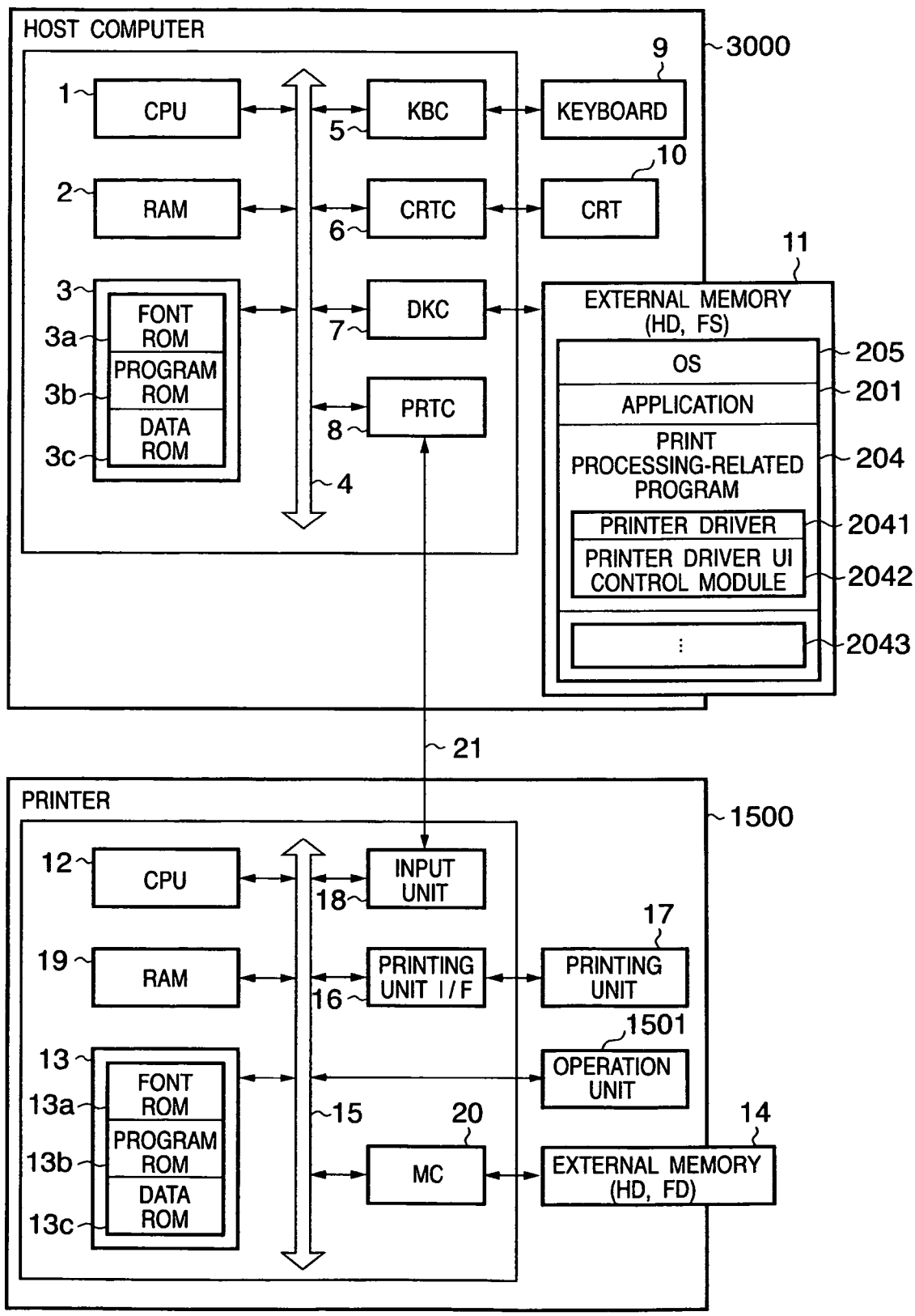
FIG. 23 is a block diagram showing an example of a system configuration to which the present invention is applied.

The second embodiment will be described below with reference to the accompanying drawings. FIG. 23 is a block diagram showing the configuration of a print processing system according to the second embodiment of the present invention. The print processing system comprises a host computer 3000 (information processing apparatus), and a printer 1500 (printing apparatus) which prints upon reception of print data from the host computer 3000.

In the host computer 3000, a CPU 1 comprehensively controls each device connected to a system bus 4 in accordance with programs stored in a RAM 2. The RAM 2 also functions as a main memory, work area, and the like for the CPU. 1. A ROM 3 stores various programs and data. The ROM 3 stores various programs and data, and is divided into a font ROM 3*a* for storing various fonts, a program ROM 3*b* for storing a boot program, BIOS, and the like, and a data ROM 3c for storing various data.

A keyboard controller (KBC) 5 controls a key input from a keyboard (KB) 9 or a pointing device (mouse: not shown). A CRT controller (CRTC) 6 controls display on a CRT display (CRT) 10. A disk controller (DKC) 7 controls access to an external memory 11 such as a hard disk. A printer controller (PRTC) 8 is connected to the printer 1500 via a bidirectional interface 21, and executes communication control processing with the printer 1500.

The external memory 11 is a hard disk (HD), MO, flexible disk (FD), or the like. As shown in FIG. 23, the external memory 11 stores an operating system program (to be referred to as an OS hereinafter) 205, various applications (e.g., a document processing application program which processes a document containing a figure, image, text, table, and the like) 201, and a print processing-related program 204. In addition, the external memory 11 stores a user file, edit file, and the like. The print processing-related program 204 generates print data described using a page description language, and can be utilized commonly by a plurality of printers of the same series. The print processing-related program 204 contains a printer control command generation module (to be referred to as a printer driver hereinafter) 2041, and a printer driver UI control module 2042. The hard disk 11 also saves an install set containing a program file and data file for installing a printer driver. The printer driver install set in the second embodiment is information for installing a printer driver in a computer. The printer driver install set may be formed from an install definition file (called an inf file) for installing a printer driver by using an install program serving as an OS function in a computer, a printer driver information file (also called a UPD (User-interface Printer Description) file) 2043, and a program file such as a printer driver. Alternatively, the printer driver install set may be formed from an installer containing a file of the execution form (exe file). The UPD file is setting definition information of the printer driver. Parameters for driving control of the printer driver, for example, print setting information which defines print settings such as the paper size and whether to perform double-sided printing, are also saved in the external memory 11 and referred to by the printer driver.

The application 201 which contains a customization tool program (to be simply referred to as a customization tool hereinafter) according to the second embodiment is loaded into the RAM 2 and executed by the CPU 1. The CPU 1 executes, e.g., outline font rasterization processing to the RAM 2, and enables WYSIWYG (What You See Is What You Get) on the CRT 10. The CPU 1 opens various registered windows and executes various data processes on the basis of commands designated with a mouse cursor (not shown) on the CRT 10 or the like. When the user executes printing, he opens a print setting window (controlled by the printer driver UI control module 2042), and can make settings of a printer and settings of print processing to the printer driver 2041, including selection of the print mode. Note that the customization tool is not always executed in a computer in which a printer driver to be customized is installed. It is also possible to execute the customization tool in a computer other than the computer 3000, customize the printer driver, generate an install set, and install it in the computer 3000.

The arrangement of the printer 1500 will be explained. A CPU 12 controls the overall action of the printer 1500. A RAM 19 functions as a main memory, work area, and the like for the CPU 12, and is also used as an output information rasterization area and environment data storing area. The RAM 19 also comprises an NVRAM (Non-Volatile RAM) area, and is so constructed as to increase the memory capacity by an optional RAM which is connected to an expansion port (not shown). A ROM 13 comprises a font ROM 13a storing various fonts, a program ROM 13b storing a control program and the like which are executed by the CPU 12, and a data ROM 13c storing various data. An input unit 18 exchanges data with the host computer 3000. A printing unit interface 16 controls an interface with a printing unit 17 serving as a printer engine.

Access to an external memory 14 is controlled by a memory controller (MC) 20. The external memory 14 includes a hard disk (HD), MO, flexible disk (FD), and IC card which are connected as options. The external memory 14 stores font data, an emulation program, form data, and the like. When no external memory 14 such as a hard disk is connected, the data ROM 13c of the ROM 13 stores information and the like which are used by the host computer 3000. Note that the number of external memories 14 is not limited to one, and a plurality of external memories 14 may also be adopted. For example, a plurality of external memories which store an optional font card and a program for interpreting the printer control languages of different language systems in addition to built-in fonts may be connected.

An operation unit 1501 has an operation panel which accepts a user operation, and the operation panel is equipped with an operation switch, LED display, and the like (not shown). The operation unit 1501 has an NVRAM (not shown), and stores printer mode setting information from the operation panel.

The CPU 12 outputs an image signal as output information to the printing unit (printer engine) 17 via the printing unit interface 16 on the basis of a control program stored in the program ROM 13b of the ROM 13. The CPU 12 can communicate with the host computer 3000 via the input unit 18. The CPU 12 can receive print data transmitted from the host computer 3000, and notify the host computer 3000 of information or the like in the printer 1500.

<Memory Map>

FIG. 2 is a view showing the memory map of the RAM 2 when a predetermined application (including the customization tool according to the present invention) and the program related to print processing are activated, and programs and data are loaded into the RAM 2 of the host computer 3000. The memory map is the same as that in the first embodiment, and a description thereof will be omitted.

<Structure of UPD File>

Figure 29:
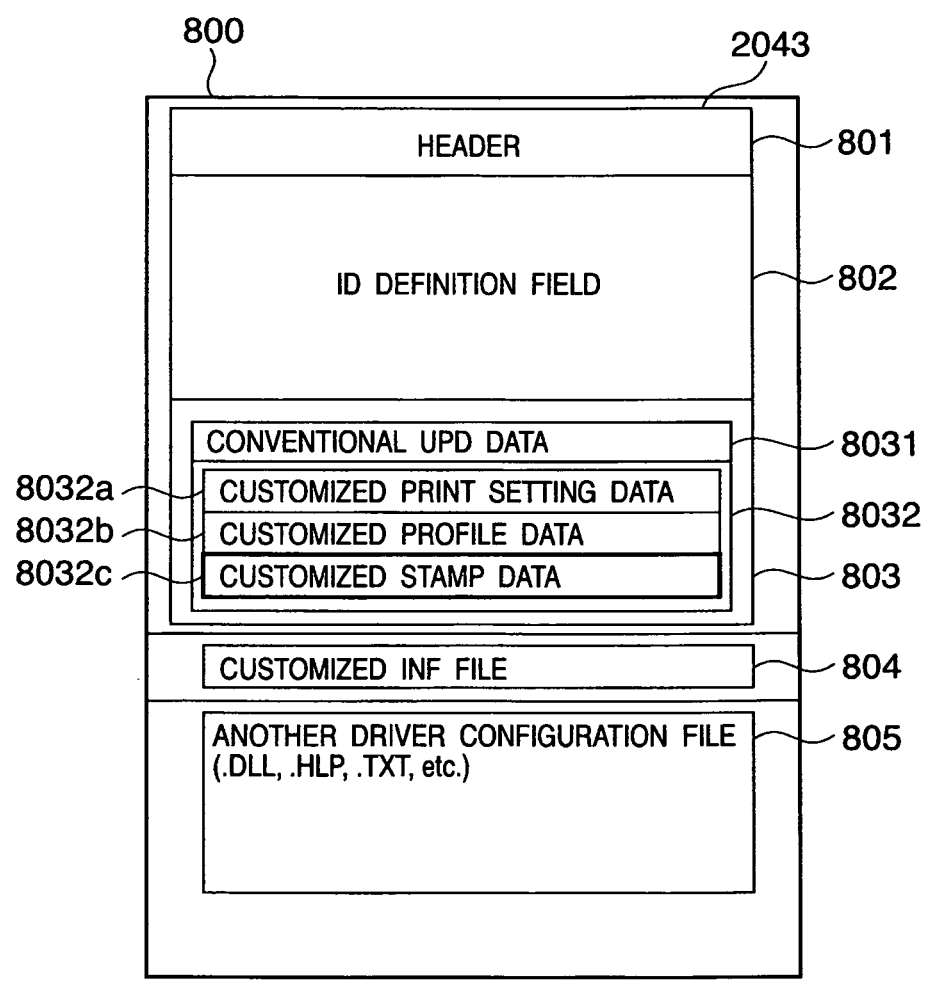
FIG. 29 is a view showing the structure of a customized driver set and that of customized data saved in a UPD file.

FIG. 29 is a view for explaining the data format of a driver set 800 (install set) containing the printer driver information file (UPD file) 2043 serving as setting definition information. In FIG. 29, the building components of the driver set configuration file 800 are the updated UPD file 2043, an updated inf file 804, and another driver file (e.g., a DLL file, HLP file, or TXT file) 805.

The UPD file 2043 contains a header 801, ID definition field 802, and data field 803. The ID definition 802 stores paired data of the ID of UPD data stored in the UPD data 803 and the storage location (address) of the UPD data. The ID definition field 802 stores paired data by the number of IDs. The UPD file 2043 exists for each printer driver, i.e., each printer model. The driver set 800 (install set) holds printer drivers for a plurality of models, and UPD files 2043 corresponding to the number of printer drivers. It is, therefore, possible to perform different customization for each model by one install set and install a printer driver in a computer.

The UPD file 2043 customized by the customization tool stores, in the ID definition 802, a predetermined ID (e.g., "CUSTOMIZED") representing a customized default value, and an address X serving as the storage location of the data.

For an uncustomized UPD file, no ID representing customization is contained in the ID definition field 802. By referring to the ID definition field 802, it can be determined whether a UPD file has been customized. The ID representing customization corresponds to the customization code according to the first embodiment.

Since the ID definition 802 uses a customization ID, a printer driver of a new version can inherit the settings of a previously customized printer driver.

The UPD file 2043 is formed from the header 801, ID definition 802, and UPD data 803. The ID definition 802 stores a pair of the ID of data stored in the UPD data 803 and the storage location (address) of the UPD data. A set of pairs by the number of IDs is stored. The customization tool according to the second embodiment changes a data value corresponding to an ID defined for customization. When the ID definition 802 does not define the ID of customized data for use, a new ID corresponding to the customized data is added to the ID definition 802. A UPD file exists for each device driver, and can be customized even in the following case. That is, a customized driver set corresponding to a given model can be used to further customize another model. For example, the setting contents of a customized driver set corresponding to a given model can be used to customize a device of another model. Since the ID definition 802 uses a customization ID, a printer driver of a new version can inherit the settings of a previously customized printer driver. Note that a customization-compatible printer driver is customized by the customization tool. The printer driver is configured to load the UPD file 2043 upon installation or initial activation, and load the UPD data 803 which is stored in correspondence with a predetermined ID in the ID definition 802 of the UPD file 2043. Assume that the UPD file 2043 created by the customization tool stores, in the ID definition 802, an ID "CUSTOMIZED" and an address X serving as the storage location of the data. The customization-compatible printer driver is configured in advance to, when the ID information "CUSTOMIZED" is stored in the ID definition 802, read out an address corresponding to the information upon the completion of installation or upon initial activation. Hence, when the ID definition 802 of the UPD file 2043 contains the ID "CUSTOMIZED", the printer driver reads out the address X of corresponding data from the ID definition upon the completion of installation or upon initial activation. Subsequently, the printer driver further reads out the data structure of a device mode serving as actual driver setting data from the data 803 at the address X. In this case, the address X may be an absolute address. Alternatively, the start address of the data 803 may be stored in the header 801, and an offset address from the start address of the data 803 may be set as the address X. By preparing the UPD file in this manner, a customized printer driver can automatically load a UPD file created by the customization tool, and automatically preset the default setting values of the printer driver as a device mode upon the completion of installation or upon initial activation. Consequently, the action environment of the customized printer driver can be easily constructed.

The updated UPD data 803 contains UPD data 8031 of a base driver, and customized data 8032. The UPD data 803 (base UPD data 8031) contains print setting data (DEVMODE) displayed as default setting values on a printer driver UI, profile data representing the profile (favorite settings) of print setting data, and stamp data. Similarly, the customized data 8032 contains print setting data (DEVMODE) 8032a which is customized to default settings, customized profile (favorite) data 8032b, and customized stamp data 8032c which will be described in the second embodiment. The customized profile data is a set of print setting parameters which are given values set by customization operation for items settable in the printer driver. Profile data is given a name for each set, and a plurality of names sometimes exist. The stamp data is used for one or all of the profile data. The customized DEVMODE data 8032a includes print settings used by a printer driver in a computer in which the printer driver is installed. The customized DEVMODE data 8032a can be utilized as print setting information of a printer without changing the format of the customized DEVMODE data 8032a.

FIG. 39 is a view showing an example of the data structure of the print setting data (DEVMODE) 8032a serving as the device mode (default setting values). In FIG. 39, the print setting data (DEVMODE) 8032a stores the orientation (dmOrientation), paper size (dmPaperSize), paper width (dmPaperWidth), and the number of copies (dmCopies). The DEVMODE data structure is stored in the registry. The printer driver 2041 reads/writes the DEVMODE data structure stored in the registry, and can load a default print setting environment and a "favorite" (to be described later) and reflect them in a user interface.

In the second embodiment, customized print setting data is saved in a UPD file in the device mode (DEVMODE) format. The device mode is the name of a data structure for storing print setting data defined by popular OSs. In the data structure of the device mode, various print settings are stored in a registry area managed by the OS of the HD 11 or the data area 903 (FIG. 9) of the UPD file similarly stored in the HD 11.

The printer driver 2041 implements print settings corresponding to values which are read out from the registry area and set in action. The printer driver 2041 reads out the device mode, generates PDL data having print settings corresponding to the device mode, and transfers the data to a printer to print. The printer executes print processing in accordance with the print settings of the PDL format that are transferred from the printer driver.

<Outline of Customization>

Processing of changing a UPD file (setting definition information) by the customization tool (application 201) according to the second embodiment will be explained. The customization tool loads a customization-compatible driver set serving as a customization base. The customization tool corrects the UI-related data file (UPD file) of the base device driver, and creates a driver set containing the customized UPD file. The customization tool outputs, as a customized driver set, the driver set whose UPD file has been changed. The driver set has the ".inf format" compatible with installation by Add Printer so as not to contain any installer. Add Printer is a procedure which is provided by a Windows® operating system and used to add a printer. However, a driver set may be packaged with an installer.

Figure 42:
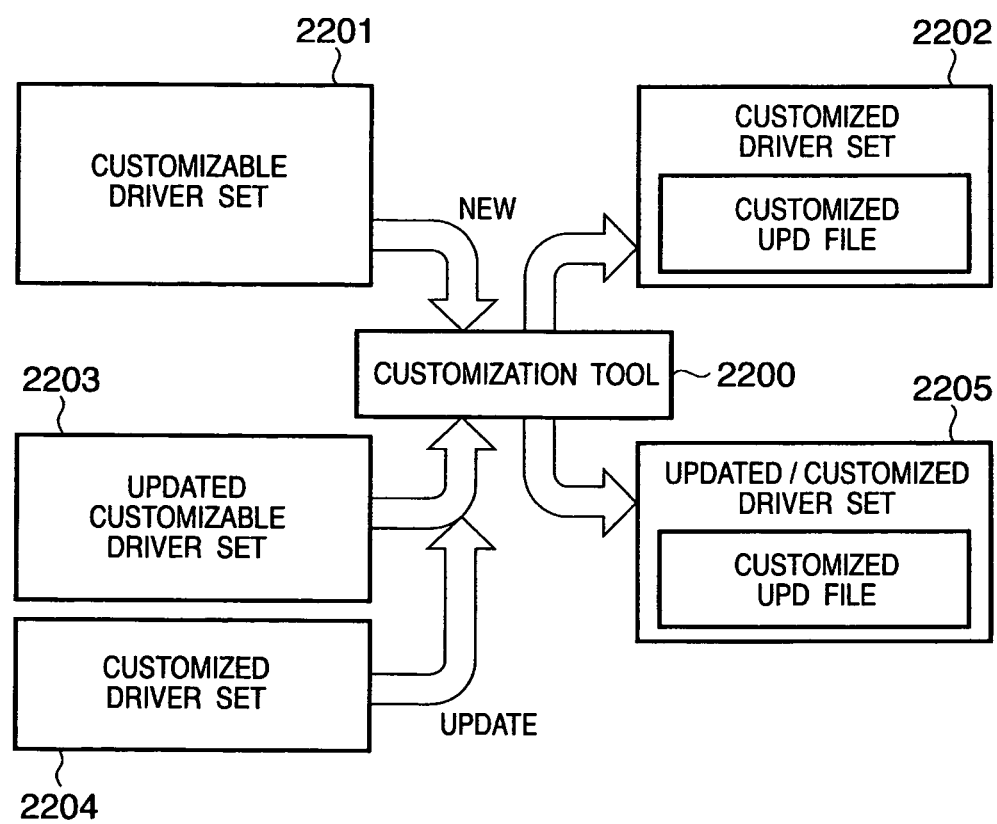
FIG. 42 is a view for explaining customization of a driver set according to the second embodiment.

FIG. 42 is a view for explaining customization of a driver set. FIG. 42 shows a driver set necessary when a customization tool 2200 according to the second embodiment creates a driver set, and a created driver set. In FIG. 42, the upper half (part above the customization tool 2200) represents a state transition in which a newly customized driver set is created. The customization tool 2200 rewrites a UPD file in a driver set 2201 on the basis of the base customizable driver set 2201, creating a customized driver set 2202.

The lower half represents a state transition in update. Update is to inherit the settings of a previously customized driver to a driver of a new version. The customization tool 2200 uses an updated base customizable driver set 2203 and an updated (customized) driver set 2204 of an old version.

The customization tool 2200 inputs customized data of the customized driver set 2204 of an old version into the updated customizable driver set 2203, creating an updated/customized driver set 2205. The customization tool 2200 is necessary when the newly customized driver set 2202 is to be created, and when the settings of a previously customized driver are inherited to a driver of a new version.

<Customization Operation>

FIG. 24 is a view showing an operation window upon the activation of the customization tool 2200 capable of customizing the default setting value of a printer driver stamp in the host computer 3000 according to the second embodiment.

Figure 25:
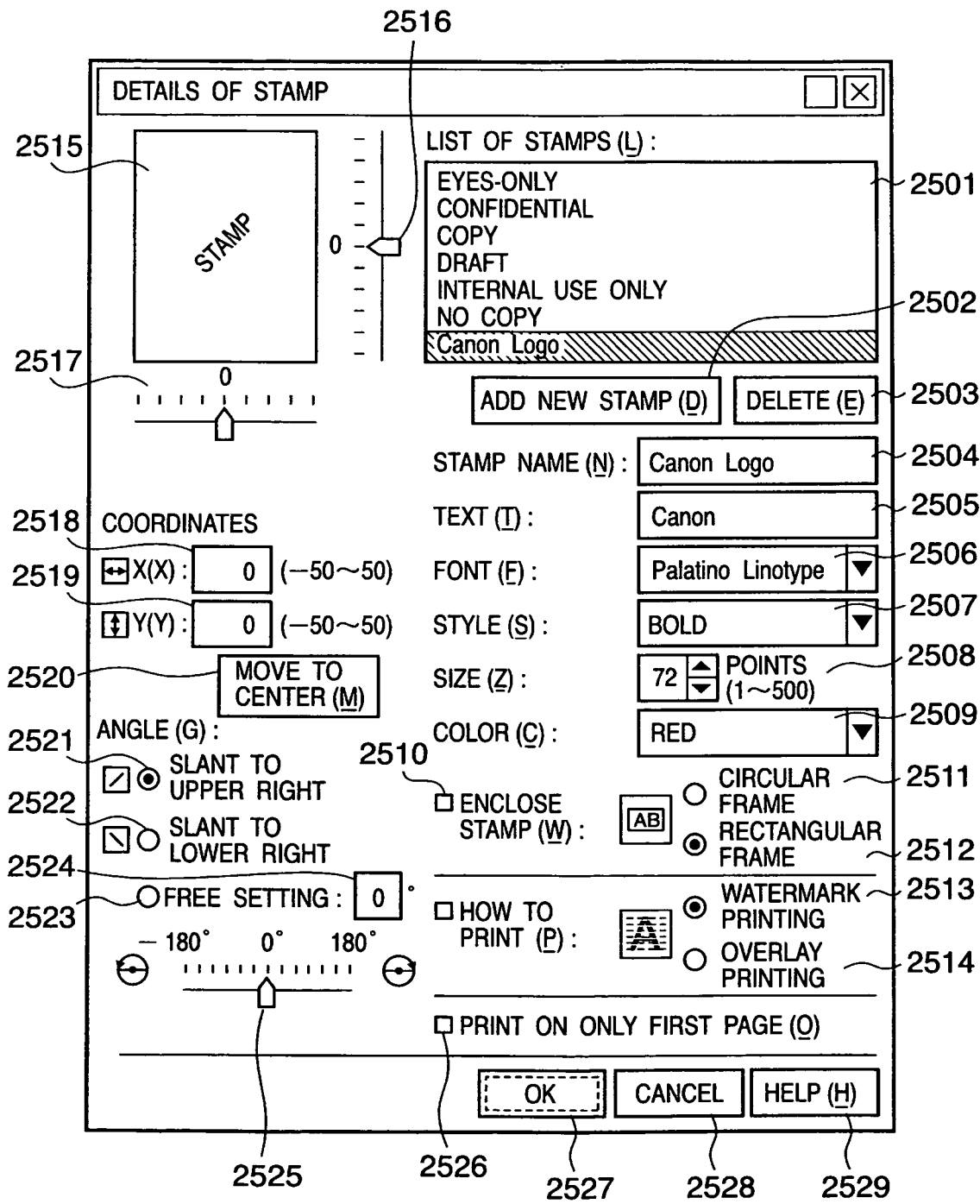
FIG. 25 is a view showing an example of UI installation capable of customizing details of the stamp.

When a button 2401 is clicked, a common dialog is opened to allow designating a folder for storing a driver set (install set) to be customized. The tool analyzes the UPD file of a driver set designated with the button 2401, and analyzes OSs and drivers supported by the driver set (as described above, a UPD file is held for each printer model). Upon the completion of the analysis, a list of compatible drivers is displayed in a list view 2402. The user selects an arbitrary driver name from the list view 2402 and performs customization. When a check box 2403 is set ON, a button 2404 is enabled (operable). Further, the button is clicked to display the property dialog of the selected driver, allowing the user to designate the default values of various controls (UI components) of the printer driver. When the check box 2403 is set OFF, the button 2404 is disabled (inoperable), and the property dialog window of the selected driver cannot be opened. By the same operation, the "favorite" settings of the printer driver can be customized using a check box 2405 and button 2408. The "stamp" settings of the printer driver can be customized using a check box 2406 and button 2409. For example, when the check box 2406 is set ON, the button 2409 is enabled (operable). Further, the button 2409 is clicked to display a stamp property dialog shown in FIG. 25, allowing the user to edit the default values of detailed settings of the stamp. When the check box 2406 is set OFF, the button 2409 is disabled (inoperable), and the stamp property dialog window cannot be opened. Stamp information which is newly added or edited in the stamp property dialog shown in FIG. 25 is created and saved in the customized stamp data 8032b in the customized UPD data 8032.

Figure 26:
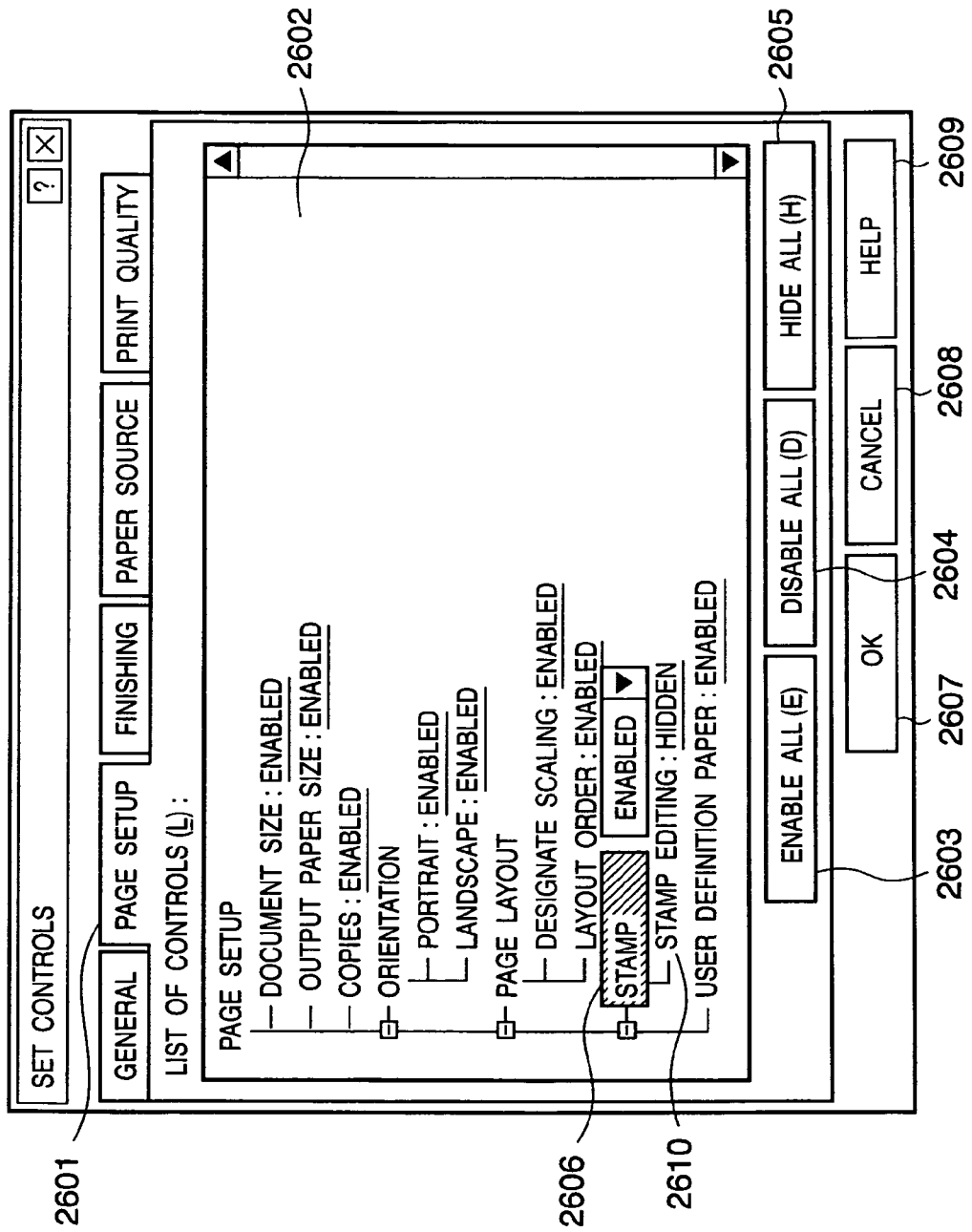
FIG. 26 is a view showing an installation window capable of customizing the display attributes (display/hide and enable/disable) of a control on a printer driver UI.

The customization tool according to the second embodiment also provides a function of customizing the display/hide attributes of controls (UI components) in the driver dialog window. When a check box 2407 is set ON and a button 2410 is clicked, a control setting window shown in FIG. 26 is displayed. The window in FIG. 26 allows setting the default values of the display/hide and enable/disable attributes of controls in the driver dialog window, for example, the default value of the display/hide attribute of the stamp property button 2409.

When a button 2412 is clicked, the setting contents of the driver UI, favorite, stamp, and control display/hide attribute that are set by the above operation are reflected in creating a customized driver. In other words, the customized default setting information is saved in a UPD file. If no button 2412 is clicked, the settings are not reflected and are discarded. When a button 2411 is clicked, the setting contents are not reflected and are discarded.

To save a customized printer driver, a reference button 2413 must be clicked to designate a storage location in a common folder designation dialog. Further, a creation button 2414 is clicked to save the customized driver set in the external memory 11 of FIG. 23. How to save customization contents in a driver configuration file (UPD file) when a customized driver set is created will be described in detail later with reference to FIG. 28.

A method of customizing the detailed stamp window shown in FIG. 25 will be explained in detail. Default contents (before customization) of a list box 2501 are a list of stamps set in shipping a printer driver from the factory. To delete a given stamp from defaults, the stamp to be deleted is selected from the list, and a deletion button 2503 is clicked. In the second embodiment, one or more stamps must be prepared. When stamps in the stamp list are deleted to one, the deletion button is grayed out (displayed not to select it) to inhibit deletion of the stamp.

To add a new stamp, a new stamp addition button 2502 is clicked. Details of the newly added stamp can also be designated. A stamp name can be designated in a text box 2504. The display text of the stamp can be designated in a text box 2505. The display font of the stamp can be designated in a combo box 2506. The style (normal/bold/italic/bold+italic) of the display font of the stamp can be designated in a combo box 2507. The display font size of the stamp can be designated in a spin control 2508. The display color of the stamp can be selected from a list in a combo box 2509.

When a button 2510 is set ON, the frame around a stamp text can be designated. A circular frame can be designated with a radio button 2511, and a rectangular frame can be designated with a radio button 2512. The relationship between the stamp text and the print contents of a base page can be designated by the printing method. Watermark printing can be designated with a radio button 2513, and overlay printing can be designated with a radio button 2514. Two methods are prepared to designate the print position of the stamp. The position may be adjusted with a horizontal slide bar 2517 and vertical slide bar 2516 while a preview display 2515 is checked. Alternatively, the position can be set by directly inputting relative coordinates in text boxes 2518 and 2519. When a button 2520 is clicked, the stamp is moved to the center of the page. The default direction in which the stamp text is drawn is the horizontal direction (left to right of the print page). When a radio button 2521 is selected, the drawing direction changes to a diagonal direction from the lower left to upper right of the page. When a radio button 2522 is selected, the drawing direction changes to a diagonal direction from the upper left to lower right of the page. When a radio button 2523 is selected, the angle of the drawing direction can be freely set. The numerical value of the angle can be directly input to a text box 2524, or adjusted with a slide bar 2525. If a check box 2526 is OFF, the stamp is printed on each print page. When the check box 2526 is set ON, the stamp is printed on only the first page. The second embodiment does not explicitly set the stamp order change control, but a control capable of changing the stamp order is generally provided as another embodiment.

A method of customizing the control setting window shown in FIG. 26 will be explained. This window is made up of a plurality of tab sheets, and settable control/display attributes (e.g., display/hide and enable/disable) are categorized on the basis of the sheet of a print setting UI (to be referred to as a driver UI hereinafter and illustrated in FIG. 31) provided by a printer driver. A tab sheet is selected, and a control/display attribute to be set is displayed in a control list tree view 2602. A tab sheet 2601 is currently selected, and items displayed in the tree view are controls on the "page setup" sheet of the driver UI. A "stamp" control 2606 has a focus and represents a currently selected item. When the display attribute of the control 2606 having the focus is set "enabled", the stamp check box of the driver UI is enabled to allow detailed settings of the stamp in the customized driver UI. To the contrary, when the control 2606 is set "disabled", the stamp check box is grayed out to inhibit detailed settings of the stamp in the customized driver UI.

When "display" is designated as the display attribute of a "stamp edit" control 2610, the stamp edit button is always displayed in the customized driver UI. When "hidden" is designated as the display attribute of the "stamp edit" control 2610, the stamp edit button is not displayed and cannot be seen from the user. When a button 2603 is clicked, all controls on the tab sheet of the driver UI are enabled. When a button 2604 is clicked, all controls on the tab sheet of the driver UI are disabled and cannot be set by the user. When a button 2605 is clicked, all controls on the tab sheet of the driver UI are hidden.

When an OK button 2607 is clicked, contents set by the user are temporarily saved in the storage device of the customization utility, and the control setting dialog is closed. When a cancel button 2608 is clicked, the dialog is closed without saving the setting contents. When a help button 2609 is clicked, help information on a target control is displayed.

<Customization Processing Flow>

Figure 27:
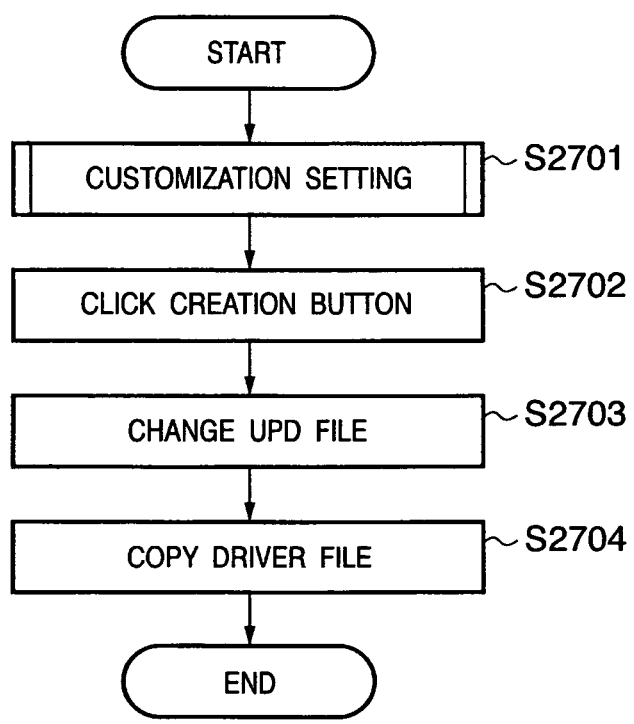
FIG. 27 is a flowchart showing processing of customizing the stamp.

FIG. 27 is a flowchart showing the action of the customization tool according to the second embodiment. In step S2701, the customization tool performs customization setting processing in accordance with a user operation. The user operation includes a default value edit operation via the UI of the customization tool in FIG. 24. The default edit operation includes display of the stamp customization window as shown in FIG. 25 and stamp customization processing. When base action setting information is designated, a driver customization program reads the designated action setting information file (action setting data) from the UPD file 2043, and displays the value in the UI. The user performs an operation to delete/add a stamp or change the setting values of detailed stamp settings in the window. In accordance with the operation, the driver customization program changes, in accordance with an operation, the parameter values of setting items contained in the base action setting information file, and temporarily saves the changed parameter values.

If the creation button 2414 in FIG. 24 is designated in step S2702, the customization tool changes the UPD file serving as setting definition information containing UI-related data of the printer driver 2041. In step S2704, a customized printer driver is created in a location designated with the reference button 2413.

Figure 28:
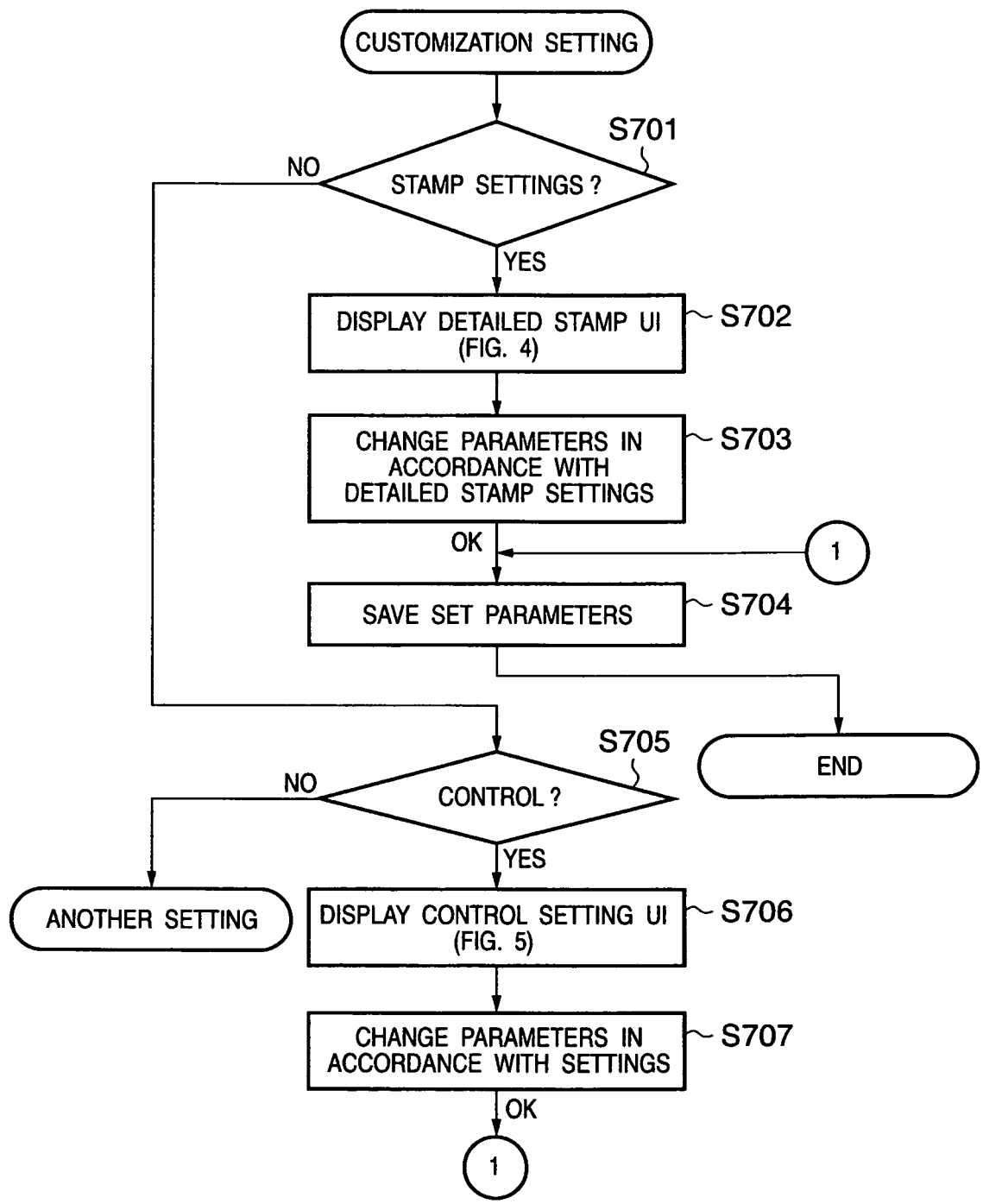
FIG. 28 is a flowchart showing processing of customizing the stamp.

FIG. 28 is a flowchart showing details of step S2701 in FIG. 27. It is determined whether to perform stamp settings (S2701). At this time, if the button 309 is clicked in the UI of FIG. 24, "YES" is determined. If it is determined to perform stamp settings, the detailed stamp UI in FIG. 25 is displayed (S702). The values of items contained in print setting information are changed in accordance with a user operation on the detailed stamp UI (S703). Changeable items include stamp contents (e.g., the text, font, color, and size of the stamp), and the stamp position (e.g., the inclination and position of a stamp). Further, for example, a stamp can be added or deleted. If an OK button 2527 is clicked on the UI, parameters set in step S703 are saved (S704).

If it is determined not to perform stamp settings, it is determined in step S705 whether to edit controls. If it is determined to edit controls, the control setting UI window shown in FIG. 26 is displayed (S706). The parameters of controls are set in accordance with an operation on the UI window (S707). The parameters of set controls include a stamp enable control representing whether to enable/disable the stamp, and a stamp edit control representing whether to display/hide the stamp edit button in the printer driver UI, i.e., whether to permit/inhibit editing of the stamp. If the OK button 2607 is clicked, the flow branches to step S704.

<Customizable Parameters>

Parameters which can be customized in the procedures of FIG. 28 include the following items:
(1) the display text of the stamp;
(2) the display font of the stamp;
(3) the style (normal/bold/italic/bold+italic) of the display font of the stamp;
(4) the display font size of the stamp;
(5) the display color of the stamp;
(6) designation of a frame (circular or rectangular frame) around the stamp text;
(7) the relationship (watermark printing or overlay printing of the stamp) between the stamp text and the print contents of a base page on which the stamp text is overlaid;
(8) the print position of the stamp;
(9) the drawing direction (inclination) of the stamp text;
(10) pages (respective print pages or the first page) on which the stamp is printed;
(11) the display attribute of the stamp (whether to "enable" or "disable" stamp settings in the printer driver UI); and
(12) the display attribute of stamp editing (whether to "display" or "hide" the stamp edit button in the printer driver UI).

<Driver UI>

Figure 30:
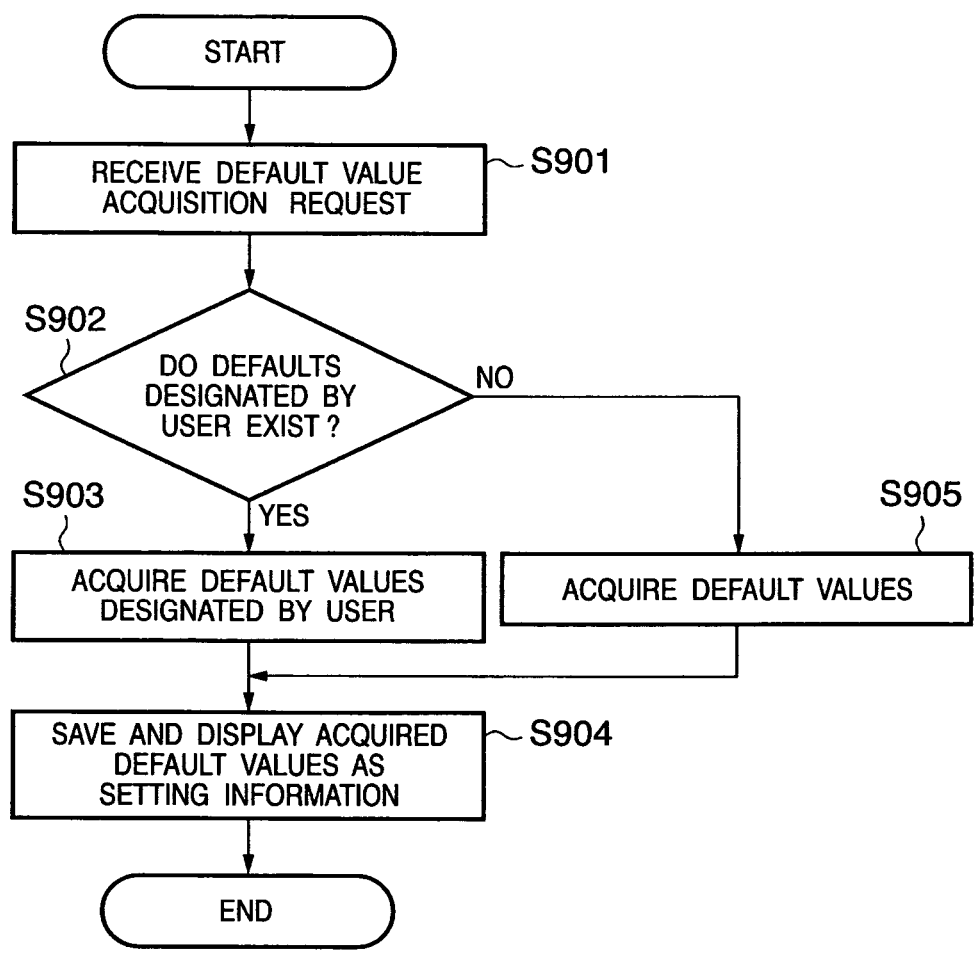
FIG. 30 is a flowchart showing processing of displaying default values in a UI window when a printer driver program is activated according to the second embodiment.
Figure 31:
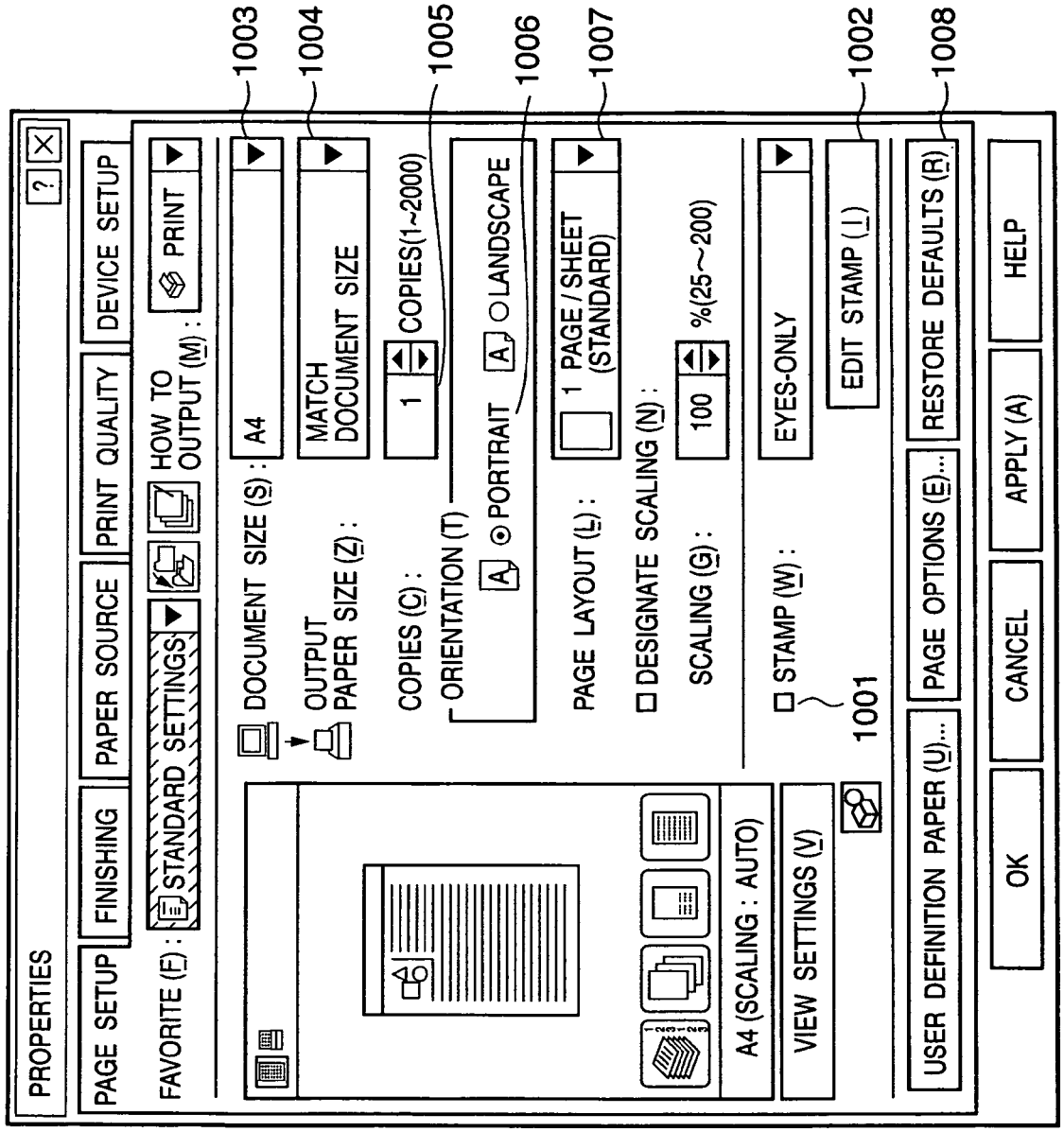
FIG. 31 is a view showing an example of a customized driver UI.
Figure 32:
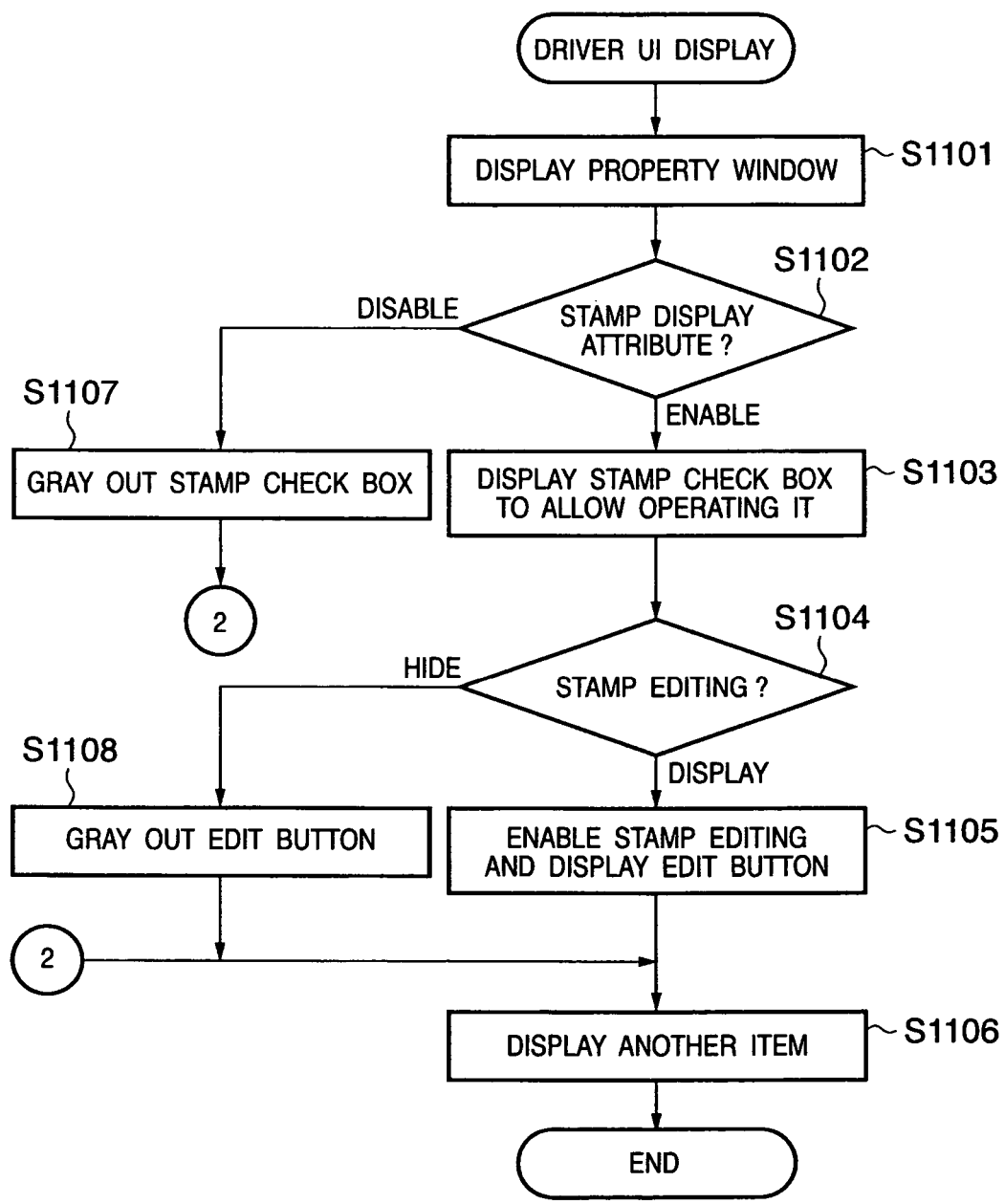
FIG. 32 is a flowchart showing some of the display procedures of the customized driver UI.

FIG. 30 is a flowchart for explaining processing of displaying default values in a UI window when the printer driver program 2041 is activated according to the second embodiment. When a default value acquisition request is received in step S901, the flow advances to step S902. The default value acquisition request is issued from the printer driver itself when the printer driver is installed or activated for the first time after installation. In step S902, it is confirmed whether default values designated (customized) by the user have been stored. Whether customized default values have been stored can be determined by referring to the definition field to check whether it has a customization ID. If the customized default values have been stored, the flow advances to step S903 to load them from the UPD file. In step S904, the loaded values are saved as initial print setting information, and displayed in the driver UI window shown in FIG. 31. A print setting information profile which is normally prepared by the vendor of the printer driver is given a name "standard settings". FIG. 31 shows an example in which the profile "standard settings" is applied. If no default value customized by the user is stored in step S903, the flow advances to step S905 to load preset default values from the UPD file. In step S904, these default values are saved as print setting information and displayed in the driver UI.

FIG. 31 shows an example of the driver UI window. Through the driver UI window, the user operates a document size box to set and change the document size, an output paper size box 1004 to set and change the paper size, a copy count box 1005 to set and change the number of copies, an orientation radio button 1006 to set and change the paper orientation, a layout box 1007 to set and change the layout, and a stamp check box 1001 and stamp edit button 1002 to set and change the stamp. These operations are limited to items which are enabled by control settings.

For example, when the display attribute of the "stamp" control 2606 in FIG. 26 is set "enabled", the stamp check box 1001 of the printer driver window in FIG. 31 is enabled to permit detailed stamp settings on the customized driver UI. To the contrary, when the control 2606 is "disabled", the stamp check box 1001 is grayed out to inhibit detailed stamp settings on the customized driver UI. When "display" is designated as the display attribute of the "stamp edit" control 2610, the button 1002 is always displayed. In contrast, when "hide" is designated as the display attribute of the "stamp edit" control 2610, the button 1002 is hidden and cannot be seen by the user or edited. When the button 2603 in FIG. 26 is clicked, all controls on the current tab sheet of the driver UI are enabled. When the button 2604 is clicked, all controls on the current tab sheet of the driver UI are disabled, i.e., cannot be set by the user. When the button 2605 is clicked, all controls on the current tab sheet of the driver UI are hidden.

By the above processing, the default values of stamp settings can be customized. For example, the IT manager customizes the print options of a device driver, and easily distributes many drivers having the default settings of the print options desired by the user. The print setting load on the user can be reduced to increase the print setting efficiency.

Note that the second embodiment has described a printer driver. However, the present invention can also be applied to, e.g., a scanner, or a digital multi-functional peripheral built by integrating a scanner and printer. When the present invention is applied to a general device driver, the print settings of the printer driver can be translated into the action settings of the general device driver.

Third Embodiment

A preferred embodiment of the present invention will be described in detail below with reference to the accompanying drawings. The third embodiment will describe a customization tool capable of customizing a "favorite" which is a profile of print settings. A description of a part common to the first embodiment will be omitted. The configuration of the third embodiment is common to that of the second embodiment in FIGS. 23 and 2. In the third embodiment, a plurality of print setting profiles can be prepared in the UPD file of an installed driver set. One (profile saved at a predetermined address) of the profiles is registered as default values in a registry when the driver is installed. The remaining profiles are loaded into a computer and saved as part of print setting information when the driver is installed. These profiles can be selected from the printer driver as selectable profile choices (depending on settings).

FIG. 31 is a view showing a display example of a driver UI, i.e., print setting window in a host computer 3000 according to the third embodiment. FIG. 31 shows a "page setup" window in the print setting window at "standard settings" as represented by 301. As the standard settings, a document size 1003 is "A4", an output paper size 1004 is "match document size", a copy count box 1005 is "1", an orientation 1006 is "portrait", and a page layout 1007 is "one page/sheet". When the print setting window is displayed for the first time or a "restore defaults" button 1008 is designated, the default values of various items are displayed. At this time, a print processing-related program 204 (FIG. 2) loads default values and displays them in the window shown in FIG. 31. In the second embodiment, the default values are put together into a favorite profile named "standard settings", and saved at a predetermined address.

Figure 33:
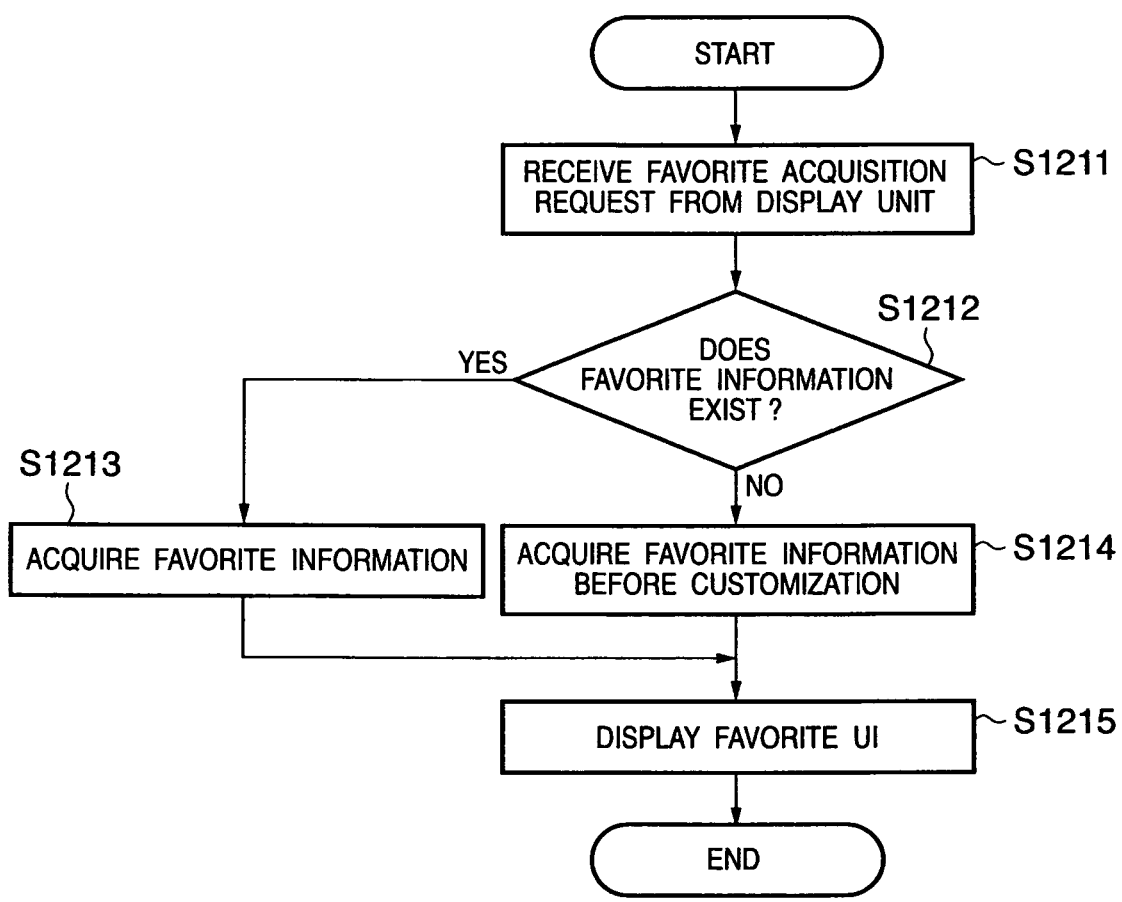
FIG. 33 is a flowchart for explaining processing of displaying a favorite in a program related to print processing according to the third embodiment.

FIG. 33 is a flowchart for explaining processing of displaying a favorite in, e.g., a UI window upon activation of the printer driver as shown in FIG. 31 in the print processing-related program 204 according to the third embodiment. In this case, favorite items are stored in a location complying with the basic system rule of the host computer 3000. Favorite items designated by the user in the following way are stored in a different location.

When a "favorite" acquisition request is received in step S1211, the flow advances to step S1212. The "favorite" means a group of print settings of a printer driver 2041. The user can obtain a desired action environment by designating a "favorite" formed from a group of settings through the user interface of the printer driver 2041. For example, a user who often uses the stamp and staple can set a plurality of settings to desired values and print by only registering a pair of staple and stamp settings as a "favorite" and selecting this "favorite". In the third embodiment, profile data of the favorite will be called favorite data. In step S1212, it is confirmed whether favorite data designated by the user has been stored. If the favorite data designated by the user has been stored, the flow advances to step S1213 to acquire the favorite data designated by the user and display it in step S1214. If the favorite data designated by the user has not been stored in step S1212, the flow advances to step S1215 to acquire favorite data designated in advance and display it in step S1214. In the third embodiment, the favorite data designated by the user is stored in the UI-related data file (UPD file) of the printer driver. Default favorite data which is initially installed is named, e.g., "standard settings", and the favorite data is saved with this name in the data field of the UPD file. In step S1212, for example, IDs in the definition field of the UPD file are searched for an ID representing customized data. If a corresponding ID is detected, it can be determined that customized default favorite data exists.

Figure 34:
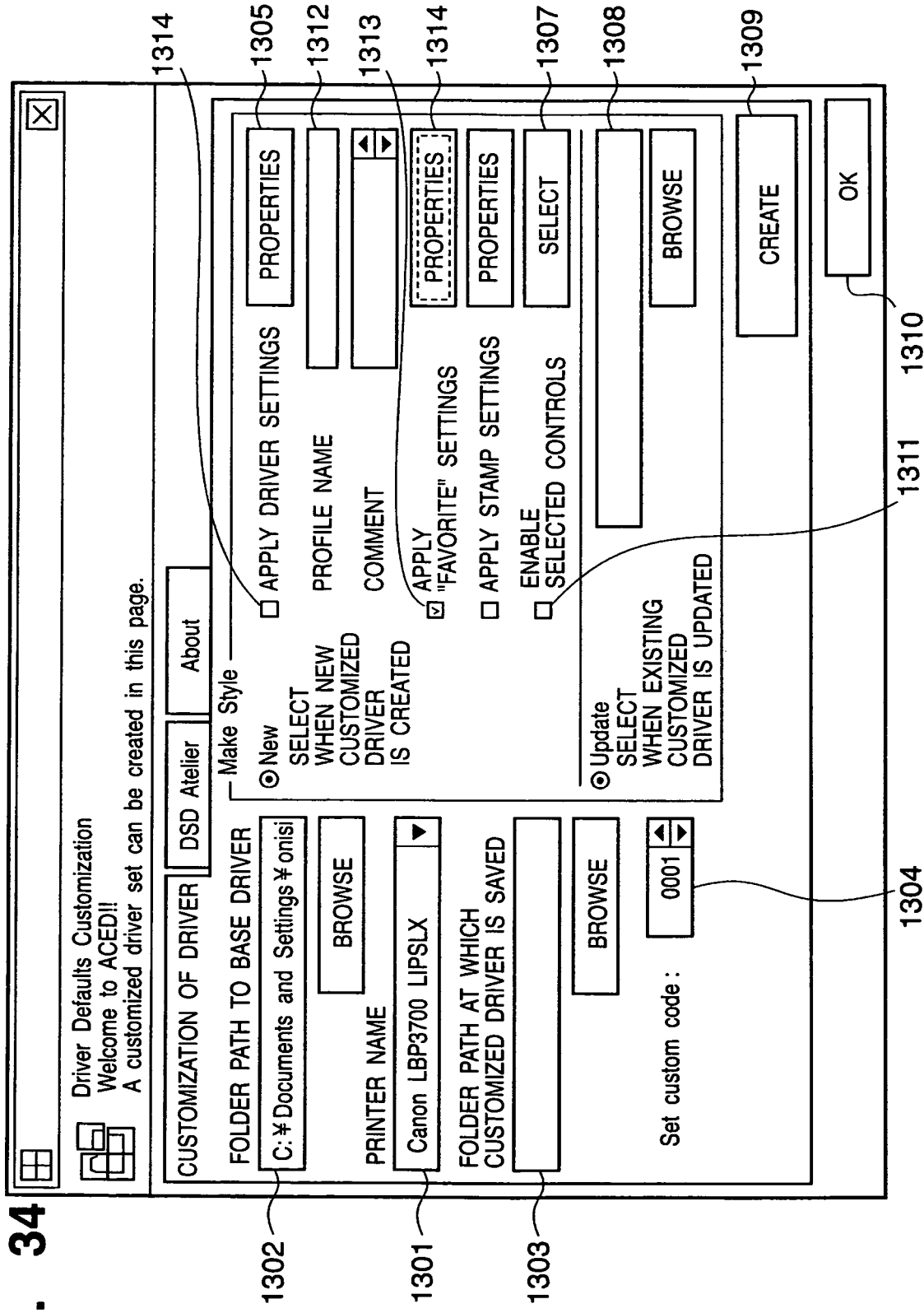
FIG. 34 is a view showing an example of the UI of a customization tool according to the third embodiment.
Figure 37:
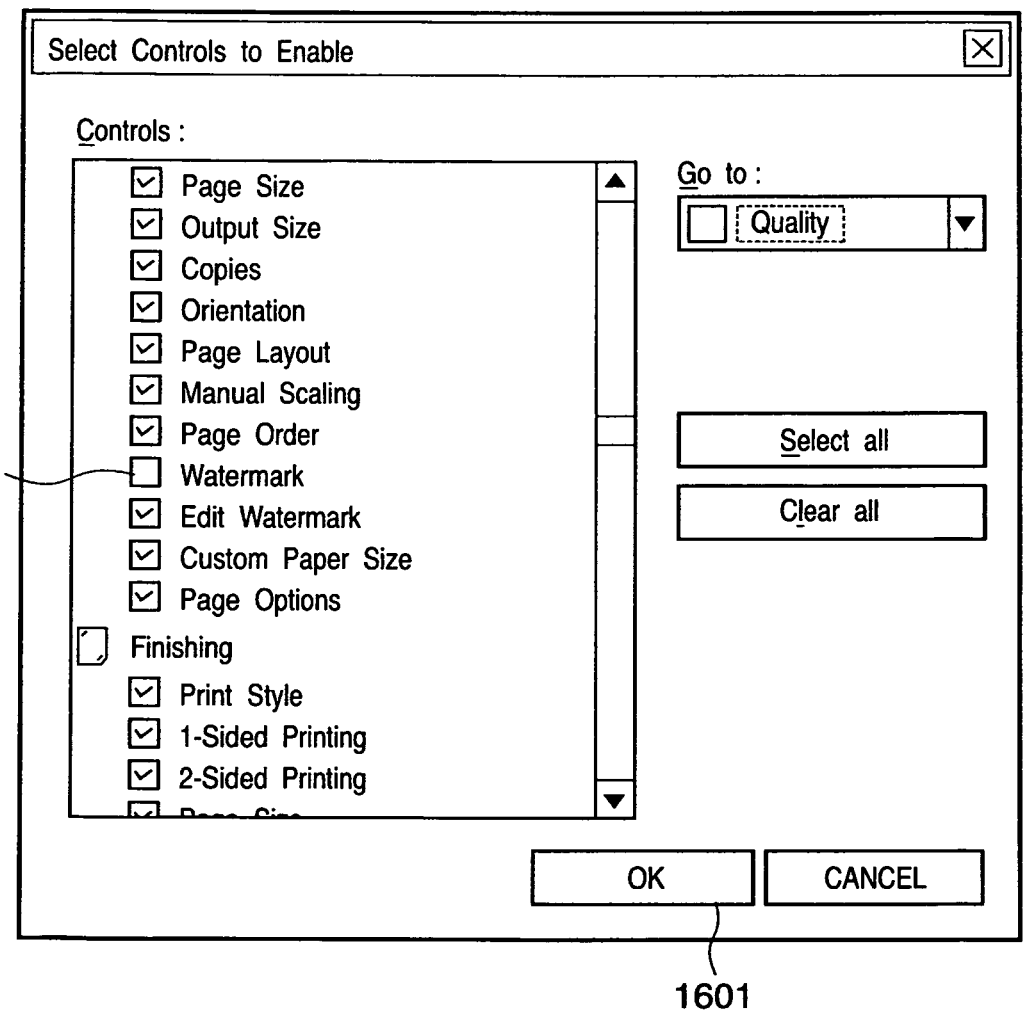
FIG. 37 is a view showing an example of a UI displayed by the customization tool in FIG. 34.

FIG. 34 is a view showing an example of the UI of the customization tool according to the third embodiment that is contained in an application 201 stored in an external memory 11. In FIG. 34, the customization tool contains a UI 1307 for designating whether controls are available in the printer driver UI. A list of controls which are designated to be unavailable can be stored as customized data in the UI-related UPD file of the printer driver. The user selects an "enable selected controls" check box 1311, and then the control selection button 1307 is selectably displayed. When the button 1307 is clicked, a UI window in FIG. 37 is displayed. In FIG. 37, checked ones of check boxes are available controls. Similarly, unchecked check boxes are unavailable controls. In the UI of FIG. 37, the user checks the check box of a control he wants to use, and does not check that of a control he wants not to use. These settings can be reflected when a creation button 1309 is designated. Details of FIG. 37 will be described later.

One feature of the customization tool is that no printer driver 2041 to be customized need be installed and default values can be easily set. More specifically, when a print setting ("Apply Driver settings") check box 1314 is checked and a print setting property button 1305 is designated (clicked), a printer driver UI as shown in FIG. 35 is displayed.

Figure 35:
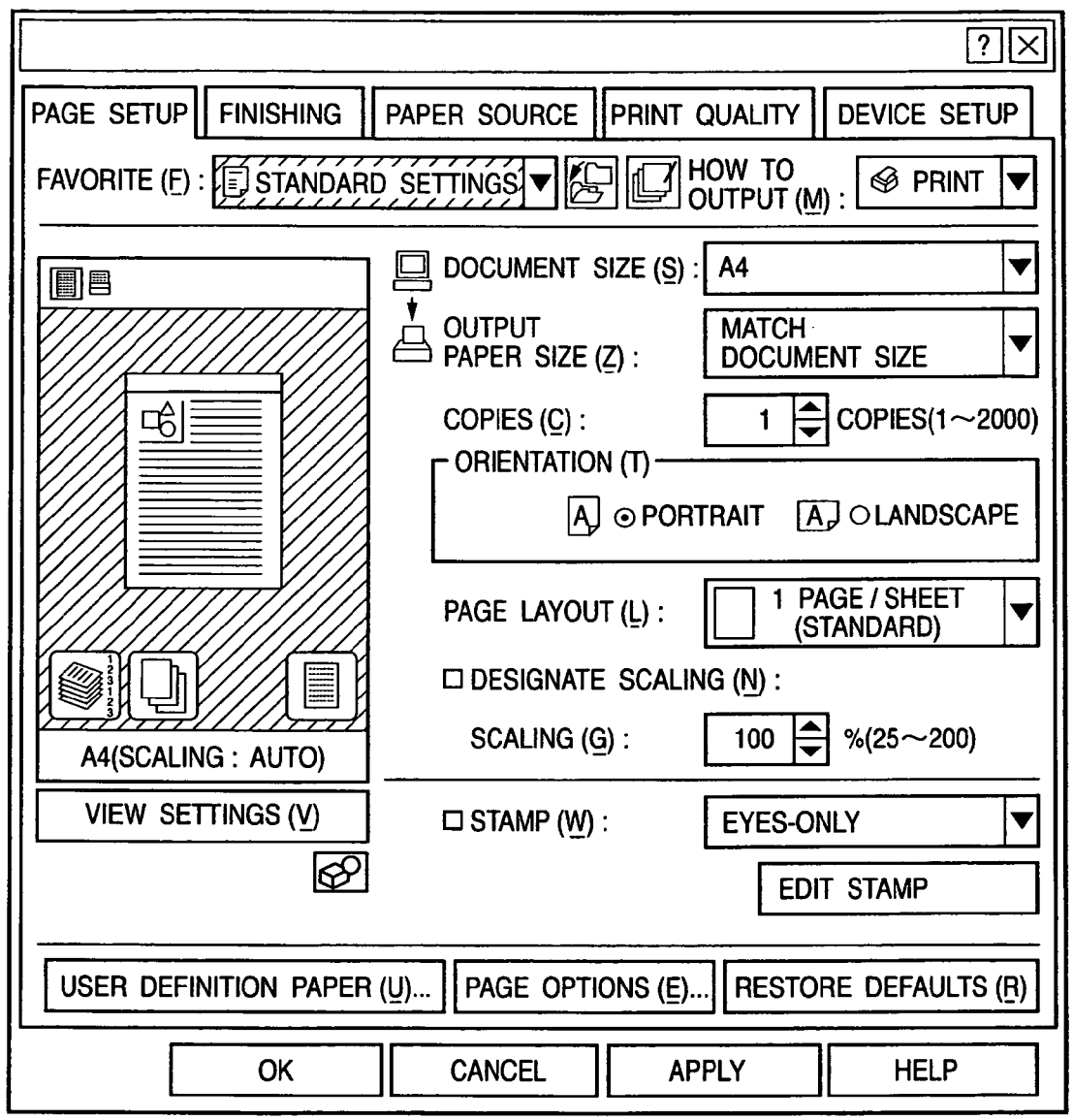
FIG. 35 is a view showing an example of a printer driver UI.

In FIG. 35, default print settings are displayed, in which the paper size is "A4", the output size is "match document size", the number of copies is "1", and one image is laid out on one page. The customization tool is implemented using a mechanism of reading out the printer driver 2041 by an OS 205 (FIG. 23) of the host computer. The conflict of the printer driver 2041 is also reproduced, and the default values of the customized printer driver 2041 can be reliably known. The conflict of the printer driver 2041 means a state in which print settings do not match the printer arrangement. For example, a conflict occurs when double-sided printing is set though the printer does not have any double-sided printing function. The default values of print setting information are given regardless of an environment where the printer driver is installed. If the default values are directly applied to an actual computer, a conflict may occur.

In FIG. 34, reference numeral 1301 denotes a name of a printer used for printing; 1302, a path to the basic driver; and 1303, a path to a folder which stores a customized driver. An input box 1304 is a custom code input field for specifying customized contents, and allows inputting an arbitrary value. This value is displayed at a portion (see FIG. 41) where version information of the printer driver is displayed, or a portion where a list of settings is displayed. From this display, the user can determine whether the installed printer driver is a customized one. The control selection button 1307 is used to select a control when the check box 1311 is checked to enable the selected control.

The UI-related UPD file of the printer driver is changed to create a customized UPD file when the creation button 1309 is designated (clicked). When the creation button 1309 is designated, a customized driver set except a UPD file to be changed is copied to a storage location, and the UPD file is stored after change processing. This processing is the same as that described in the first embodiment.

A case wherein a printer driver is updated using the display window in FIG. 34 will be explained. This update processing is to update a customized printer driver, and is executed when the "Update" radio button of "Make Style" is checked. The path to the folder of a customized driver set is input to the input area 1302, the path to the folder of a driver set to be updated is input to an input area 1308, and then the creation button 1309 is designated. In response to this, the customized driver set except a UPD file to be changed is copied to a location designated in the input area 1303, and the UPD file is stored at an address corresponding to the driver after change processing is done. For example, when a customized driver compatible with PDLX version 6.30 is updated to one for PDLX 6.40, a PDLX 6.40 driver which inherits customization made for PDLS 6.30 is created.

FIG. 37 is a view showing a UI displayed when the check box 1311 is checked in the customization tool of FIG. 34, the control can be selected, and the control selection button 1307 is designated. This display control is executed by the customization tool. In FIG. 37, a Watermark (stamp) check box 1600 for limiting the control is set unchecked. If an OK button 1601 is designated in this state, the display returns from FIG. 37 to FIG. 34, and the customization tool stores the customized state. If the creation button 1309 is designated, the customization tool generates a UPD file which describes a value representing an instruction to inhibit the user from operating the Watermark UI.

Figure 38:
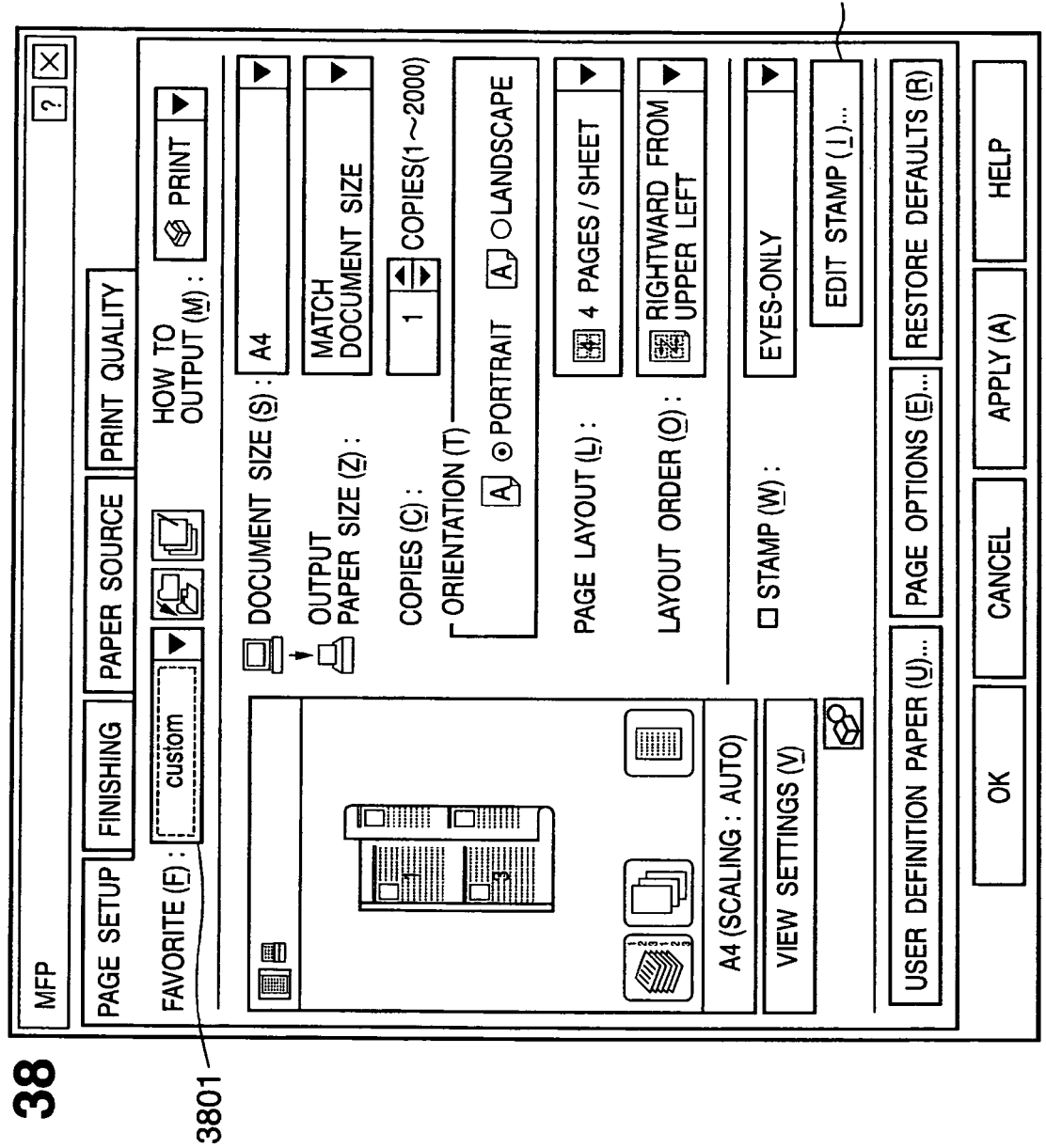
FIG. 38 is a view showing an example of the UI of a customized printer driver according to the third embodiment.

FIG. 38 is a view showing an example of the UI of the printer driver 2041 customized in the above fashion. The printer driver customized as described above loads a UPD file generated by the customization tool upon installation or activation, and displays the UI as shown in FIG. 38. Since the Watermark (stamp) check box 1600 is set unchecked in the example of FIG. 37, a stamp control 3800 in FIG. 38 is grayed out to limit and inhibit a user operation to the stamp. The user suffices to designate a check box in the UI as shown in FIG. 37, and controls which cannot be set by the user can be preset and assembled in advance in the printer driver 2041, which implements customization.

Figure 36:
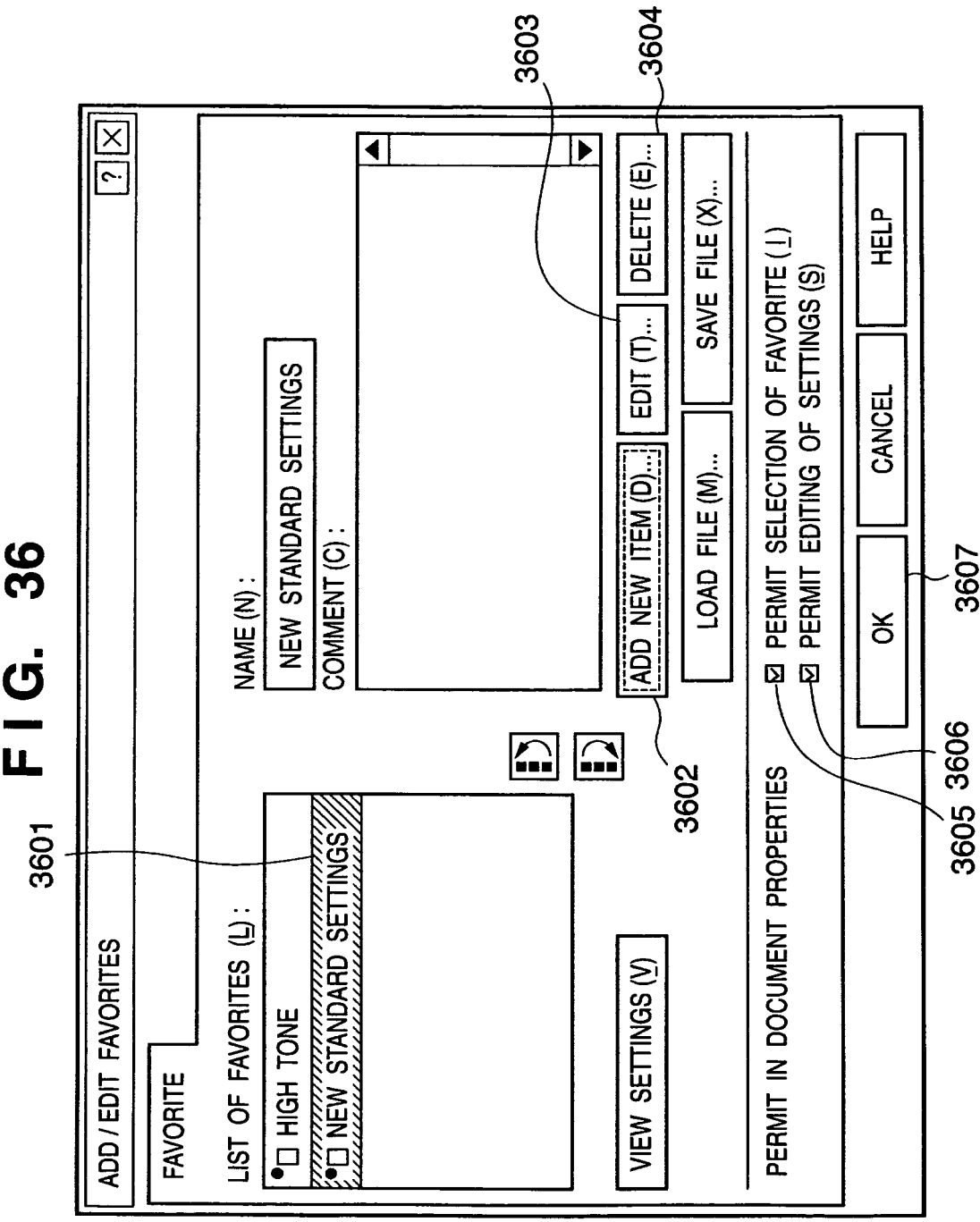
FIG. 36 is a view showing an example of a printer driver UI for adding and editing a favorite.

FIG. 36 is a view showing an example of a UI which is used to add, delete, and edit favorite data, and displayed when a favorite setting application check box 1313 is checked and the button 1314 is clicked. In FIG. 36, favorite data to be edited is selected from favorite data displayed in a favorite list 3601, a deletion button 3604 is clicked, and thereby the selected favorite data can be deleted. In addition, favorite data displayed in the favorite list is selected, an edit button 3603 is clicked, and parameter values contained in the existing favorite data, i.e., print settings specified by the favorite data can be changed. By clicking a new item addition button 3602, an item can be newly added to the favorite list. If a favorite selection permission check box 3605 is selected, selection of desired favorite data is permitted in the printer driver UI (see FIG. 38). The selected favorite data is loaded as print setting information into a data area where print setting information is stored. If a setting edit permission check box 3606 is selected, the setting values of items (items whose controls are enabled) of applied favorite data can be changed in the printer driver UI (see FIG. 38).

Figure 43:
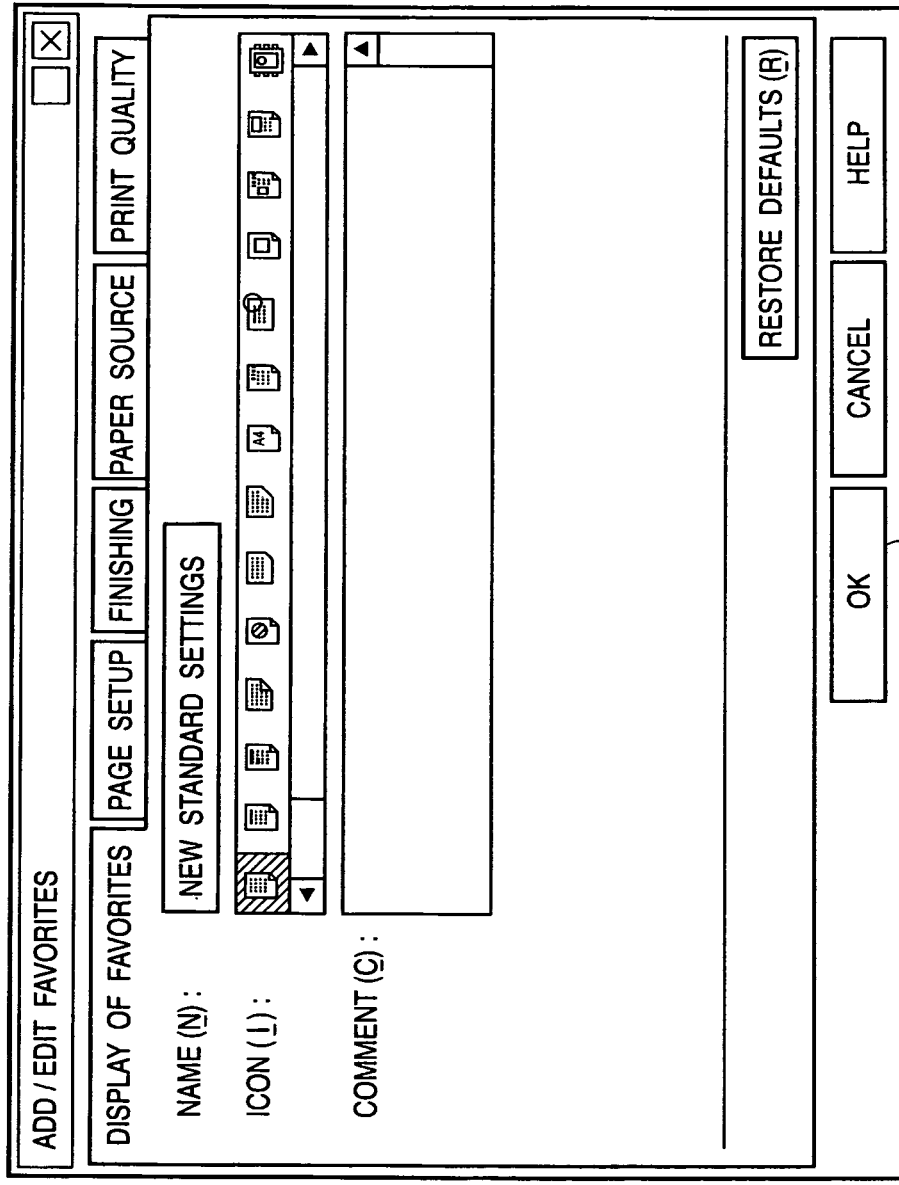
FIG. 43 is a view showing an example of a printer driver UI for setting the value of an item to be registered as a favorite.

FIG. 43 is a view showing an example of a UI which is used to set favorite data, and displayed when the new item addition or edit button is clicked. In FIG. 43, the name of favorite data is input to the name field, and print settings are input from the page setup, finishing, paper source, and print quality tags. Then, an OK button 2301 can be clicked to create print settings of favorite data.

In the third embodiment, a "favorite" using customized print setting data (device mode: DEVMODE) is created. The device mode is the name of a data structure for storing print setting data defined by popular OSs. In the data structure of the device mode, various print settings are stored in a registry area managed by the OS of the HD 11 or a data area 903 (FIG. 9) of the UPD file similarly stored in the HD 11. The UPD file has the structure shown in FIG. 9. When printer setting information is stored in the UPD file, it is saved in a format with which the structure can be reproduced.

The printer driver 2041 implements print settings corresponding to values which are read out from the registry area and set in action. The printer driver 2041 reads out the device mode, generates PDL data having print settings corresponding to the device mode, and transfers the data to a printer to print. The printer executes print processing in accordance with the print settings of the PDL format that are transferred from the printer driver.

By using the customization tool according to the third embodiment, favorite data corresponding to "standard settings" provided as preset values by the manufacturer is created. For example, when the print settings of the staple and stamp are input using the customization tool, they are written with the device mode (DEVMODE) structure at a predetermined address in data 903 of the UPD file. A customized printer driver is set in advance so as to read out a predetermined address. When the predetermined address is read out, the values of print setting data of the readout device mode (DEVMODE) format are set as default settings in the printer driver, i.e., copied to the print setting information area of the registry. Further, a "favorite" having the values in the device mode (DEVMODE) as setting values is assembled. The driver installed in this manner is sometimes called a customization-compatible driver. Note that the name of the "favorite" corresponding to standard settings is a name input to a "profile name" edit box 1312 in FIG. 34 in the customization tool.

"Favorites" added/deleted by the customization tool are reflected in a "favorite" combo box, and arrangement of their order can also be inhibited. "Favorite" data edited by customization is not saved in the registry (storage area), unlike a "favorite" held by a general device driver, and cannot be edited from the driver UI (red circle representing that editing is impossible is displayed). Hence, it is possible not to display a "favorite" edited by customization in the "favorite" add/edit dialog. Moreover, a "favorite" edited by customization is displayed with a mark representing that the settings have been customized, for example, a finger icon 3801 in FIG. 38. A favorite added by customization is exploited when the user operates the driver UI, changes print setting data, and then wants to restore it to customized print settings.

FIG. 39 is a view showing an example of the data structure of the device mode (DEVMODE). FIG. 39 shows a state in which the data structure stores the orientation (dmOrientation), paper size (dmPaperSize), paper width (dmPaperWidth), and the number of copies (dmCopies). The DEVMODE data structure is stored in the registry. The printer driver 2041 reads/writes the DEVMODE data structure stored in the registry, and can load a default print setting environment and "favorite" (to be described later) and reflect them in a user interface.

As an example of print settings which can be stored in the device mode, there are the following items in addition to the example in FIG. 39. That is, the document size, output paper size, page layout (how many logical pages are formed on one physical paper sheet), stamp, page frame, noborder, whether to print the date and time, whether to print a user name, whether to print a page number, and whether to set overlay printing can be defined as print settings of the page setup. Further, there can also be set double-sided printing, binding location (long/short edge), binding margin, delivery destination, whether to change the delivery destination for each copy, whether to change the True Type font with the printer font, whether to print in the toner saving mode, whether to use the Type Wing function, whether to perform image acceleration processing, and whether to always print a PDF file in the image mode. All these settings can be stored in the device mode and treated as a "favorite" by a customization-compatible printer driver or the customization tool according to the third embodiment.

Figure 40:
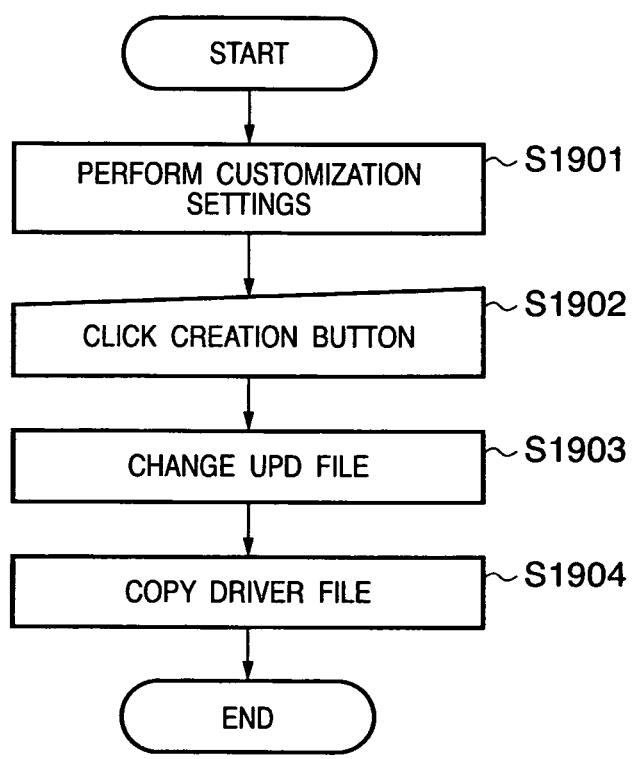
FIG. 40 is a flowchart showing the action of the customization tool according to the third embodiment.

FIG. 40 is a flowchart showing the action of the customization tool according to the third embodiment. In step S1901, a setting value is changed to one to be customized. This corresponds to processing of, for example, displaying the above-described display window in FIG. 34, setting the custom code 1304 in the window, and setting the printer setting property 1305, favorite setting property 1314, and the like to values desired by the user. If the creation button 1309 is designated in step S1902, a UPD file serving as the UI-related data file of the printer driver 2041 is changed. In step S1904, the driver set is copied to a base printer driver.

FIG. 9 is a view for explaining the data format of a UPD file. As shown in FIG. 9, the UPD file is made up of a header 901, an ID definition 902, and the data 903. The ID definition 902 stores a pair of a data ID stored in the data 903 and the storage location (address) of the data. A set of pairs by the number of IDs is stored. The customization tool according to the third embodiment changes a data value corresponding to an ID defined for customization. When the ID definition 902 does not define the ID of customized data for use, a new ID corresponding to the customized data is added to the ID definition 902.

A UPD file exists for each device driver, and can also be customized in the following case. That is, a customized driver set corresponding to a given model can be used to customize a driver set of another model. For example, the setting contents of a customized driver set for a given model can be used to customize a device of another model. Since the ID definition 902 uses a customization ID, a printer driver of a new version can inherit the settings of a previously customized printer driver.

Note that a customization-compatible printer driver is customized by the customization tool. The printer driver is configured to load a UPD file upon installation or initial activation, and load the data 903 which is stored in correspondence with a predetermined ID in the ID definition 902 of the UPD file. Assume that a UPD file created by the customization tool stores, in the ID definition 902, an ID "CUSTOMIZED" and an address X serving as the storage location of the data.

The customization-compatible printer driver is configured in advance to, when the ID information. "CUSTOMIZED" is stored in the ID definition 902, read out an address corresponding to the information upon the completion of installation or upon initial activation. Hence, when the ID definition 902 of the UPD file contains the ID "CUSTOMIZED", the printer driver reads out the address X of corresponding data from the ID definition upon the completion of installation or upon initial activation. Subsequently, the printer driver further reads out the data structure of a device mode serving as actual driver setting data from the data 803 at the address X. In this case, the address X may be an absolute address. Alternatively, the start address of the data 903 may be stored in the header 901, and an offset address from the start address of the data 903 may be set as the address X.

By preparing the UPD file in this way, a customized printer driver can automatically load a UPD file created by the customization tool, and automatically preset the default setting values of the printer driver as a device mode. As a result, the action environment of the customized printer driver can be easily constructed.

FIG. 42 is a view for explaining customization of a driver set, which is the same as that in the first embodiment.

FIG. 41 is a view showing an example of version display of the printer driver. FIG. 41 shows an example in which a customization code ("0001") is added to the version field of a version information dialog. The customized driver adds the custom code value 1304, which is input by the customization tool, following a driver version displayed in the "version information" tab of the driver UI, and thereby displays the custom code value 1304.

Processing of changing a UPD file by the customization tool according to the third embodiment will be explained. The customization tool creates a customized driver set by the following procedures. First, the customization tool loads a customization-compatible driver set serving as a customization base. The customization tool corrects the UI-related data file (UPD file) of the base device driver, and creates a driver set containing the customized UPD file. The customization tool outputs, as a customized driver set, the driver set whose UPD file has been changed. The driver set has the ".inf format" compatible with installation by Add Printer so as not to contain any installer. However, a driver set may be packaged with an installer.

<Customization Processing Flow>

Figure 44:
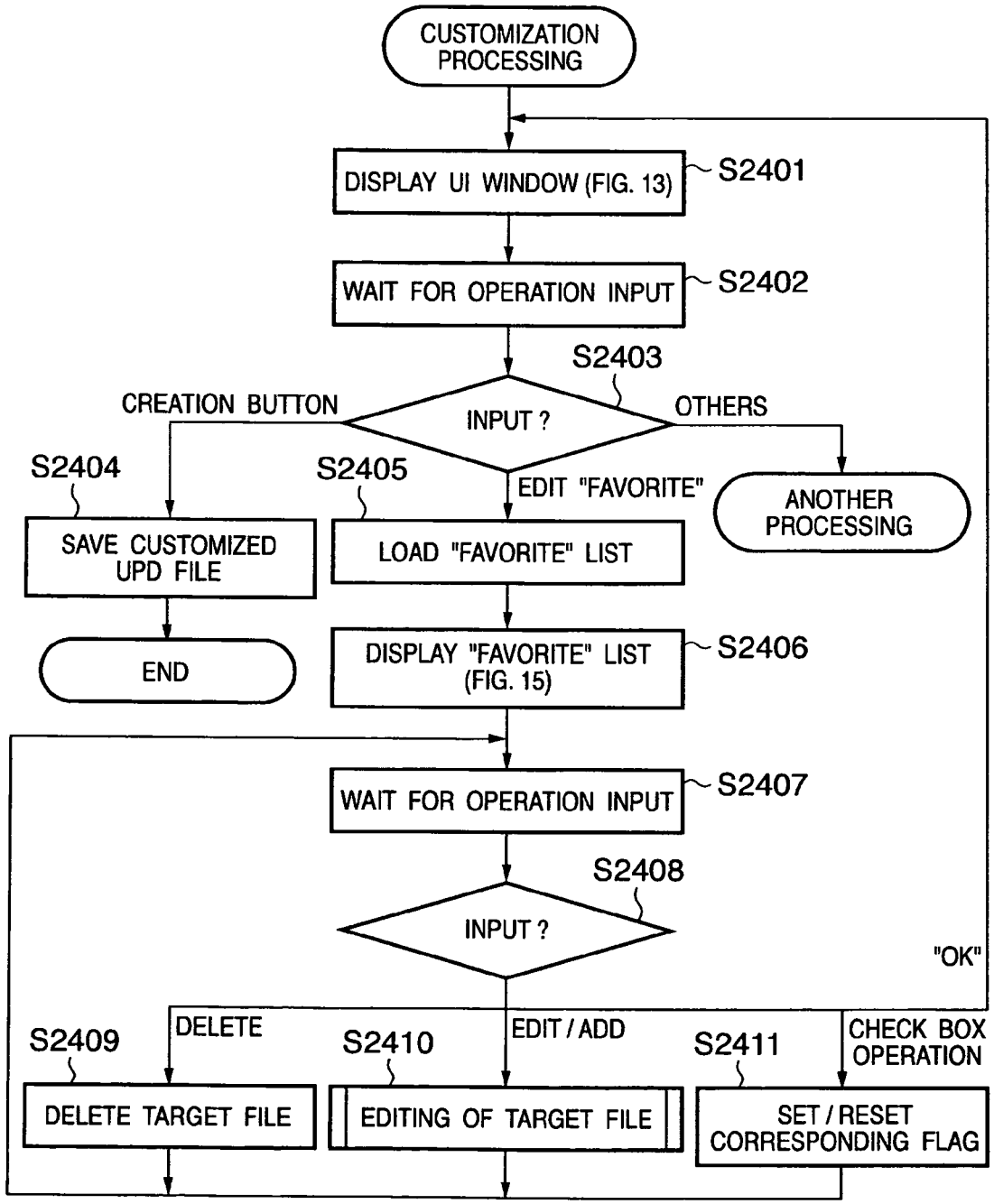
FIG. 44 is a flowchart showing the action of the customization tool according to the third embodiment.

FIG. 44 shows processing procedures when favorite data is edited by the customization tool. This processing corresponds to a detailed description of step S1902 in FIG. 40.

When the customization tool is activated, it displays the UI window in FIG. 34 (S2401). The customization tool permits the operator to input an operation, and waits for an input (S2402). In response to an input, the customization tool determines its contents (S2403). If the creation button is operated, the customization tool saves customized data in a customized UPD file (S2404). For example, when favorite data is customized, the customized favorite data is saved in the UPD file. In this case, an ID representing that the favorite data has been customized is recorded as the ID of the UPD file.

If the input is "favorite editing", the customization tool loads a list of favorite data from the UPD file (S2405), and displays a favorite list window as shown in FIG. 36 (S2406). Then, the customization tool waits for an operation (S2407), and determines an input (S2408). If the input represents deletion, the customization tool deletes selected favorite data (S2409). In this stage, the customization tool does hot apply this operation to the UPD file, but saves information representing that the name of the favorite data to be deleted is subjected to deletion. If the input represents "edit" or "add", the customization tool edits the target file in accordance with the operation (S2410). If the check boxes 1505 and 1506 are operated, the customization tool sets or resets a corresponding flag in accordance with the operation (S2411). If the "OK" button is operated, the flow returns to step S2401.

Figure 45:
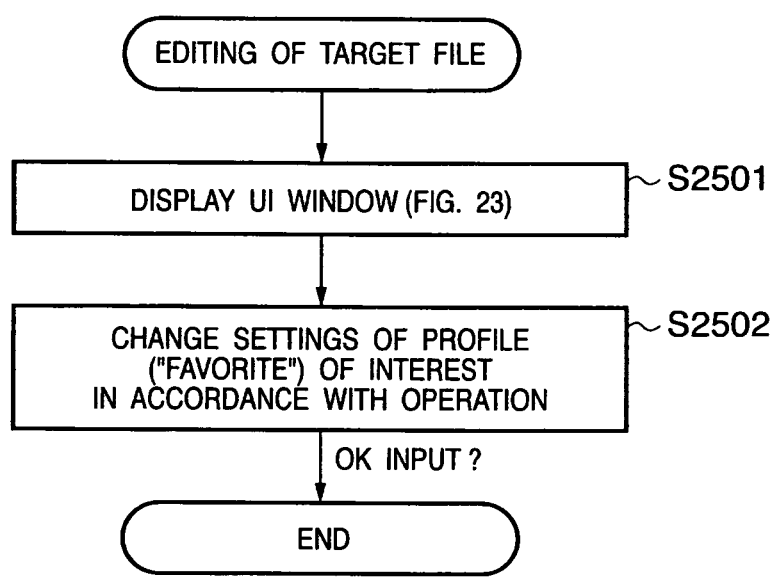
FIG. 45 is a flowchart showing the action of the customization tool according to the third embodiment.

FIG. 45 shows step S2410 in FIG. 44. In step S2501, the UI shown in FIG. 43 is displayed. To perform, for example, editing, each sheet displays settings in accordance with selected favorite data. In step S2502, the values of items are changed in accordance with an operation. A setting change operation and change processing itself are identical to processing of changing settings in a normal printer driver UI. The results of change are saved by overwrite in the selected favorite data. The name of the favorite data can also be changed in the window of FIG. 36. To perform addition, for example, default print settings are applied in the window of FIG. 43. Editing is done on the basis of the default print settings, and the edited print settings are saved as favorite data of a newly assigned name.

Contents saved as favorite data in a UPD file are as follows:

(1) a favorite selection permission flag (the printer driver refers to this flag to permit or inhibit selection of a favorite);

(2) a setting editing permission flag (the printer driver refers to this flag to permit or inhibit a change of the setting values of applied favorite data); and (3) all created favorite data (each favorite data contains print settings).

One of these settings is adopted as a default print setting in installing a printer driver.

In this fashion, the device driver customization program according to the third embodiment can simplify editing of favorite data (profile data). Choices other than default print setting information can be prepared.

Other Embodiment

The object of the present invention is achieved even by providing a system or apparatus with a storage medium which records software program codes to implement the functions of the above-described embodiments and causing the computer (or CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. As the storage medium to supply the program codes, for example, a flexible disk, hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also when the OS (Operating System) or the like running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

This application claims the benefit of Japanese Applications No. 2005-095692, filed Mar. 29, 2005, No. 2005-095695, filed Mar. 29, 2005, and No. 2006-074412, filed Mar. 17, 2006, which are hereby incorporated by reference herein in their entirety.

What is claimed is:

1. An information processing apparatus which customizes a device driver for controlling an image forming apparatus by setting a specific setting value for the device driver, comprising:

a processor;

a display control unit configured to display a setting screen for setting customization identification information for identifying customization content of a customized device driver, wherein the customization identification information is independent of base identification information which corresponds to a version number and is for identifying a base device driver which is a base of the customization;

an issuing unit configured to issue the customization identification information set via the setting screen to the customized device driver; and a storage unit configured to store the customization identification information issued by said issuing unit in association with the customized device driver, wherein the customization identification information set via the setting screen is appended to the base identification information and both of the customization identification information and the base identification information are displayed by a display unit as version information of the customized device driver in a version information screen at an environment in which the customized device driver has been installed, and wherein the processor is to execute computer-executable codes stored in a memory to function as at least one of the units.

2. The apparatus according to claim 1, further comprising:

a determination unit configured to determine whether or not the customization identification information associated with the customized device driver is stored in said storage unit; and a registration unit configured to register the customization identification information associated with the customized device driver in a storage area managed by an operating system when installing the customized device driver, if said determination unit determines that the customization identification information has been stored.

3. The apparatus according to claim 2, further comprising:

a setting unit configured to set the specific setting value for the device driver; and a generation unit configured to generate the customized device driver by writing the setting value set by said setting unit in an information file of the device driver.

4. The apparatus according to claim 3, wherein when the customized device driver is installed, said determination unit refers to the customization identification information of an installed device driver to be replaced by installing the customized device driver in order to determine whether the installed device driver has been customized, and when said determination unit determines that the installed device driver has been customized, said setting unit writes, in an information file of the customized device driver to be installed, the setting value written in the information file of the installed device driver.

5. The apparatus according to claim 3, wherein the setting value set by said setting unit includes at least one of multi-functional print settings corresponding to a plurality of print setting values, a setting for changing a user interface of a printer driver, and a setting value which is set via the user interface of the printer driver when the printer driver is operated.

6. A non-transitory computer-readable storage medium retrievably storing a program for causing a computer to execute an information processing method of customizing a device driver for controlling an image forming apparatus, by setting a specific setting value for the device driver, said method comprising the steps of:

displaying a setting screen for setting customization identification information for identifying customization content of a customized device driver, wherein the customization identification information is independent of base identification information which corresponds to a version number and is for identifying a base device driver which is a base of the customization;

issuing the customization identification information set via the setting screen to the customized device driver; and storing, by storage means, the customization identification information issued in the issuing step in association with the customized device driver, wherein the customization identification information set via the setting screen is appended to the base identification information and both of the customization identification information and the base identification information are displayed by a display unit as version information of the customized device driver in a version information screen at an environment in which the customized device driver has been installed.

7. The storage medium according to claim 6, further comprising the steps of:

determining whether or not the customization identification information associated with the customized device driver is stored in the storage means; and registering the customization identification information associated with the customized device driver in a storage area managed by an operating system when installing the customized device driver, if it is determined that the customization identification information has been stored.

8. The storage medium according to claim 7, further comprising the steps of:

setting the specific setting value for the device driver; and generating the customized device driver by writing the setting value set in the setting step in an information file of the device driver.

9. The storage medium according to claim 8, wherein when the customized device driver is installed, the determining step refers to the customization identification information of an installed device driver to be replaced by installing the customized device driver in order to determine whether the installed device driver has been customized, and wherein when the determining step determines that the installed device driver has been customized, the setting value written in the information file of the installed device driver is written in an information file of the customized device driver to be installed.

10. The storage medium according to claim 8, wherein the setting value set in the setting step includes at least one of multi-functional print settings corresponding to a plurality of print setting values, a setting for changing a user interface of a printer driver, and a setting value which is set via the user interface of the printer driver when the printer driver is operated.

11. An information processing method of customizing a device driver for controlling an image forming apparatus, by setting a specific setting value for the device driver, comprising the steps of:

displaying a setting screen for setting customization identification information for identifying customization content of a customized device driver, wherein the customization identification information is independent of base identification information which corresponds to a version number and is for identifying a base-device driver which is a base of the customization;

issuing the customization identification information set via the setting screen to the customized device driver; and storing, by storage means, the customization identification information issued in the issuing step in association with the customized device driver, wherein the customization identification information set via the setting screen is appended to the base identification information and both of the customization identification information and the base identification information are displayed by a display unit as version information of the customized device driver in a version information screen at an environment in which the customized device driver has been installed.

12. The method according to claim 11, further comprising the steps of:

determining whether or not the customization identification information associated with the customized device driver is stored in the storage means; and registering the customization identification information associated with the customized device driver in a storage area managed by an operating system when installing the customized device driver, if it is determined that the customization identification information has been stored.

13. The method according to claim 12, further comprising the steps of:

setting the specific setting value for the device driver; and generating the customized device driver by writing the setting value set in the setting step in an information file of the device driver.

14. The method according to claim 13, wherein when the customized driver is installed, the determining step refers to the customization identification information of an installed device driver to be replaced by installing the customized device driver in order to determine whether the installed device driver has been customized, and wherein when the determining step determines that the installed device driver has been customized, the setting value written in the information file of the installed device driver is written in an information file of the customized device driver to be installed.

15. The method according to claim 13, wherein the setting value set in the setting step includes at least one of multi-functional print settings corresponding to a plurality of print setting values, a setting for changing a user interface of a printer driver, and a setting value which is set via the user interface of the printer driver when the printer driver is operated.

* * * * *